(12) United States Patent
Kollitz

(10) Patent No.: US 12,151,527 B1
(45) Date of Patent: Nov. 26, 2024

(54) NESTED CYLINDER VEHICLE SUSPENSION AND RETROFIT CROSS-LINK SUSPENSION APPARATUS

(71) Applicant: Kolltek, LLC, Roseburg, OR (US)

(72) Inventor: Alex Kollitz, Roseburg, OR (US)

( * ) Notice: Subject to any disclaimer, the term of this patent is extended or adjusted under 35 U.S.C. 154(b) by 679 days.

(21) Appl. No.: 17/352,362

(22) Filed: Jun. 21, 2021

Related U.S. Application Data

(63) Continuation-in-part of application No. 17/080,493, filed on Oct. 26, 2020, now Pat. No. 11,820,193.

(Continued)

(51) Int. Cl.
| | |
|---|---|
| *B60G 21/06* | (2006.01) |
| *B60G 13/16* | (2006.01) |
| *B60G 15/06* | (2006.01) |
| *B60G 15/12* | (2006.01) |
| *B60G 21/045* | (2006.01) |
| *B60G 21/05* | (2006.01) |
| *B60G 21/067* | (2006.01) |

(52) U.S. Cl.
CPC .......... *B60G 15/065* (2013.01); *B60G 13/16* (2013.01); *B60G 15/061* (2013.01); *B60G 15/12* (2013.01); *B60G 21/045* (2013.01); *B60G 21/05* (2013.01); *B60G 2202/24* (2013.01); *B60G 2202/312* (2013.01); *B60G 2204/81* (2013.01); *B60G 2204/82* (2013.01); *B60G 2204/8304* (2013.01); *B60G 2204/8306* (2013.01); *B60G 2206/41* (2013.01); *B60G 2800/162* (2013.01)

(58) Field of Classification Search
CPC .... B60G 21/06; B60G 21/067; B60G 21/073; B60G 3/20; B60G 17/0165; B60G 2202/24; B60G 2204/8304; B60G 2500/11
See application file for complete search history.

(56) References Cited

U.S. PATENT DOCUMENTS

| | | | |
|---|---|---|---|
| 1,655,204 A * | 1/1928 | Stevens | B60G 21/06 267/31 |
| 2,166,368 A | 7/1939 | Adrian | |

(Continued)

FOREIGN PATENT DOCUMENTS

| | | | |
|---|---|---|---|
| DE | 102017212532 A1 * | 1/2019 | ........... B60G 17/017 |
| FR | 392438 A | 11/1908 | |
| FR | 3049226 A1 * | 9/2017 | ............. B60G 11/54 |

OTHER PUBLICATIONS

Brevet D'Invention, Office National De La Propriete Industrielle, Jul. 9, 1908.

(Continued)

*Primary Examiner* — Frank B Vanaman
(74) *Attorney, Agent, or Firm* — Renaissance IP Law Group, LLP; David A. Crowther

(57) ABSTRACT

A multi-section shock-linked vehicle suspension system is disclosed that transfers force from one point to another point in a system of interrelated shock absorbers. Force can be transmitted from one shock absorber to another using hydraulics or a gas such as air or nitrogen in a space-efficient form factor, without the use of levers and mechanical force transfer rods. The hydraulic or gas force can be tuned using valves to provide different suspension characteristics. The multi-section shock-linked system provides the ability to share wheel loads across the vehicle by using shock absorbers that are shared in addition to the individual shock absorber associated with each wheel.

7 Claims, 31 Drawing Sheets

Related U.S. Application Data

(60) Provisional application No. 62/927,027, filed on Oct. 28, 2019.

(56) References Cited

U.S. PATENT DOCUMENTS

| | | | |
|---|---|---|---|
| 2,416,388 A | | 2/1947 | Hendrix |
| 2,941,815 A | | 6/1960 | Josef |
| 3,032,349 A | | 5/1962 | Fiala |
| 3,147,990 A | | 9/1964 | Alexander |
| 3,328,019 A | * | 6/1967 | Wilson .................. B60G 21/073 |
| | | | 267/64.16 |
| 3,563,566 A | | 2/1971 | Weber |
| 3,582,106 A | * | 6/1971 | Keijzer .................. B60G 15/12 |
| | | | 267/64.19 |
| 3,599,954 A | | 8/1971 | Yew |
| 3,633,935 A | | 1/1972 | Boyer |
| 3,727,961 A | | 4/1973 | Shakespear |
| 3,782,755 A | | 1/1974 | Spichala |
| 3,829,120 A | | 8/1974 | Redding |
| 4,387,909 A | * | 6/1983 | Takavarasha ........ B60G 15/062 |
| | | | 280/124.161 |
| 4,607,861 A | | 8/1986 | Eisenberg et al. |
| 5,076,606 A | | 12/1991 | Takahashi |
| 5,447,332 A | | 9/1995 | Jeyring |
| 5,772,224 A | | 6/1998 | Tong |
| 5,794,966 A | * | 8/1998 | MacLeod ............. B60G 21/073 |
| | | | 280/5.507 |
| 5,810,130 A | * | 9/1998 | Mc Candless ............ F16F 9/49 |
| | | | 188/322.22 |
| 6,295,493 B1 | * | 9/2001 | Kawazoe ........... B60G 17/0162 |
| | | | 280/5.506 |
| 6,390,484 B1 | | 5/2002 | Green et al. |
| 6,499,754 B1 | | 12/2002 | Heyring et al. |
| 6,519,517 B1 | | 2/2003 | Heyring et al. |
| 6,942,230 B1 | | 9/2005 | Buj |
| 8,789,834 B1 | | 7/2014 | Turner |
| 2001/0024005 A1 | | 9/2001 | Sakai |
| 2004/0124051 A1 | * | 7/2004 | Lun .......................... F16F 9/49 |
| | | | 188/267.1 |
| 2006/0091635 A1 | | 5/2006 | Cook |
| 2006/0151969 A1 | | 7/2006 | Revill et al. |
| 2006/0237942 A1 | | 10/2006 | Munday et al. |
| 2010/0023211 A1 | | 1/2010 | Ammon et al. |
| 2011/0068552 A1 | * | 3/2011 | Ryan ................... B60G 11/006 |
| | | | 29/428 |
| 2014/0232082 A1 | * | 8/2014 | Oshita ................ B60G 17/0162 |
| | | | 280/124.161 |
| 2016/0272029 A1 | * | 9/2016 | Anderson ............. F16F 9/3488 |

OTHER PUBLICATIONS https://balzerinc.com/Media/Default/Products/Documents/2014%20Vacuum%20Tank%20Brochure.pdf, accessed on Nov. 5, 2020.
https://en.wikipedia.org/wiki/Audi_RS_6, accessed on Nov. 5, 2020.
https://en.wikipedia.org/wiki/Kinetic_Dynamic_Suspension_System, accessed on Nov. 5, 2020.
https://www.audi-mediacenter.com/en/technology-lexicon-7180/chassis-7185, accessed on Nov. 5, 2020.
https://www.edmunds.com/car-reviews/track-tests/2011-infiniti-qx56-suspension-walkaround.html, accessed on Nov. 5, 2020.
https://www.whiterivertoyota.com/blog/how-does-the-toyota-kinetic-dynamic-suspension-system-work/, accessed on Nov. 5, 2020.

* cited by examiner

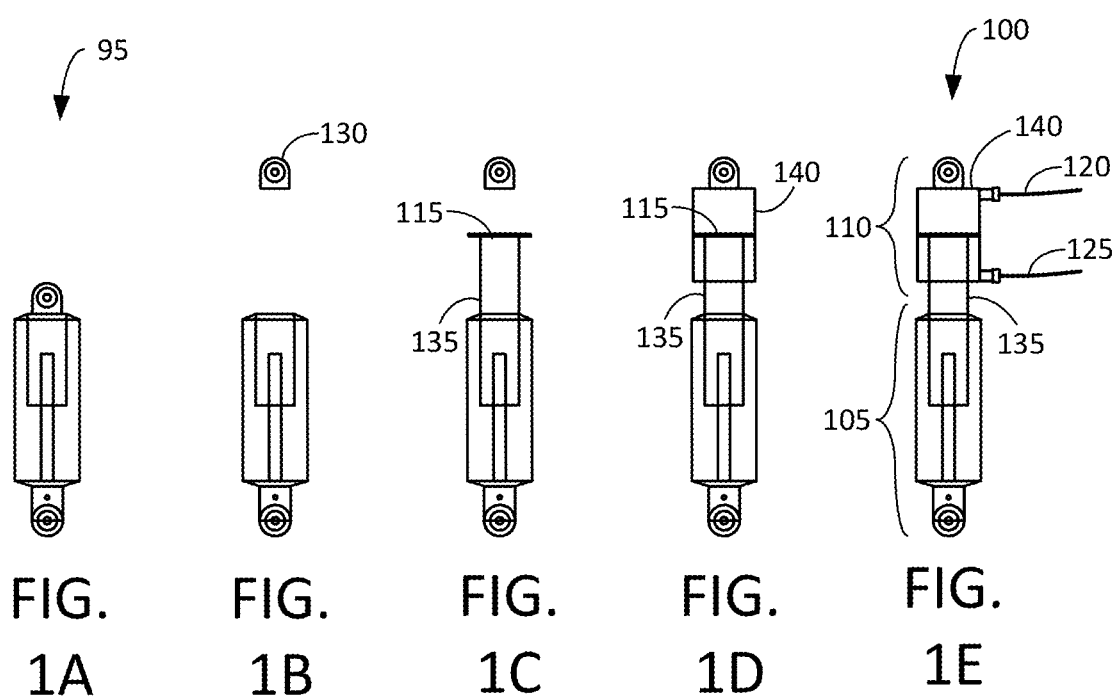

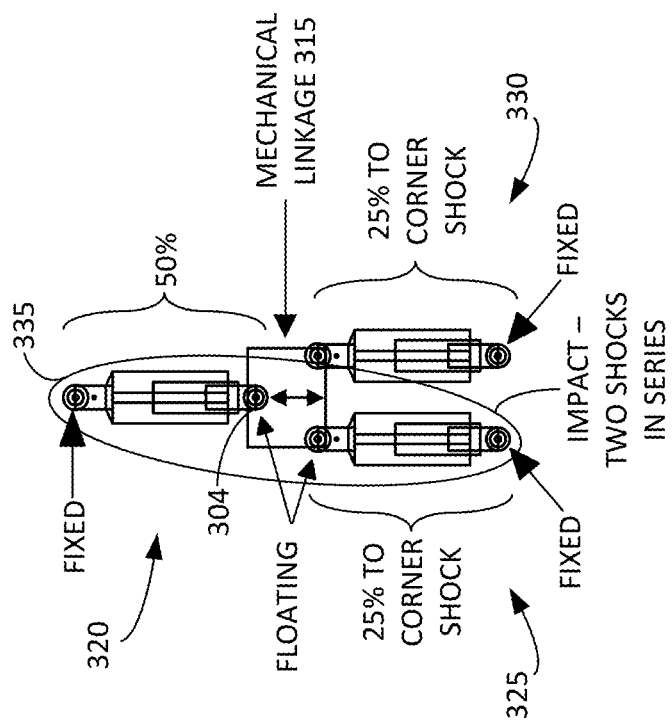
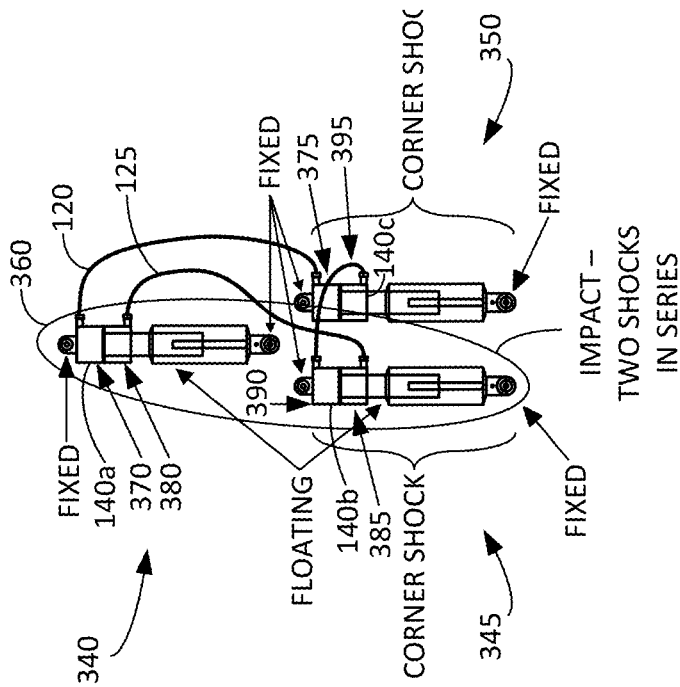
FIG. 3B
FIG. 3A

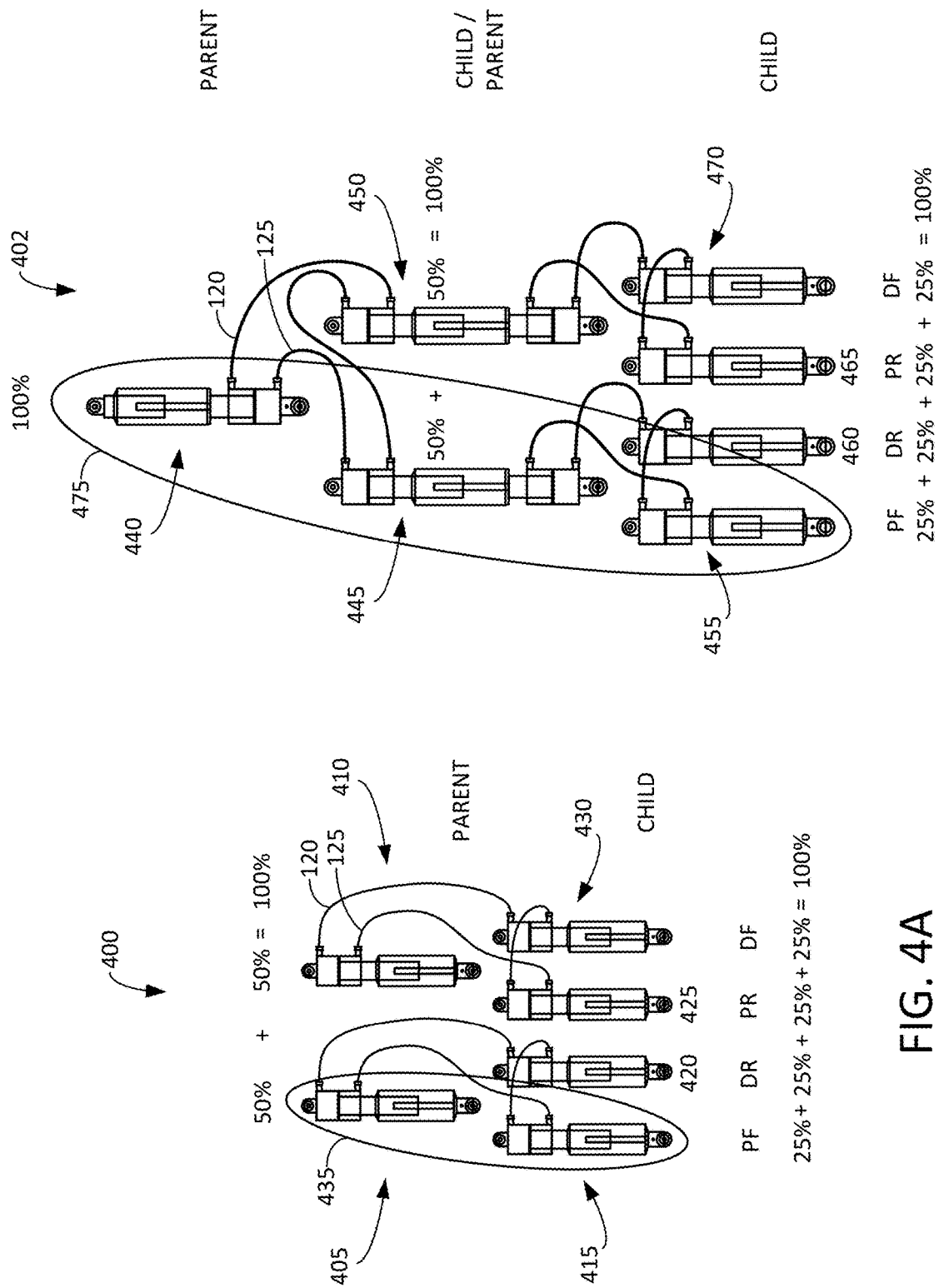

FORCE LAYOUT

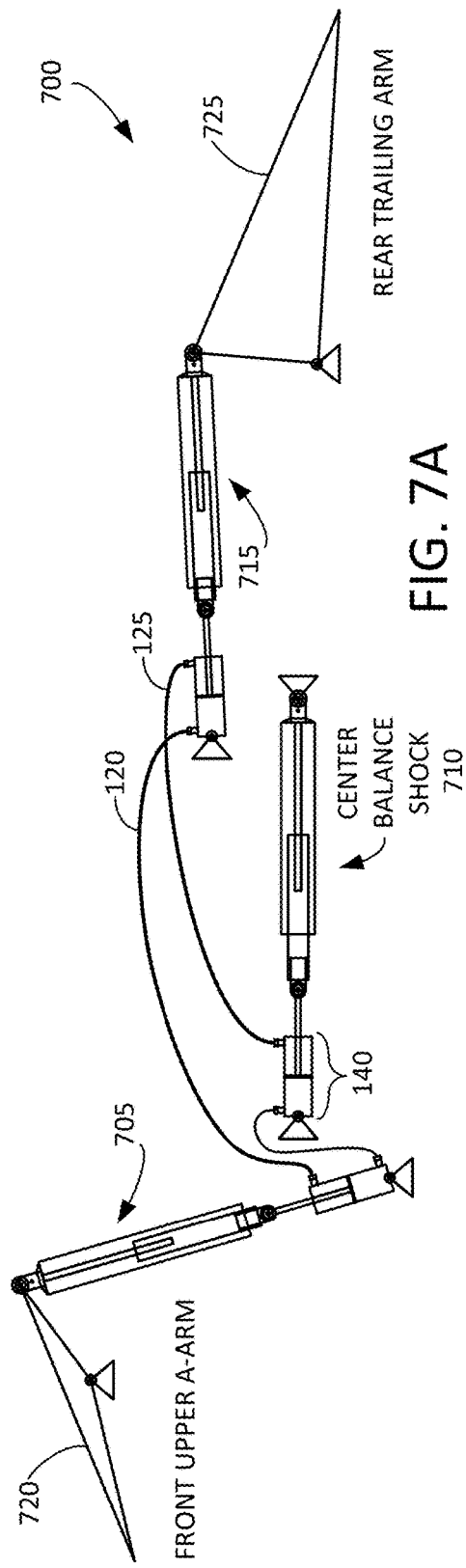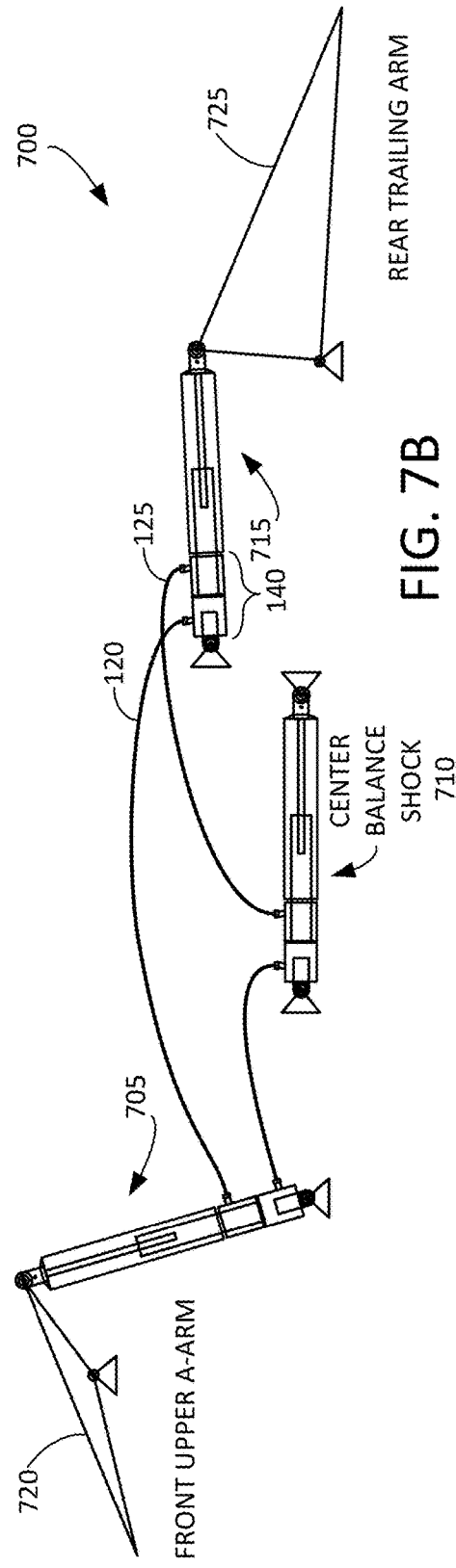

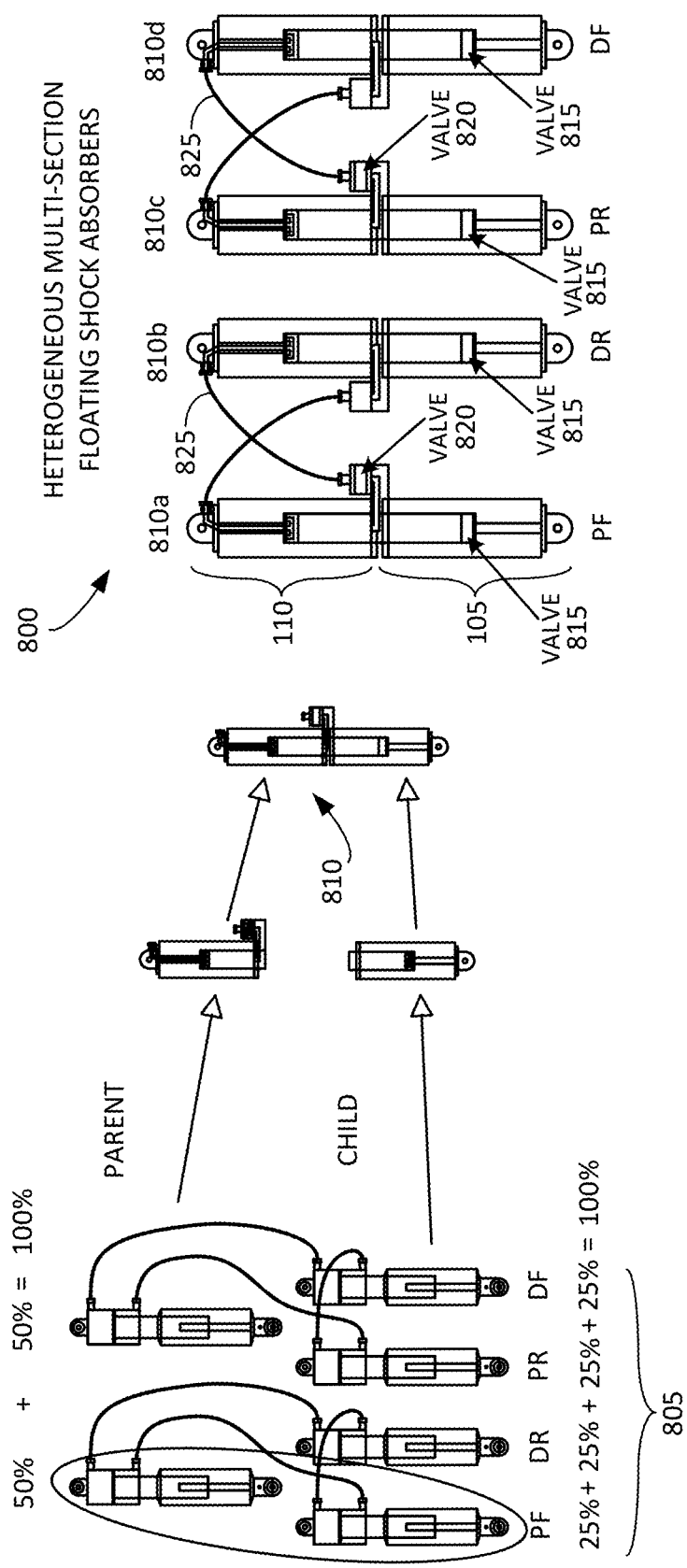

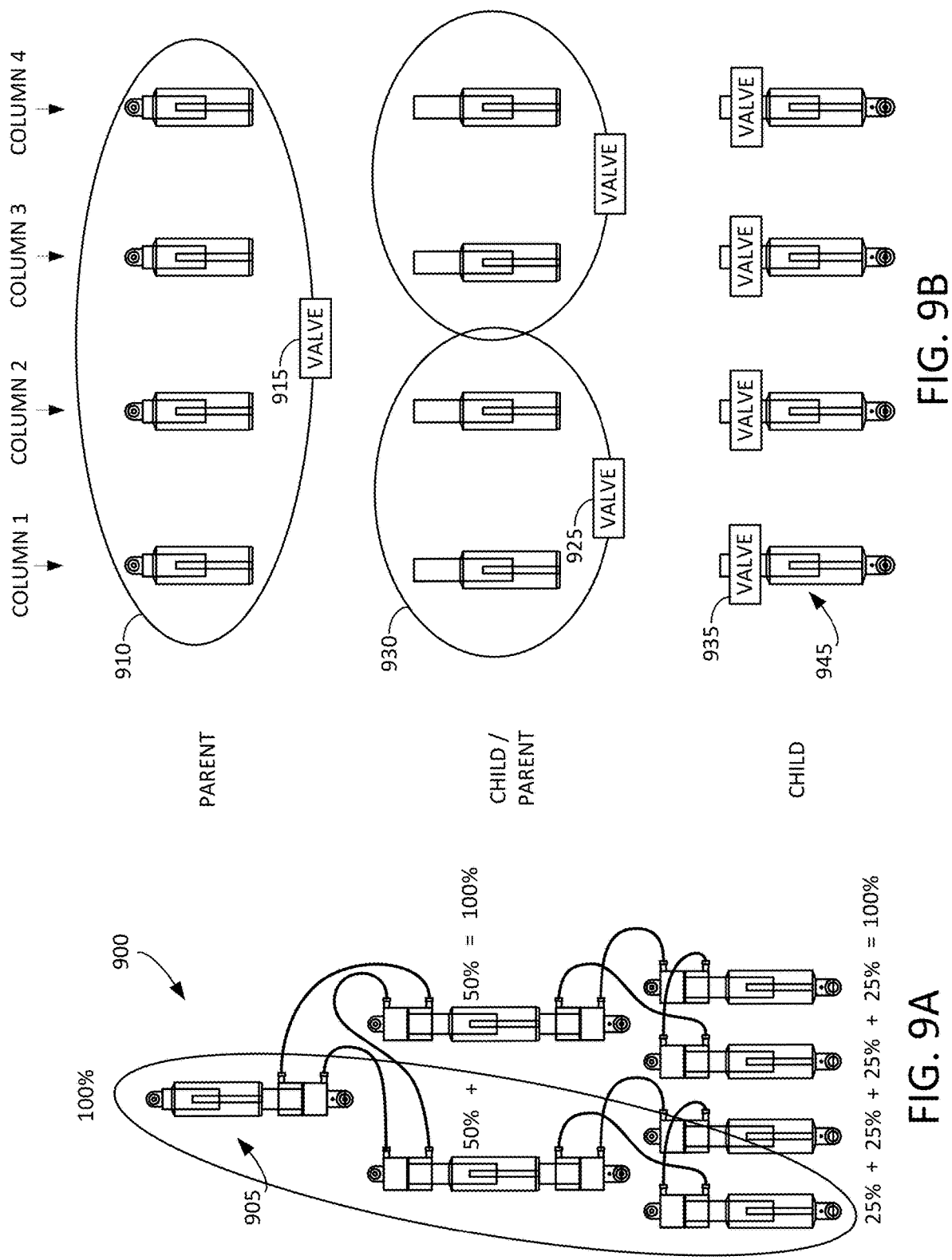

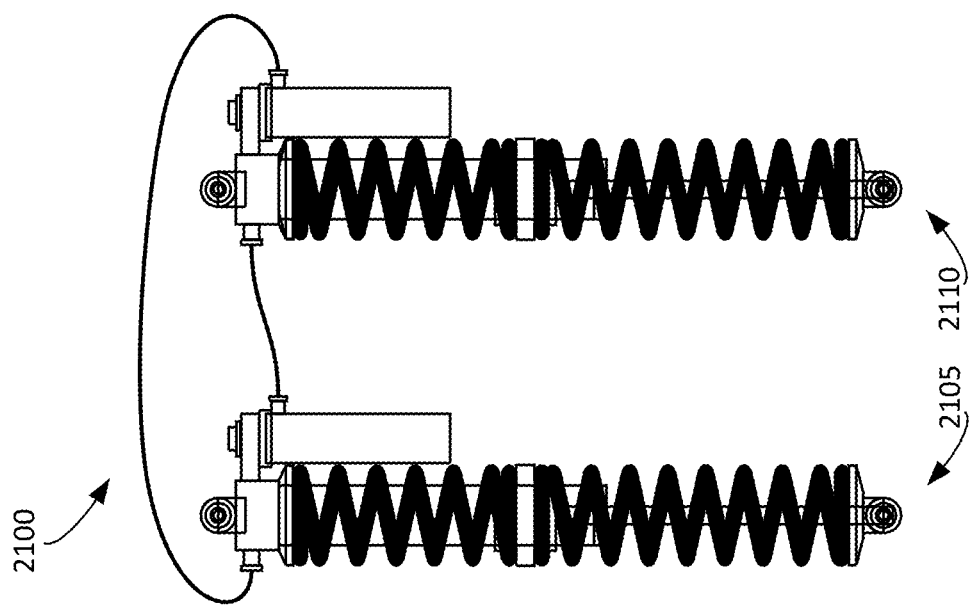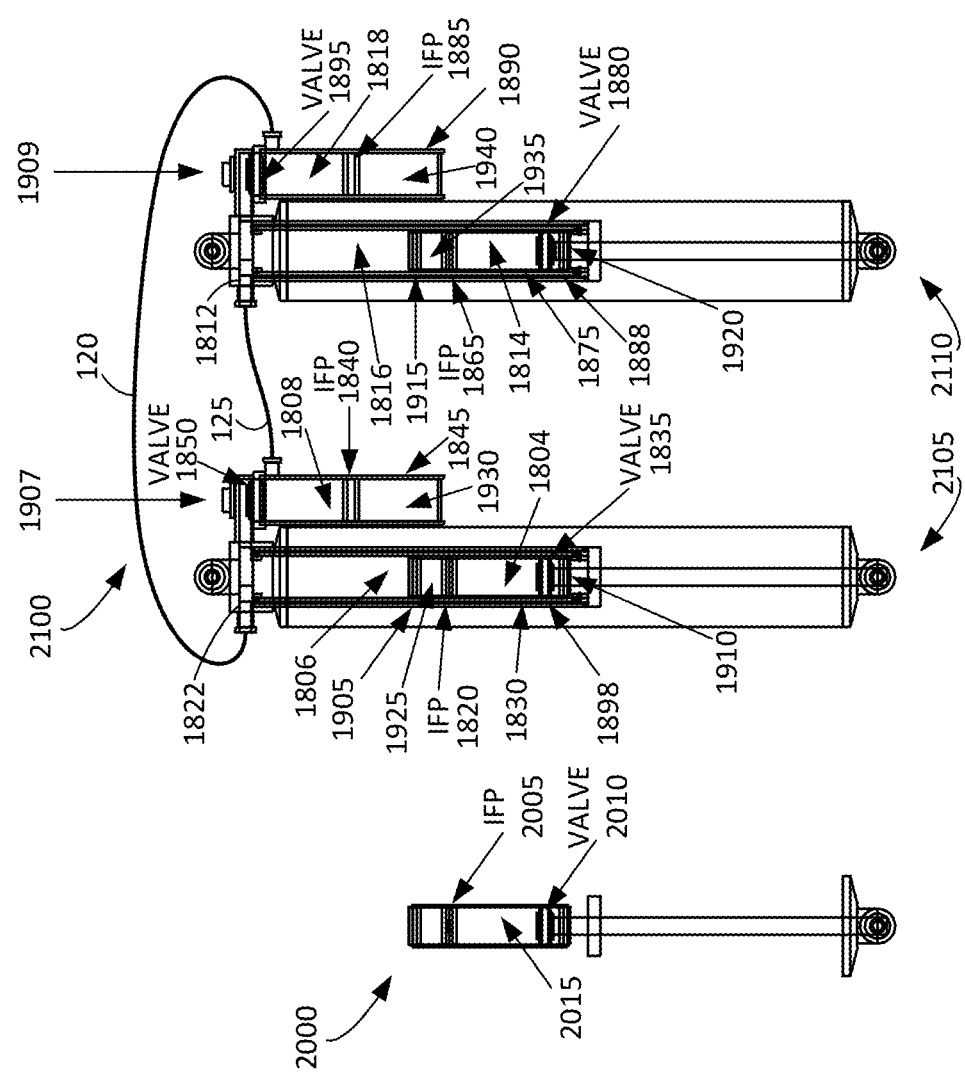

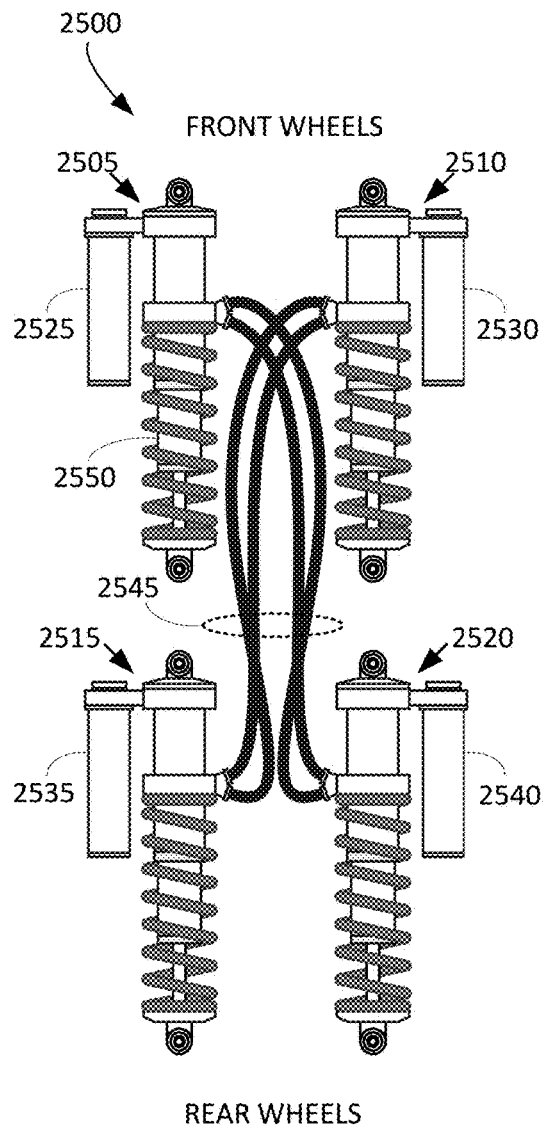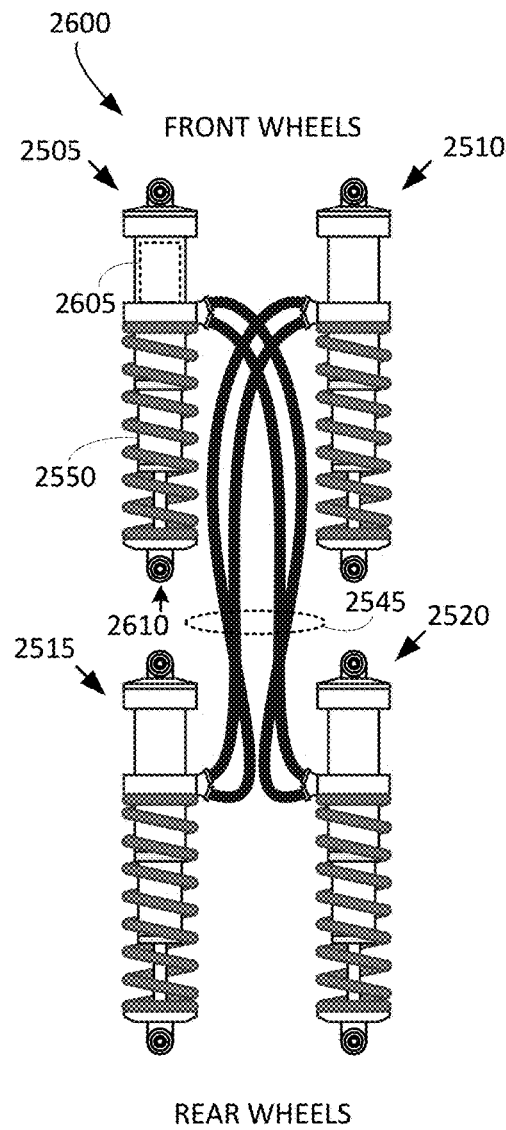
FIG. 25
FIG. 26

RETROFIT CROSS-LINK SUSPENSION APPARATUS IN AN
ASSEMBLED CONFIGURATION WITHOUT STANDARD SHOCKS

RETROFIT CROSS-LINK SUSPENSION APPARATUS IN AN
ASSEMBLED CONFIGURATION WITHOUT STANDARD SHOCKS

NESTED CYLINDER VEHICLE SUSPENSION AND RETROFIT CROSS-LINK SUSPENSION APPARATUS

RELATED APPLICATION DATA

This application is a continuation-in-part of U.S. patent application Ser. No. 17/080,493, filed Oct. 26, 2020, which claims the benefit of U.S. Provisional Patent Application Ser. No. 62/927,027, filed on Oct. 28, 2019, and is a continuation-in-part of U.S. patent application Ser. No. 16/425,038, filed on May 29, 2019, each of which is hereby incorporated by reference.

TECHNICAL FIELD

This application pertains to a vehicle suspension system, and more particularly, to a suspension system that directly links shock absorbers to each other using hydraulics, or using a gas such as air or hydrogen, in order to share wheel loads imposed by bumps and other obstacles.

BACKGROUND

Vehicle suspension systems are typically designed to help absorb and dissipate shocks encountered during a vehicle's travel, such as impacts experienced from running over surface defects or obstacles like potholes, rocks, bumps, ruts, etc. Vehicle suspension is also used to control the quality of ride dynamics of the vehicle, road undulations, turning, stopping and acceleration (e.g., pitch, yaw, roll). This is usually accomplished by configuring the axles, arms, or wheels of the vehicle to pivot or articulate, and then suspending each axle with some form of a damping mechanism, such as a spring or shock absorber. Each axle is often suspended from around the wheel hub using an articulating arm that is connected at one end to the wheel hub, and at the other end to the vehicle frame. The damping mechanism is then connected between the articulating arm and the vehicle frame. When the wheel rides over an obstacle, the impact causes the axle and arm to pivot, transferring the vertical motion from the impact to the damping mechanism.

The damping mechanism is often some combination of spring coupled with a shock absorber. The spring (or a similar type of mechanism) is typically configured to provide a counter resistance against the impacts, to aid in keeping each wheel in contact with the ground and helping to ensure proper vehicle control. The spring also absorbs much of the energy of the initial impact to prevent it from being directly transmitted to the vehicle frame, thus blunting the felt impact of the shock. The shock absorber provides further resistance to dissipate the energy imparted to the vehicle by the impact, but unlike the spring, does not store the energy. The spring can support the weight of a vehicle, and provide resistance to arm movement. The spring returns energy captured, whereas damping removes energy either from the spring or from initial impact. Because the spring stores energy, without the shock absorber, the spring may oscillate upon impact with an obstacle, which can diminish vehicle control. The shock absorber thus acts to dissipate the spring's stored energy.

Some conventional vehicle suspension systems use electronics to balance the wheel loads, but this results in additional overall complexity and costs. Other attempts incorporate sway bars that link the left and right suspensions together to provide anti-roll or stabilizer functions, but this also adds to the cost of the system, while doing little to provide cross-axle load sharing. Accordingly, a need remains for improved methods and systems for providing a shock-linked vehicle suspension system. Embodiments of the inventive concept address these and other limitations in the prior art.

BRIEF DESCRIPTION OF THE DRAWINGS

FIG. 1A illustrates an example shock absorber.

FIGS. 1B through 1E illustrate an example multi-section shock absorber including a primary shock absorber section and a transfer shock absorber section having a piston and two transfer tubes that are configured to support a shock-linked vehicle suspension system for a four-wheel vehicle in accordance with various embodiments of the present inventive concept. FIG. 1B shows a shock absorber with an end bracket removed. FIG. 1C shows the shock absorber with an extended stem and piston. FIG. 1D shows the shock absorber with a transfer receptacle enclosing the extended piston. FIG. 1E shows a multi-section shock absorber including the first primary shock absorber section and the second transfer shock absorber section having a first transfer tube attached to an upper section of the transfer receptacle, and a second transfer tube attached to a lower section of the transfer receptacle.

FIGS. 3A and 3B illustrate a partial mechanical cross-linked system and a partial multi-section shock-linked shock absorber system, respectively, in accordance with various embodiments of the present inventive concept.

FIG. 4A illustrates an example multi-section six-shock-linked system in accordance with various embodiments of the present inventive concept.

FIG. 4B illustrates an example multi-section seven-shock-linked system in accordance with various embodiments of the present inventive concept.

FIGS. 7A and 7B illustrate an example multi-section shock-linked system in accordance with various embodiments of the present inventive concept.

FIG. 8A illustrates the integration of multiple multi-section shock-linked shock absorbers into a compact multi-section floating shock in accordance with various embodiments of the present inventive concept.

FIG. 8B illustrates four compact multi-section floating shock-linked shock absorbers configured in a floating shock-linked system in accordance with various embodiments of the present inventive concept.

FIG. 9A illustrates an example multi-section seven-shock-linked system in accordance with various embodiments of the present inventive concept.

FIG. 9B illustrates parts of a multi-section shock-linked system that functionally correspond to the multi-section seven-shock-linked system of FIG. 9A in accordance with various embodiments of the present inventive concept.

FIG. 20 illustrates a shock damper piston in accordance with various embodiments of the present inventive concept.

FIG. 21 illustrates a floating cylinder system without a reservoir in accordance with various embodiments of the present inventive concept.

FIG. 22 illustrates the floating cylinder system of FIG. 21 without a reservoir with a common spring stack in accordance with various embodiments of the present inventive concept.

FIG. 23A shows a floating cylinder, which can be a shock damper. FIG. 23B shows a floating cylinder with a reservoir. FIG. 23C shows a virtual floating cylinder with a reservoir. FIG. 23D shows a virtual floating cylinder.

FIG. 25 illustrates a nested cylinder vehicle suspension system including shock absorbing sections and corresponding shock reservoirs in accordance with various embodiments of the present inventive concept.

FIG. 26 illustrates a nested cylinder vehicle suspension system including the shock absorbing sections, but without the shock reservoirs in accordance with various embodiments of the present inventive concept.

Figure 2A:
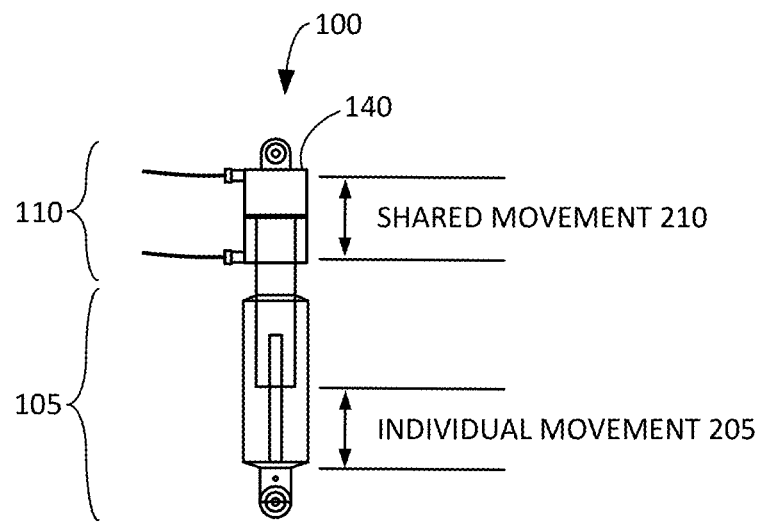
FIG. 2A illustrates an example multi-section shock absorber having the ability to absorb individual movement and shared movement in a shock-linked vehicle suspension system in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first shock absorber could be termed a second shock absorber, and, similarly, a second shock absorber could be termed a first shock absorber, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present inventive concept provide a multi-section shock-linked vehicle suspension system that transfers force from one point to another point in a system of interrelated shock absorbers. For example, force can be transmitted from one shock absorber to another using hydraulics or a gas such as air or nitrogen in a very space-efficient form factor, without the use of levers and mechanical force transfer rods. The hydraulic or gas force can be tuned using valves to provide different suspension characteristics. The multi-section shock-linked system is space-efficient, which enables more kinds of vehicle platforms to integrate the system while avoiding mechanical levers and rods that would otherwise cause interference with the physical space layout of the vehicle. The multi-section shock-linked system provides the ability to share wheel loads across the vehicle by using shock absorbers that are shared in addition to the individual shock absorber associated with each wheel. Shared shocks can, in most cases, have a spring or reflex rate equal to the cumulative sum of the individual shock absorbers in series with it, and can be responsible for a portion of the wheel travel at each wheel. The individual shock at the wheel can be responsible for the rest of the wheel travel.

FIG. 1A illustrates a simplified conventional shock absorber 95, which typically would have a coil spring (not shown) or other damping substance such as oil, air, or nitrogen.

FIGS. 1B through 1E illustrate an example multi-section shock absorber including a first shock absorber section 105 and a second transfer shock absorber section 110 having a piston 115 and two transfer tubes (e.g., 120, 125) that can be configured to support a shock-linked vehicle suspension system for a four-wheel vehicle in accordance with various embodiments of the present inventive concept. The first shock absorber section 105 can include a coil spring (not shown) or other damping substance such as oil, air, or nitrogen.

FIG. 1B shows a shock absorber with an end bracket 130 removed. FIG. 1C shows the shock absorber with an extended stem 135 and piston 115. FIG. 1D shows the shock absorber with a transfer receptacle 140 enclosing the extended piston 115. The transfer receptacle 140 can be a transfer cylinder. It will be understood that while the term "cylinder" is used herein, other shapes of enclosures can be used such as a rectangular box, etc. The transfer receptacle 140 can enclose the piston 115 and at least part of the stem 135. FIG. 1E shows a multi-section shock absorber 100 including the first primary shock absorber section 105 and the second transfer shock absorber section 110 having a first transfer tube 120 attached to an upper section of the transfer receptacle 140, and a second transfer tube 125 attached to a lower section of the transfer receptacle 140.

The upper section of the transfer receptacle 140 can vary in size depending on a position of the piston 115 within the transfer receptacle 140. Similarly, the lower section of the transfer receptacle 140 can vary in size depending on the position of the piston 115 within the transfer receptacle 140. It will be understood that the terms "upper" and "lower" are relative, and are used for illustrative purposes. In other words, if the shock absorber 100 were to be oriented horizontally, the different sections of the transfer receptacle 140 can be referred to as a left section and right section of the transfer receptacle 140, and so forth.

The transfer tubes (e.g., 120, 125) can transfer force between a family of transfer receptacles with their associated multi-section shock absorbers, as further described below. The transfer tubes (e.g., 120, 125) can transfer a hydraulic fluid, or alternatively, a gas such as air or nitrogen. The transfer receptacle 140 can hold a hydraulic fluid, or alternatively, a gas such as air or nitrogen. The transfer receptacle 140 can hold the hydraulic fluid and/or gas above the piston 115 and/or below the piston 115. The hydraulic fluid can include, for example, oil, mineral oil, water, glycol, alloys, brake fluid, power steering fluid, or the like.

FIG. 2A illustrates an example multi-section shock absorber 100 having the ability to absorb individual movement 205 and shared movement 210 in a shock-linked vehicle suspension system in accordance with various embodiments of the present inventive concept. The individual movement 205 can occur in the first primary shock absorber section 105 damped by a coil spring (not shown), oil (not shown), or a gas such as air or nitrogen (not shown). The shared movement 210 can occur in the second transfer shock absorber section 110 damped by a hydraulic fluid within the transfer receptacle 140, which can be shared between other multi-section shock absorbers, as further described below. In an alternative embodiment, the shared movement 210 can occur in the second transfer shock absorber section 110 damped by a gas such as air or nitrogen within the transfer receptacle 140, which can be shared between other multi-section shock absorbers, as further described below.

Figure 2B:
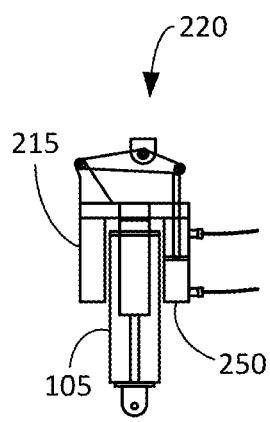
FIGS. 2B and 2C illustrate alternate multi-section shock absorbers for a shock-linked vehicle suspension system in accordance with various embodiments of the present inventive concept.
Figure 2C:
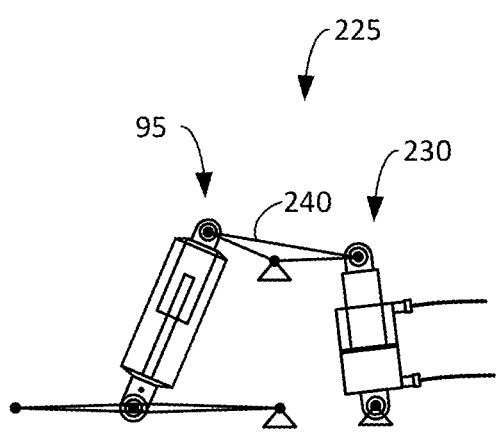

FIGS. 2B and 2C illustrate alternate multi-section shock absorbers (e.g., 220, 225) for a shock-linked vehicle suspension system in accordance with various embodiments of the present inventive concept. FIG. 2B shows a multi-section shock absorber 220 with an optional shock reservoir 215 attached to the side thereof. The shock reservoir 215 is associated with the shock absorber section 105. A force ram 250 can be attached to the shock absorber section 105, but separate in function from the shock absorber section 105 and the shock reservoir 251. FIG. 2C shows a shock absorber 225 including an individual multi-section shock absorber 230 separate from a simplified conventional shock absorber 95, but mechanically linked together by mechanical linkage 240.

FIGS. 3A and 3B illustrate a partial mechanical cross-linked system 305 and a partial multi-section shock-linked shock absorber system 310, respectively, in accordance with various embodiments of the present inventive concept. The partial mechanical cross-linked system 305 of FIG. 3A includes a mechanical linkage 315 connection between a first mechanical shock absorber 320 and two secondary mechanical shock absorbers 325 and 330. The brackets (e.g., 304) of one end of each of the mechanical shock absorbers (e.g., 320, 325, and 330) can be connected via the mechanical linkage 315, and floating with respect to each other (i.e., not fixed directly to the vehicle). An oval 335 is drawn around the first shock absorber 320 and one 325 of the two secondary shock absorbers, which highlights an impact of two shock (e.g., 320, 325) absorbers in series. This arrangement is in contrast to FIG. 3B, which shows three multi-section shock-linked shock absorbers (e.g., 340, 345, and 350), all of which can be fixed (i.e., brackets attached directly to the vehicle rather than floating with respect to each other).

As shown in FIG. 3B, transfer receptacles (e.g., 140a, 140b, and 140c) of the shock absorbers (e.g., 340, 345, and 350) can be interconnected using transfer tubes (e.g., 120, 125) that transfer hydraulic liquid or a gas such as air or nitrogen between the various multi-section shock absorbers (e.g., 340, 345, and 350). More specifically, a section 370 of the transfer receptacle 140a can share hydraulic fluid and/or gas with a section 375 of the transfer receptacle 140c. A section 380 of the transfer receptacle 140a can share hydraulic fluid and/or gas with a section 385 of the transfer receptacle 140b. A section 390 of the transfer receptacle 140b can share hydraulic fluid and/or gas with a section 395 of the transfer receptacle 140c. It will be understood that as disclosed herein, where a transfer tube connects a section of a shock absorber to another section of a shock absorber, the hydraulic fluid and/or gas can be shared among those connected sections.

An oval 360 is drawn around the upper multi-section shock absorber 340 and one 345 of the two lower multi-section shock absorbers, which highlights an impact of two multi-section shock absorbers in series. The resulting distribution of impact is similar to the purely mechanical design of FIG. 3A, except that hydraulic/gas transfer tubes are used rather than the mechanical linkage 315. In some embodiments, a hybrid system including separate mechanical and hydraulic/gas shock absorbers can be used.

The shock-lined system 310 of FIG. 3B can have a parent/child relationship referred to herein as being parallel or serial. The children are in a parallel relationship to each other, whereas the parent is in a serial relationship with each of the children. In some embodiments, there are multiple children and multiple parents. In some embodiments, there are multiple generations in which a parent is a child to another parent. Shock absorbers that are in series absorb impacts. The degree to which they absorb impacts depends on what is happening to other shock absorbers that are arranged in series. The system can be self-balancing.

FIG. 4A illustrates an example multi-section six-shock-linked system 400 in accordance with various embodiments of the present inventive concept. In this example embodiment, there can be two parent multi-section shock-linked shock absorbers (e.g., 405, 410), and four children (e.g., 415, 420, 425, and 430). The four children shock absorbers (e.g., 415, 420, 425, and 430) can be associated with the passenger front (PF) position, the driver rear (DR) position, the passenger rear (PR) position, and the driver front (DF) position of the vehicle, respectively. An oval 435 is drawn around the upper shock absorber 405 and one 415 of the four lower shock absorbers, which highlights an impact of two multi-section shock absorbers in series.

The parent shock absorbers can be linked to the corresponding child shock absorbers using transfer tubes (e.g., 120, 125). Each of the child multi-section shock-linked shock absorbers (e.g., 415, 420, 425, and 430) can receive 25% of the wheel load as between the children. In other words, each of the child multi-section shock-linked shock absorbers (e.g., 415, 420, 425, and 430) can be associated with one wheel of a four-wheeled vehicle. Each of the parent shock absorbers (e.g., 405, 410) can receive 50% of the wheel load as between the parents. In other words, each of the parent multi-section shock-linked shock absorbers (e.g., 405, 410) can be associated with two wheels of a four-wheeled vehicle. The amount of shock that is actually absorbed by each of the multi-section shock-linked shock absorbers (e.g., 405, 410, 415, 420, 425, and 430), and how a particular shock gets shared among them, depends on which wheel is receiving the particular shock due to bumps and other obstacles, and the magnitude of the particular shock.

FIG. 4B illustrates an example multi-section seven-shock-linked system 402 in accordance with various embodiments of the present inventive concept. In this example embodiment, there is a parent multi-section shock-linked shock absorber 440, two child/parent multi-section shock-linked shock absorbers (e.g., 445, 450), and four children multi-section shock-linked shock absorbers (e.g., 455, 460, 465, and 470). The four children shock absorbers can be associated with the PF position, the DR position, the PR position, and the DF position of the vehicle, respectively. An oval 475 is drawn around the upper parent shock absorber 440, one 445 of the two child/parent shock absorbers, and one 455 of the four lower child shock absorbers, which highlights an impact of three multi-section shock absorbers in series. The parent shock absorber 440 can be linked to the two child/parent shock absorbers (e.g., 445, 450), and the two child/parent shock absorbers (e.g., 445, 450) can be linked to the corresponding four child shock absorbers (e.g., 455, 460, 465, and 470) using transfer tubes (e.g., 120, 125).

Each of the child multi-section shock-linked shock absorbers (e.g., 455, 460, 465, and 470) can receive 25% of the wheel load as between the children. In other words, each of the child multi-section shock-linked shock absorbers (e.g., 455, 460, 465, and 470) can be associated with one wheel of a four-wheeled vehicle. Each of the parent/child shock absorbers (e.g., 445, 450) can receive 50% of the wheel load as between the parent/childs. In other words, each of the parent/child multi-section shock-linked shock absorbers (e.g., 445, 450) can be associated with two wheels of a four-wheeled vehicle. The parent shock absorber 440 can receive 100% of the wheel load as between the parent 440. In other words, the parent multi-section shock-linked shock absorber 440 can be associated with all four wheels of a four-wheeled vehicle. The amount of shock that is actually absorbed by each of the multi-section shock-linked shock absorbers (e.g., 440, 445, 450, 455, 460, 465, and 470), and how a particular shock gets shared among them, depends on which wheel is receiving the particular shock due to bumps and other obstacles, and the magnitude of the particular shock.

Figure 5A:
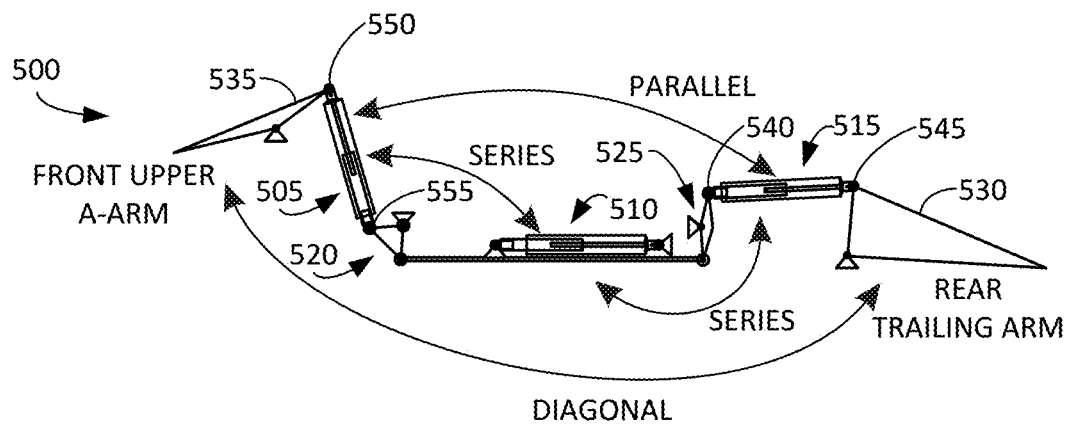
FIGS. 5A and 5B illustrate an example vehicle layout and force layout for a mechanical cross-linked system, respectively.
Figure 5B:
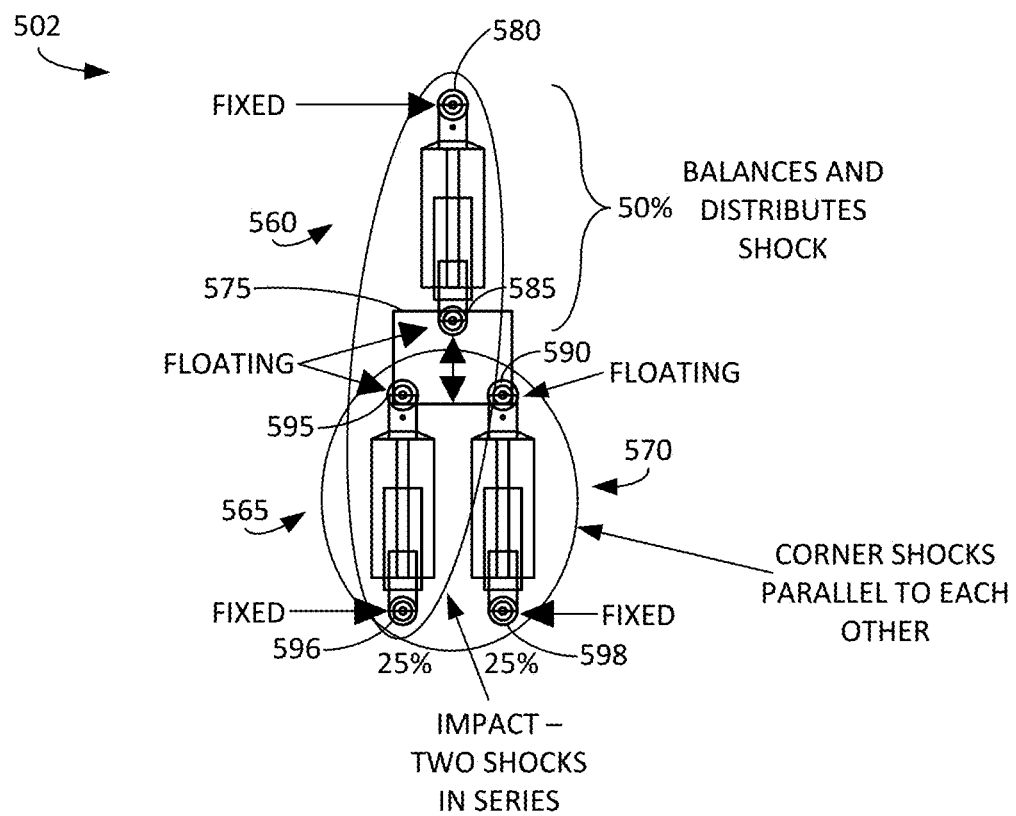

FIGS. 5A and 5B illustrate an example vehicle layout and force layout for a mechanical cross-linked system 500, respectively. These figures show how the shock absorbers (e.g., 505, 510, and 515) may be mechanically linked across a vehicle using mechanical linkages (e.g., 520 and 525). When an individual wheel shock absorber (e.g., 505, 515) starts to compress, a portion of that movement can be transmitted to the center oversized shock 510, and at the same time the shock can also lift on its counterpart shock absorber (e.g., 505, 515) on the other corner via the floating end. The lifting on the counterpart shock absorber (e.g., 505, 515) can allow for the vehicle to pivot about its center of mass as opposed to being raised up. It also can provide for a lower center of gravity for all maneuvers increasing the safety and performance of the vehicle. Conventionally, a shock absorber can be directly connected at or near a bottom section to a pivotable arm, and a shock absorber can be directly connected at or near a top to a frame of the vehicle. The cross-linked mechanical system 500 changes this. One end (e.g., 540) of the shock absorber (e.g., 515) can float as it transmits force to the other shock absorber (e.g., 510) it is in series with via the mechanical linkage (e.g., 525). The end (e.g., 540) of the shock absorber (e.g., 515) need not be directly fixed to the frame of the vehicle.

Accordingly, there are two shock absorbers (e.g., 515, 510) in series. The opposite end (e.g., 545) of the shock absorber 515 can be attached to a pivotable arm 530. One end 555 of the shock absorber (e.g., 505) can float as it transmits force to the other shock absorber (e.g., 510) it is in series with via the mechanical linkage (e.g., 520). The end (e.g., 555) of the shock absorber (e.g., 505) need not be directly fixed to the frame of a vehicle.

Accordingly, there are two shock absorbers (e.g., 505, 510) in series. The opposite end (e.g., 550) of the shock absorber (e.g., 505) can be directly attached to a front upper A-arm (e.g., 535) of the vehicle frame. The mechanical linkages (e.g., 520, 525) can move to be able to transmit force back and forth and utilize the features of both shocks (e.g., 505, 515). Because the center shock absorber (e.g., 510) can be shared, there are two shock absorbers (e.g., 505, 515) in parallel with each other, one associated with each wheel of the vehicle. Both of these individual wheel shock absorbers (e.g., 505, 515) can be in their own series with the common center shock absorber (e.g., 510). The common center shock absorber (e.g., 510) can balance and distribute the shock experienced by either wheel of the vehicle.

As shown in the system 502 of FIG. 5B, one end (e.g., 595) of the shock absorber (e.g., 565) can float as it transmits force to the other shock absorber (e.g., 560) it is in series with via the mechanical linkage (e.g., 575). The end (e.g., 595) of the shock absorber (e.g., 565) need not be directly fixed to the frame of the vehicle. Accordingly, there are two shock absorbers (e.g., 565, 560) in series. The opposite end (e.g., 596) of the shock absorber (e.g., 565) can be directly fixed to an arm of the vehicle. One end (e.g., 590) of the shock absorber (e.g., 570) can float as it transmits force to the other shock absorber (e.g., 560) it is in series with via the mechanical linkage (e.g., 575). The end (e.g., 590) of the shock absorber (e.g., 570) need not be directly fixed to the frame of a vehicle. Accordingly, there are two shock absorbers (e.g., 570, 560) in series. The opposite end (e.g., 598) of the shock absorber (e.g., 570) can be directly attached to a moveable arm of the suspension (i.e., not directly to the frame). The mechanical linkage (e.g., 575) can move to be able to transmit force back and forth and utilize the features of both shock absorbers (e.g., 565, 570). One end (e.g., 580) of the common center shock absorber (e.g., 560) can be directly fixed to the frame of the vehicle (i.e., not to an arm of the vehicle). In some embodiments, the one end (e.g., 580) is fixed to a moveable arm of the suspension. The opposite end (e.g., 585) of the common center shock absorber (e.g., 560) can float, and need not be directly fixed to the frame of the vehicle. In other words, opposite end (e.g., 585) of the common center shock absorber (e.g., 560) can be attached to the mechanical linkage 575. Because the center shock absorber (e.g., 560) can be shared, there are two shock absorbers (e.g., 565, 570) in parallel with each other, one associated with each wheel of the vehicle. Both of these individual wheel shock absorbers (e.g., 565, 570) can be in their own series with the common center shock absorber (e.g., 560). The common center shock absorber (e.g., 560) can balance and distribute the shock experienced by either wheel of the vehicle.

Figure 6A:
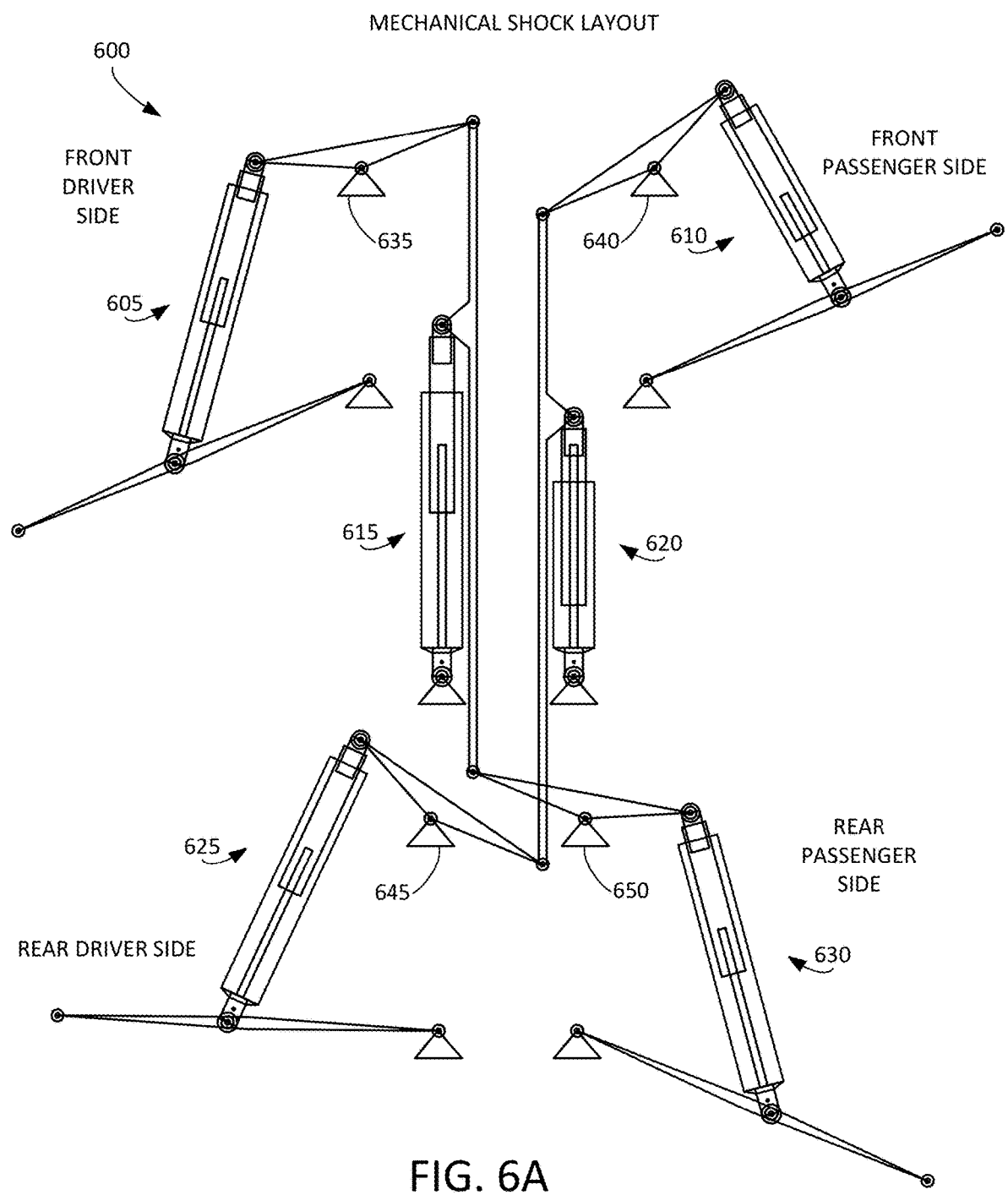
FIGS. 6A and 6B illustrate an example mechanical six-cross-linked system and an example multi-section six-shock-linked system, respectively, in accordance with various embodiments of the present inventive concept.
Figure 6B:
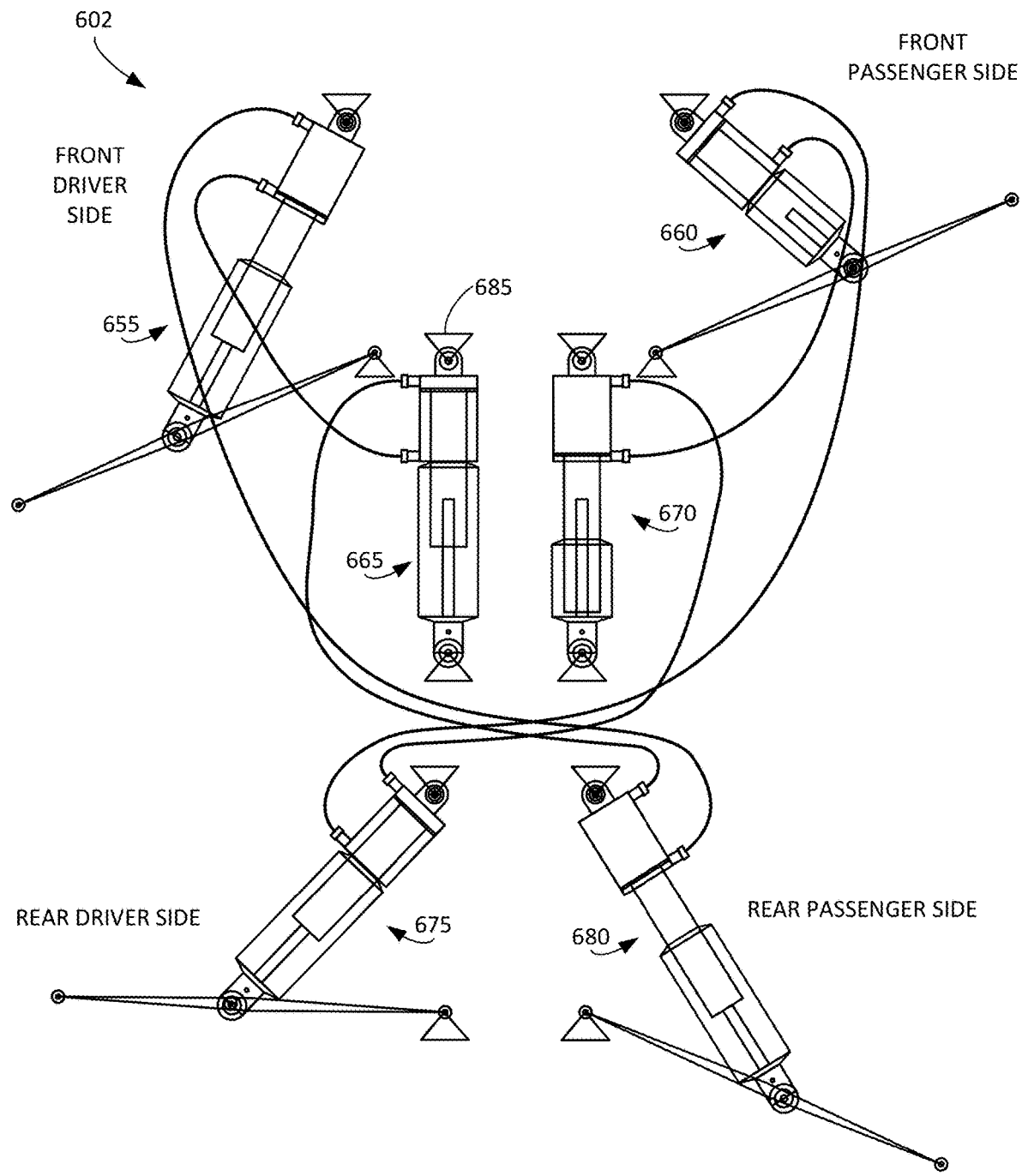

FIGS. 6A and 6B illustrate an example mechanical six-cross-linked system 600 and an example multi-section six-shock-linked system 602, respectively, in accordance with various embodiments of the present inventive concept. The system 600 of FIG. 6A can include mechanical coil shock absorbers (e.g., 605, 610, 615, 620, 625, and 630) that are mechanically linked. The mechanical coil shock absorber 605 can be associated with a front driver side wheel of a vehicle. The mechanical coil shock absorber 610 can be associated with a front passenger side wheel of a vehicle. The mechanical coil shock absorber 625 can be associated with a rear driver side wheel of a vehicle. The mechanical coil shock absorber 630 can be associated with a rear passenger side wheel of a vehicle. The common center shock absorber 615 can balance and distribute the shock between the mechanical coil shock absorber 605 and the mechanical coil shock absorber 630. The common center shock absorber 620 can balance and distribute the shock between the mechanical coil shock absorber 610 and the mechanical coil shock absorber 625.

The system 600 can use more space due to the mechanical linkages (e.g., 635, 640, 645, and 650), which in some situations, can interfere with existing vehicle hardware.

Although maintenance is relatively straight forward, the overall difficulty in system engineering may complicate this kind of system. The system 602 of FIG. 6B including multi-section shock absorbers (e.g., 655, 660, 665, 670, 675, and 680) can be slightly more expensive than the purely mechanical system 600, but the system 602 can use significantly less space. Moreover, additional freedom is afforded to locate center shocks (e.g., 665, 670) anywhere on the vehicle.

The multi-section shock absorber 655 can be associated with a front driver side wheel of a vehicle. The multi-section shock absorber 660 can be associated with a front passenger side wheel of a vehicle. The multi-section shock absorber 675 can be associated with a rear driver side wheel of a vehicle. The multi-section shock absorber 680 can be associated with a rear passenger side wheel of a vehicle. The common center multi-section shock absorber 665 can balance and distribute the shock between the multi-section shock absorber 655 and the multi-section shock absorber 680. The common center multi-section shock absorber 670 can balance and distribute the shock between the multi-section shock absorber 660 and the multi-section shock absorber 675.

Stock shock mounts (e.g., 685) can be used, which simplifies the connections between the multi-section shock absorbers and the vehicle. It is also easier to install the system 602 of FIG. 6B as an after-market retrofitted system to an already-manufactured vehicle. The system engineering of a vehicle can be considerably simplified when using the system 602 relative to the purely mechanical system 600.

FIGS. 7A and 7B illustrate an example multi-section shock-linked system 700 in accordance with various embodiments of the present inventive concept. Mechanical linkages can be replaced with transfer tubes (e.g., 120, 125), which can transfer hydraulic liquid or a gas such as air or nitrogen. The transfer receptacles (e.g., 140) can compress and depress a damping substance, which can be shared among multiple multi-section shock absorbers (e.g., 705, 710, and 715). The damping substance can be a hydraulic fluid or a gas such as air or nitrogen. The multi-section shock absorber 705 can be connected to a front upper A-arm (e.g., 720) of the vehicle frame. The multi-section shock absorber 715 can be connected to a rear trailing arm (e.g., 725) of the vehicle frame. The multi-section shock absorber 710 can be a center balance shock absorber. FIG. 7A shows the multi-section shock absorbers (e.g., 705, 710, and 715) in a first configuration. FIG. 7B shows the multi-section shock absorbers (e.g., 705, 710, and 715) in a second configuration. In the first configuration shown in FIG. 7A, mechanical linkages can be replaced with hydraulic cylinders. In the second configuration shown in FIG. 7B, the hydraulic cylinders can be integrated with the mechanical shock absorbers.

When an individual wheel shock absorber is compressing, it can be compressing a shock absorber that is arranged in series to it, and lifting a parallel shock absorber, which can have a similar or same outcome as the purely mechanical system. Accordingly, the function of a shock absorber can be changed. The shock absorber can still retain the original function of supporting the weight of the vehicle with springs, and damping movement with valving and fluid, but the system of FIGS. 7A and 7B is improved over conventional approaches in several ways. For example, the amount of travel that the individual wheel shock absorber is responsible for can be reduced. In addition, an energy transfer section can be provided to allow another shock absorber to be responsible for the remainder of wheel movement in addition to affecting the position of another individual wheel shock absorber, thereby allowing the shock absorber receiving the initial impact to have its position affected by another individual wheel shock absorber. The multi-section shock-linked system 700 can direct how the shock absorbers play with (i.e., affect) each other.

FIG. 8A illustrates the integration of multiple multi-section shock-linked shock absorbers 805 into a compact multi-section floating shock absorber 810 in accordance with various embodiments of the present inventive concept. FIG. 8B illustrates four compact multi-section floating shock-linked shock absorbers (e.g., 810*a*, 810*b*, 810*c*, and 810*d*) configured in a floating shock-linked system 800 in accordance with various embodiments of the present inventive concept. Reference is now made to FIGS. 8A and 8B.

The compact multi-section floating shock absorber (e.g., 810) can further refine and compact multi-section shock absorbers by integrating the function of the shared shocks with existing individual wheel shock absorbers. The result is a more complex shock absorber 810, but with space savings since only four shock absorbers total can be used with a vehicle, and with all the functional capability and more, compared with a purely mechanical four-wheel four-shock system. The compact multi-section floating shock absorber 810 also reduces the complexity of the whole system by reducing the number of hydraulic sleeves, hoses, and shock absorbers. The compact multi-section floating shock absorber 810 can enable the use of spring or reflex rates similar to each other rather than the approximately 10 times (or more) difference in spring or reflex rates that are possible in the seven-shock-linked system.

In the system 800 using compact multi-section floating shock absorbers (e.g., 810*a*, 810*b*, 810*c*, and 810*d*), the capabilities of the balance shocks are spread across the four shock absorbers (e.g., 810*a*, 810*b*, 810*c*, and 810*d*). Some or all of the functionality of the original mechanical cross-linked system (e.g., 305) and the multi-section shock-linked system (e.g., 310) described above can be retained, thereby providing the capability to lower or raise the ride height of the vehicle if so desired. The function of the individual wheel shock absorber section 105 can be maintained, which can operate as a "normal" shock absorber, but it can be in series with either one or two other transfer receptacles 110 depending on the layout. The individual wheel shock absorber section 105 can be the only shock absorber in the series with the valving. The other "shock absorber" sections 110 may not be shock absorbers in one sense of the word. They can be shock links with a spring. There need not be valving inside the transfer receptacle 110 itself as the shock absorbers can move in sync with their related shock links. To provide sufficient damping, a valve (e.g., 820) can be included in-line with the fluid or air flow through the transfer tubes (e.g., 825). One or more valves (e.g., 815) can be located internal to the section 105 of each of the compact multi-section floating shock absorbers (e.g., 810*a*, 810*b*, 810*c*, and 810*d*). Alternatively or in addition, one or more of these valves (e.g., 815, 820) can be located anywhere along the flow path of the related transfer tube links (e.g., 825). Either compression valving or rebound valving, or both, can be used.

FIG. 9A illustrates an example multi-section seven-shock-linked system 900 in accordance with various embodiments of the present inventive concept. FIG. 9B illustrates parts of the multi-section shock-linked system 900 that functionally correspond to the multi-section seven-shock-linked system 900 of FIG. 9A in accordance with various embodiments of the present inventive concept. Reference is now made to FIGS. 9A and 9B.

In FIG. 9B, individual components that are functionally equivalent to the multi-section shock-linked system 900 are shown in an exploded view and arranged into four columns. FIGS. 9A and 9B are shown side-by-side to illustrate that the components of the multi-section seven-shock-linked system 900 of FIG. 9A can be represented as multiple functionally equivalent components arranged into columns. As shown in FIG. 9B, instead of a single multi-section shock absorber 905 in the "parent section" as shown in FIG. 9A, there can be four components 910 that can share a single valve 915. With one valve 915 shared, the four components 910 can move in sync (i.e., synchronously). For example, one spring that absorbs 100% of the weight of the vehicle can be divided into four springs at 25% each. In the middle "child/parent section," one valve (e.g., 925) can be shared in pairs (e.g., 930), with each pair of components (e.g., 930) moving in sync diagonally. Two springs that absorb 50% of the vehicle weight can be divided into four at 25% each. In the "child section," one valve (e.g., 935) can be associated with each shock absorber (e.g., 945). Each shock absorber (e.g., 945) can move independently of the other shock absorbers, and springs can stay at 25% of the vehicle weight. The term "spring" may be used in an illustrative manner to express relative reflex and distribution of vehicle weight among the various shock absorbers.

Figure 10:
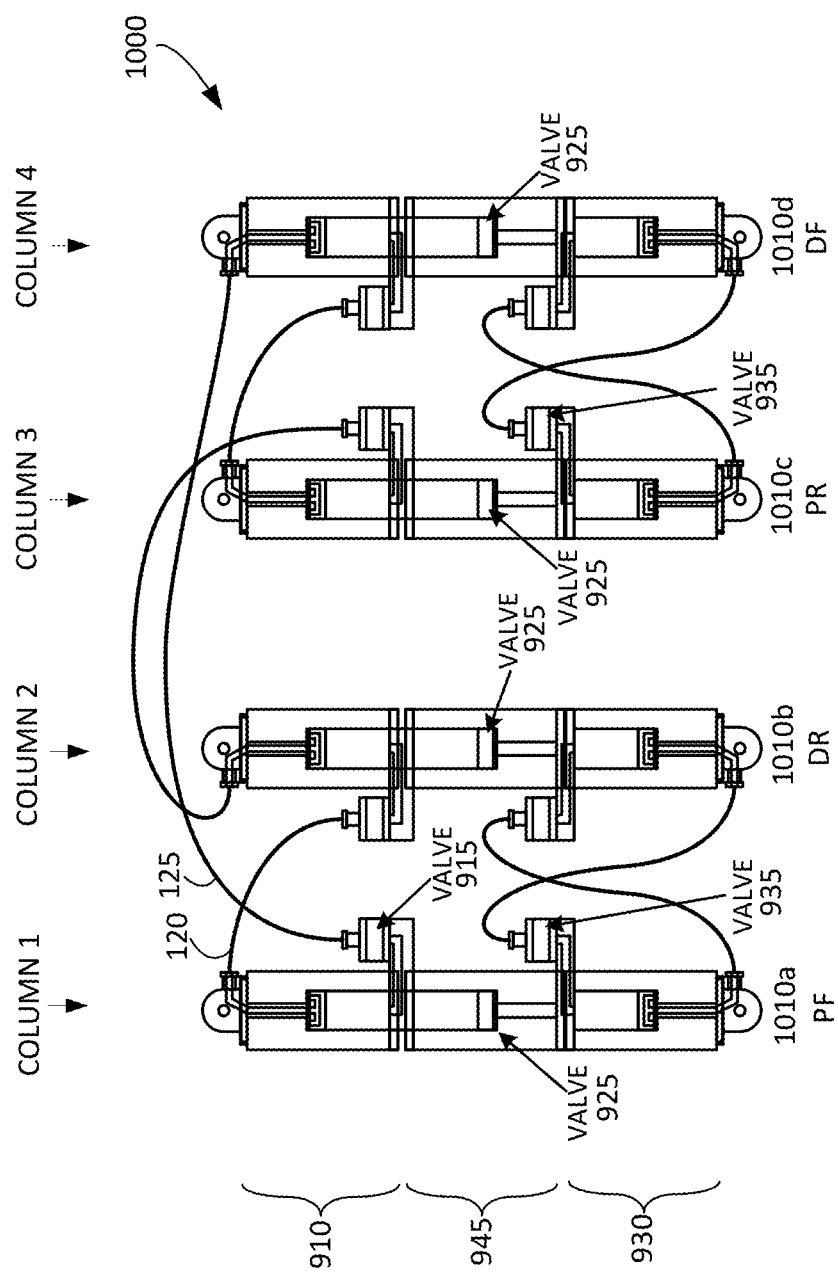
FIG. 10 illustrates four compact multi-section floating shock-linked shock absorbers corresponding to the four columns of parts shown in FIG. 9B, in an assembled multi-section floating shock-linked system in accordance with various embodiments of the present inventive concept.

FIG. 10 illustrates four compact multi-section floating shock-linked shock absorbers (e.g., 1010a, 1010b, 1010c, and 1010d) corresponding to the four columns of parts shown in FIG. 9B, in an assembled multi-section floating shock-linked system 1000 in accordance with various embodiments of the present inventive concept. As shown in FIG. 10, the four columns of FIG. 9B can be combined into four compact multi-section floating shock absorbers (e.g., 1010a, 1010b, 1010c, and 1010d). One of the compact multi-section floating shock absorbers 1010a can be associated with the PF wheel, another 1010b with the DR wheel, another 1010c with the PR wheel, and another 1010d with the DF wheel.

The four upper shock absorber sections 910 can share a single valve 915. Each of the shock absorber sections 945 can have its own valve (e.g., 925). The middle section of shock absorber sections 945 can handle individual wheel movement. Each pair of shock absorber sections 930 can share a single valve (e.g., 935). The compact multi-section floating shock absorber 1010a can include, for example, the valves 915, 925, and 935. The compact multi-section floating shock absorber 1010b can include a single valve 925. The compact multi-section floating shock absorber 1010c can include a valve 925 and a valve 935. The compact multi-section floating shock absorber 1010d can include a single valve 925. The compact multi-section floating shock absorbers (e.g., 1010a, 1010b, 1010c, and 1010d) can be connected to each other using transfer tubes (e.g., 120, 125). The valving (e.g., 915, 925, and 935) and transfer tubes (e.g., 120, 125) can function in tandem to distribute shock impacts received from wheels of a vehicle among the compact multi-section floating shock absorbers (e.g., 1010a, 1010b, 1010c, and 1010d).

Figure 11B:
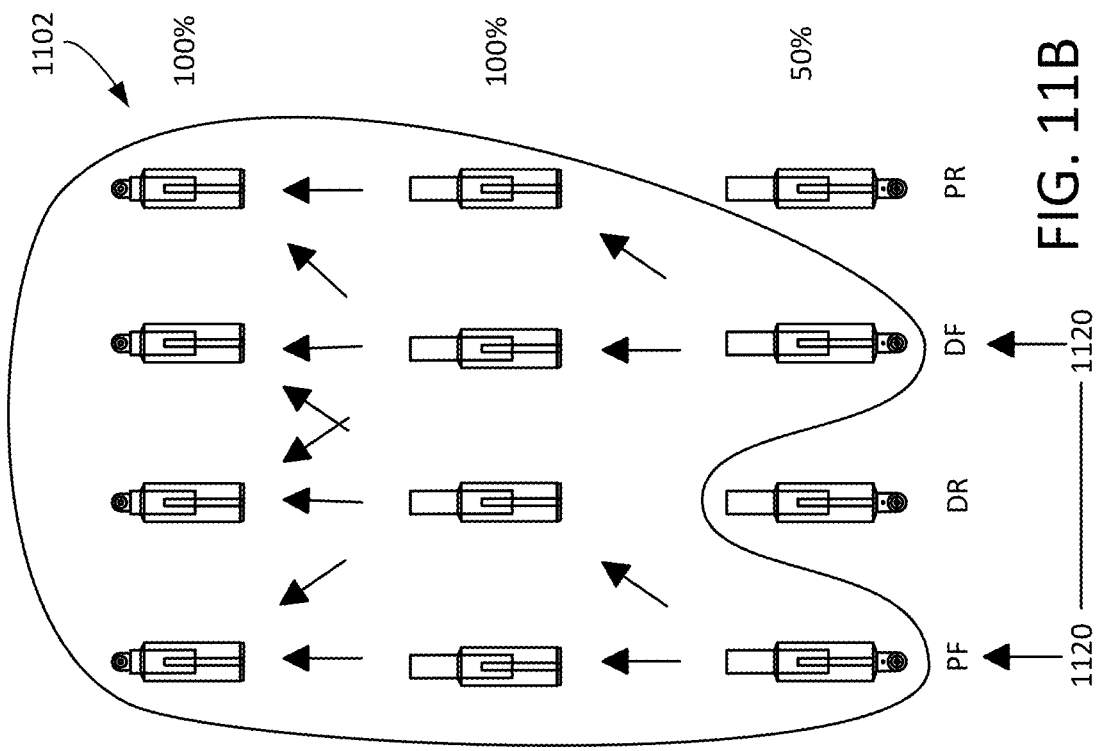
FIGS. 11A and 11B illustrate force diagrams with varying tire impacts for a four-wheel vehicle in accordance with various embodiments of the present inventive concept.
Figure 11A:
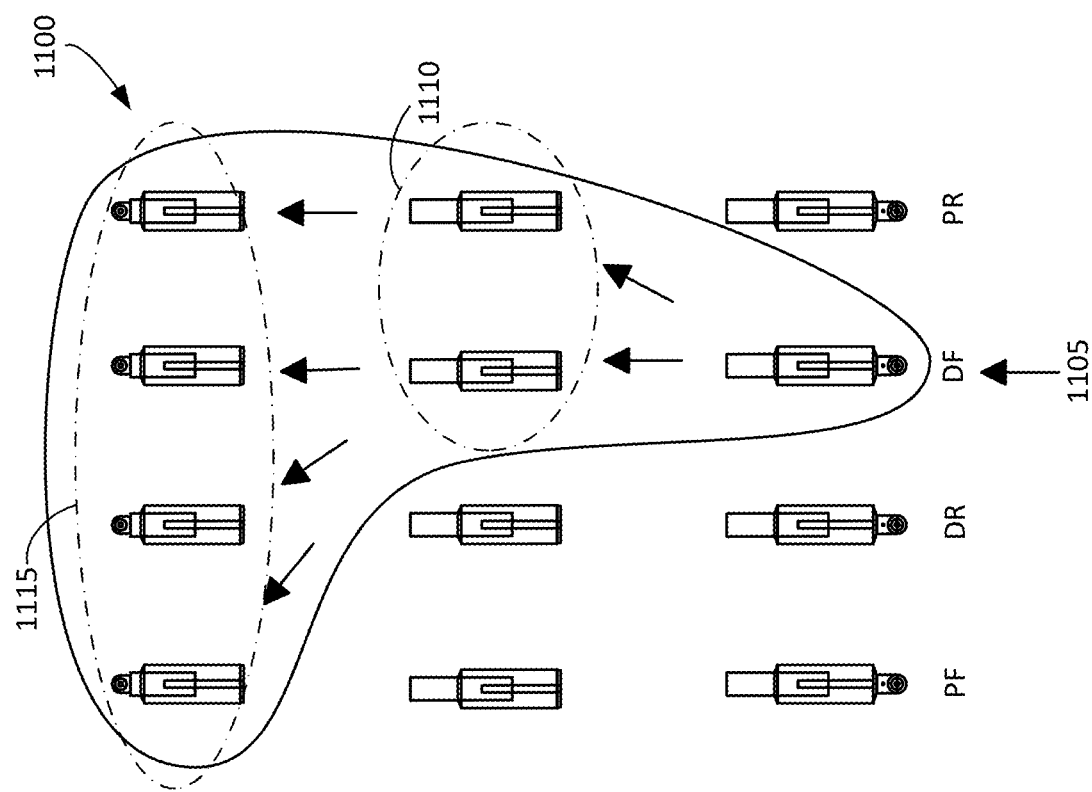

FIGS. 11A and 11B illustrate force diagrams (e.g., 1100, 1102) with varying tire impacts for a four-wheel vehicle in accordance with various embodiments of the present inventive concept. As shown in FIG. 11A, with the impact of one tire (i.e., DF wheel 1105), there can be increasing spring resistance, going from 25% at the DF wheel (e.g., 1105), to 50% in the middle shock absorber components (e.g., 1110), then to 100% in the top shock absorbers (e.g., 1115).

Conventionally, this would be 25%, 25%, 25%. Conventionally, in order to provide for heavy resistance, comfort is often sacrificed, and in order to provide for additional comfort, resistance must be sacrificed.

Embodiments disclosed herein provide increasing spring or reflex resistance, which conserves the energy and controls the release of the energy through rebound valving, the strength of which can be tied into each level of shock control to match the spring or reflex strength (i.e., 25%, 50%, 100%). This has the added benefit of enabling the wheel to stay in contact with the ground regardless of how deep into the stroke the wheel is. The wheel is not over-sprung or over-damped. Accordingly, both comfort and heavy resistance is simultaneously achieved.

In order for a conventional vehicle to be able to "see" up to 100% resistance on one wheel, it would have to be over-sprung 400% (100%×4 wheels). Conventional vehicles lack the ability to balance the load as needed to the wheel that needs it. By way of another example, as shown in FIG. 11B, with an impact to two front tires of the vehicle (e.g., 1120), increasing spring or reflex resistance is achieved: 50%, 100%, and 100%. Conventionally, the spring or reflex resistance is 50%, 50%, and 50%.

Figure 12B:
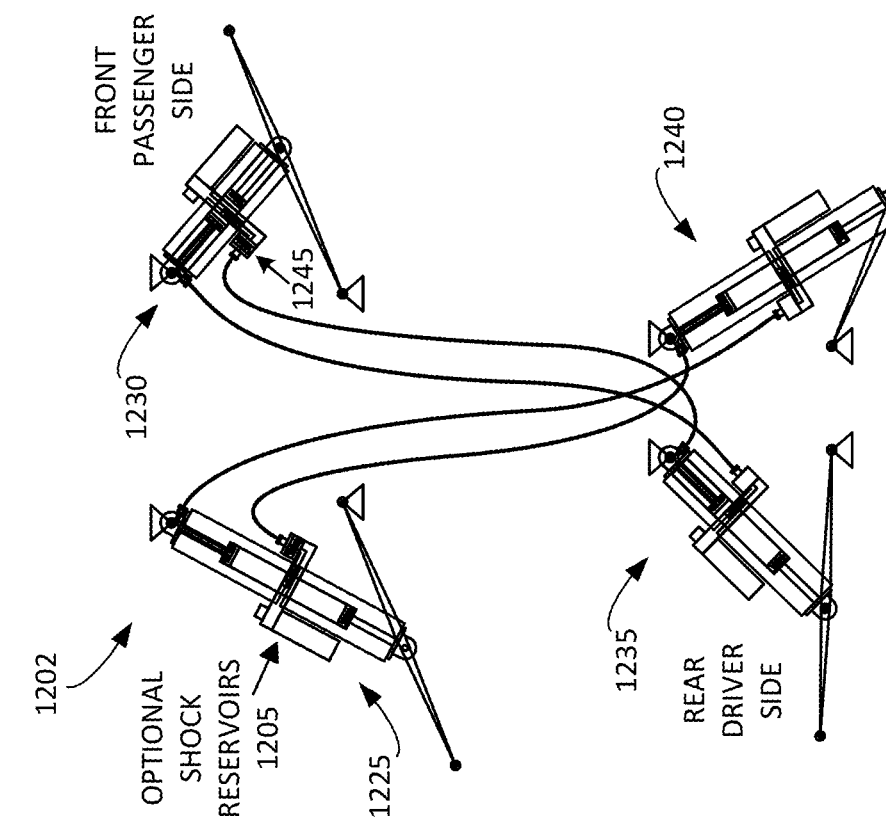
FIGS. 12A and 12B illustrate an example multi-section six-shock-linked system and an example compact multi-section floating four-shock-linked system, respectively, in accordance with various embodiments of the present inventive concept.
Figure 12A:
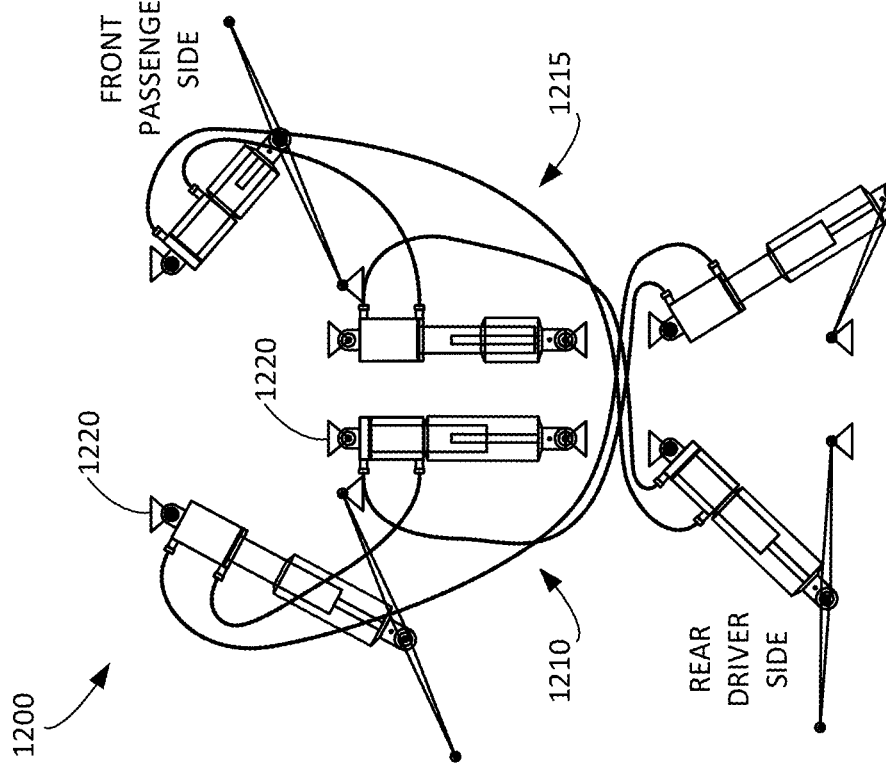

FIGS. 12A and 12B illustrate an example multi-section six-shock-linked system 1200 and an example compact multi-section floating four-shock-linked system 1202, respectively, in accordance with various embodiments of the present inventive concept. The shock reservoirs 1205 shown in FIG. 12B are optional. The shock reservoirs 1205 can absorb additional shock that may be transferred to the shock absorbers. The shock reservoirs 1205 can receive and hold hydraulic fluid and/or gas, for example. The system 1200 of FIG. 12A is slightly more expensive than a purely mechanical system, but it uses much less space. Freedom to locate center shocks (e.g., 1210, 1215) anywhere on the vehicle is afforded. In addition, stock mounts (e.g., 1220) can be used, which makes attaching to a vehicle easy, even in an after-market retrofitting fashion. The compact system 1202 of FIG. 12B eliminates center shocks, and uses much less space than other embodiments disclosed herein. The compact multi-section floating shock absorbers (e.g., 1225, 1230, 1235, and 1240) can sit in normal places and be attached to the vehicle in normal ways. After-market installation becomes extremely simple. The overall vehicle system engineering is simplified, and the enhancements provided may not be visually obvious, thereby making the aesthetics more sleek and subtle while gaining significant performance. Valves (e.g., 1245) can be mounted in locations that are convenient to the user of the vehicle.

Figure 13A:
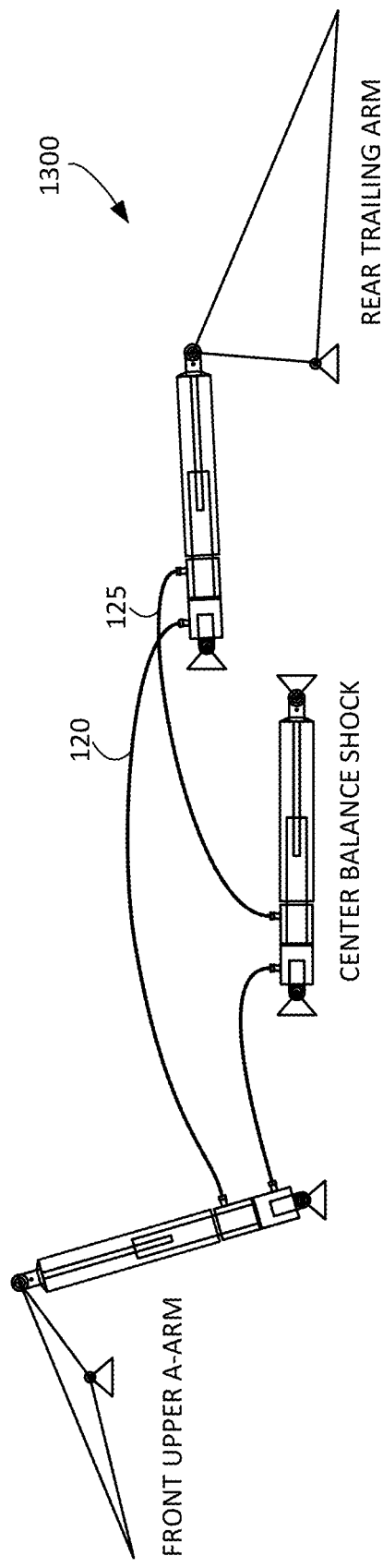
FIGS. 13A and 13B illustrate an example multi-section shock-linked system and an example compact multi-section floating shock-linked system, respectively, in accordance with various embodiments of the present inventive concept.
Figure 13B:
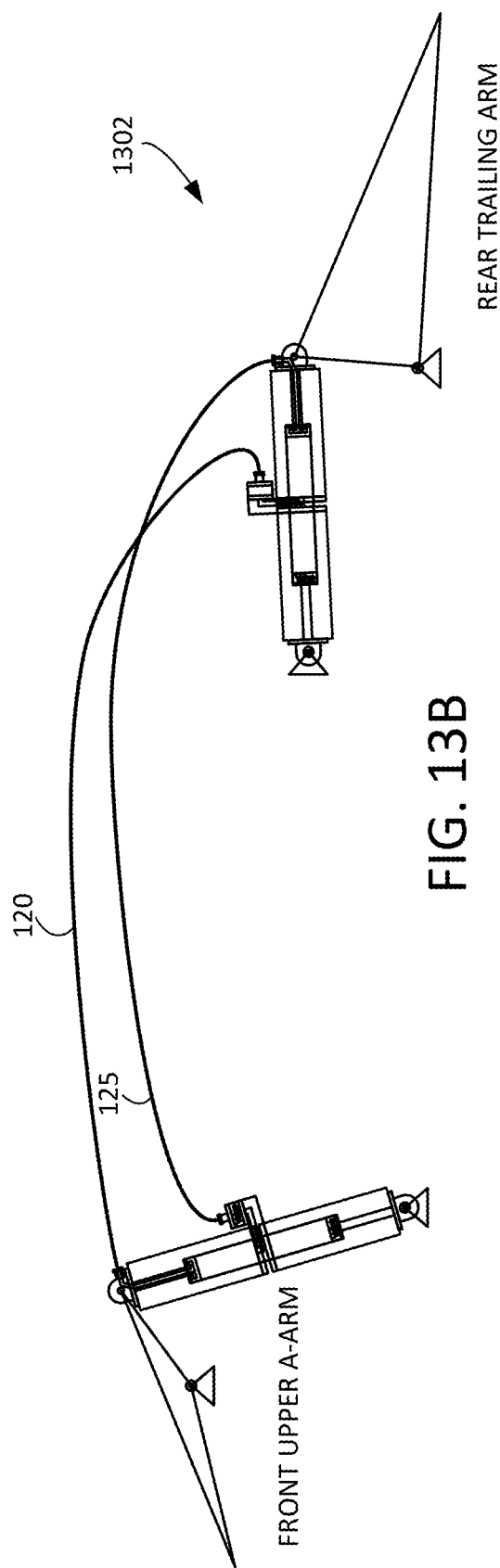

FIGS. 13A and 13B illustrate an example multi-section shock-linked system 1300 and an example compact multi-section floating shock-linked system 1302, respectively, in accordance with various embodiments of the present inventive concept. As can be seen in the compact multi-section floating shock-linked system 1302 of FIG. 13B, a center balance shock absorber is not needed. The linked shock absorbers using transfer tubes (e.g., 120, 125) as disclosed herein provides increasing resistance and balancing, as shock absorbers in series can use the available spring or reflex as if it is one stack. Alternate embodiments include a simplification in which a dual or triple shock absorber configuration can be used with either the multi-section shock-linked system 1300 or the compact multi-section floating shock-linked system 1302.

Figure 14:
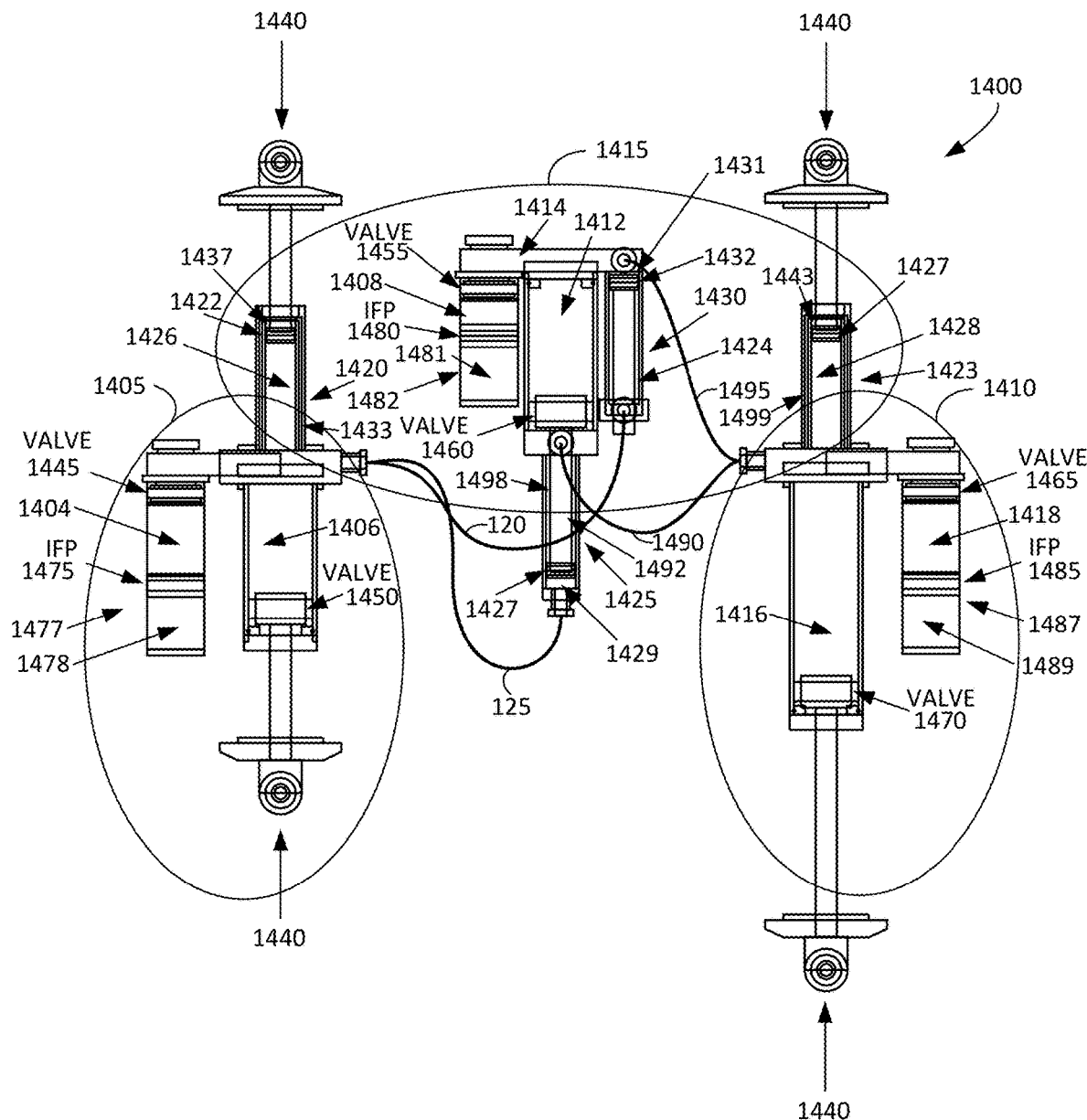
FIG. 14 illustrates a multi-section spring-separated, cylinder-separated, valve-separated shock-linked system in accordance with various embodiments of the present inventive concept.

FIG. 14 illustrates a multi-section spring-separated, cylinder-separated, valve-separated shock-linked system 1400 in accordance with various embodiments of the present inventive concept. Individual shock absorbing sections 1405 and 1410 can each independently absorb shocks originating from a wheel and/or tire. In other words, the individual shock absorbing sections 1405 and 1410 can each handle an independent action of an associated wheel and/or tire. The individual shock absorbing sections 1405 and 1410 can be located diagonally across from each other on the vehicle. For example, if one (e.g., 1405) of the individual shock absorbing sections is associated with a driver front wheel, the other (e.g., 1410) can be associated with a passenger rear wheel. In this example, the force transfer can be a hydraulic link sized to transfer the force to a valving assembly 1415. The hydraulic fluid and/or gas can be transferred via transfer tubes (e.g., 120, 125). The valving assembly 1415 can be located anywhere between the two wheels. In some embodiments, the valving assembly 1415 can be located close to the driver in the cockpit of the vehicle to enable real time adjustments to cross-linked valving of the valving assembly 1415.

The system 1400 can include a force ram cylinder 1420. The force ram cylinder 1420 can include a piston 1422. The force ram cylinder 1420 may not move sufficient fluid to be properly damped. Accordingly, a volume conversion cylinder 1425 can convert force and/or movement to a piston 1427 and/or valve stack movement, with sufficient diameter to move the hydraulic fluid while simultaneously transferring the force of the shock associated with the individual shock absorbing section 1405 to the diagonal individual shock absorbing section 1410. The system 1400 can include a volume conversion cylinder 1430 to match a stroke of the force ram cylinder 1420. The volume conversion cylinder 1430 can include a piston 1432.

The system 1400 can include valve 1445, valve 1450, valve 1455, valve 1460, valve 1465, and/or valve 1470. The volume of hydraulic liquid displaced by the force ram cylinder 1420, the volume conversion cylinder 1425, and the volume conversion cylinder 1430 can be twice the amount as the respective shaft 1440. This tension or shock dampening can be changed for desired response by the driver of the vehicle by adjusting the valving of the valve 1445, valve 1450, valve 1455, valve 1460, valve 1465, and/or valve 1470. There can be different kinds of valves and abilities to adjust valves. For example, a valve stack (e.g., inside of a cylinder) can be adjustable by disassembly. A reservoir valve can have an adjustment knob, and can be externally adjustable at a wheel. Another type of valve is a separated valve for cross-link functionality, which can be located next to a driver of the vehicle, and can be adjusted as needed before, during, or after driving the vehicle.

The system 1400 can include internal floating pistons (IFPs) 1475, 1480, and/or 1485. An IFP is similar to a piston (e.g., 1422) of a force ram cylinder (e.g., 1420). An IFP need not be colinear with the shaft (e.g., 1440). Each of the IFPs 1475, 1480, and/or 1485 can separate gas from fluid. In some embodiments, each of the IFPs 1475, 1480, and/or 1485 can separate fluid from fluid. In some embodiments, each of the IFPs 1475, 1480, and/or 1485 can separate fluid from gas. In some embodiments, each of the IFPs 1475, 1480, and/or 1485 can separate gas from gas. The IFP 1475 can be enclosed in a reservoir cylinder 1477. The IFP 1485 can be enclosed in a reservoir cylinder 1487. The IFP 1480 can be enclosed in a reservoir cylinder 1482.

Enclosed spaces 1404 and 1406 can hold and/or transfer a first hydraulic fluid and/or gas. A large amount of hydraulic fluid or gas (e.g., 90%) can travel through the valve 1450. The remaining hydraulic fluid or gas (e.g., 10%) can be pushed into the enclosed space 1404 of the reservoir cylinder 1477. A gas such as nitrogen can occupy an enclosed space 1478 of the reservoir cylinder 1477.

The reservoir cylinder 1487 and the IFP 1485 can function in a similar fashion, with their own hydraulic fluid or air. The enclosed space 1416 and the enclosed space 1418 can hold and/or transfer its own hydraulic fluid or air, through the valve 1470 and the valve 1465. The enclosed space 1489 can hold a gas such as nitrogen.

Moreover, the reservoir cylinder 1482 and the IFP 1480 can function in a similar fashion, with their own hydraulic fluid or air. The enclosed space 1412, the enclosed space 1414, and the enclosed space 1408 can hold and/or transfer its own hydraulic fluid or air, through the valve 1460 and the valve 1455. The enclosed space 1481 can hold a gas such as nitrogen.

Enclosed space 1426, transfer tube 125, and enclosed space 1429 can hold and/or transfer their own hydraulic fluid and/or gas. Enclosed space 1492, transfer tube 1490, and enclosed space 1443 can hold and/or transfer their own hydraulic fluid and/or gas. Enclosed space 1428, transfer tube 1495, and enclosed space 1431 can hold and/or transfer their own hydraulic fluid and/or gas. Enclosed space 1424, transfer tube 120, and enclosed space 1437 can hold and/or transfer their own hydraulic fluid and/or gas.

For example, when a wheel associated with the shaft 1440 experiences a shock or impact, hydraulic fluid or gas can be pushed by the piston 1422 through the enclosed space 1426 of the force ram cylinder 1420, into the transfer tube 125, into a space beneath the piston 1427 of the volume conversion cylinder 1425, thereby pushing up on the piston 1427. The piston 1427 can push hydraulic fluid or gas through the volume conversion cylinder 1425 into the transfer tube 1490. An amount of unit travel of the piston 1422 can correspond directly to an amount of unit travel of the piston 1427. However, a smaller amount of hydraulic fluid or gas can be pushed into the transfer tube 1490 than what enters through the transfer tube 125.

In some embodiments, one half of an amount of hydraulic fluid or gas can be pushed into the transfer tube 1490 relative to what enters through the transfer tube 125. This ratio can be dependent on a diameter and/or length of a shaft 1498 in the volume conversion cylinder 1425. The hydraulic fluid or gas can be pushed from the transfer tube 1490 into a sidewall channel 1499 of a force ram cylinder 1423, pushing down on a piston 1427. The hydraulic fluid or gas displaced by the piston 1427 can be pushed into the transfer tube 1495 into the enclosed space 1431, pushing down on the piston 1432. The hydraulic fluid or air displaced by the piston 1432 can be pushed into the transfer tube 120.

The amount of hydraulic fluid or gas being pushed into the transfer tube 120 from the volume conversion cylinder 1430 can be substantially equal to the amount of hydraulic fluid or gas being pushed from the transfer tube 125 into the volume conversion cylinder 1425. The hydraulic fluid or gas that exits the transfer tube 120 can enter a sidewall channel 1433 of the force ram cylinder 1420, travelling up the channel and pushing down on the piston 1422. When a different wheel associated with a shaft 1441 experiences a shock or impact, the hydraulic fluid or air can travel in an opposite direction.

In addition, the piston 1427 can push the valve 1460 via the shaft 1498, thereby allowing for the valve 1460 to pass through sufficient hydraulic fluid or gas to provide damping forces. This damping can be for cross-linked functionality, and the volume conversion cylinder 1425 can convert the transfer force to a damping force for that assembly. For example, the volume conversion cylinder 1425 can send the force by way of the hydraulic fluid or gas on to the force ram cylinder 1423.

Figure 15:
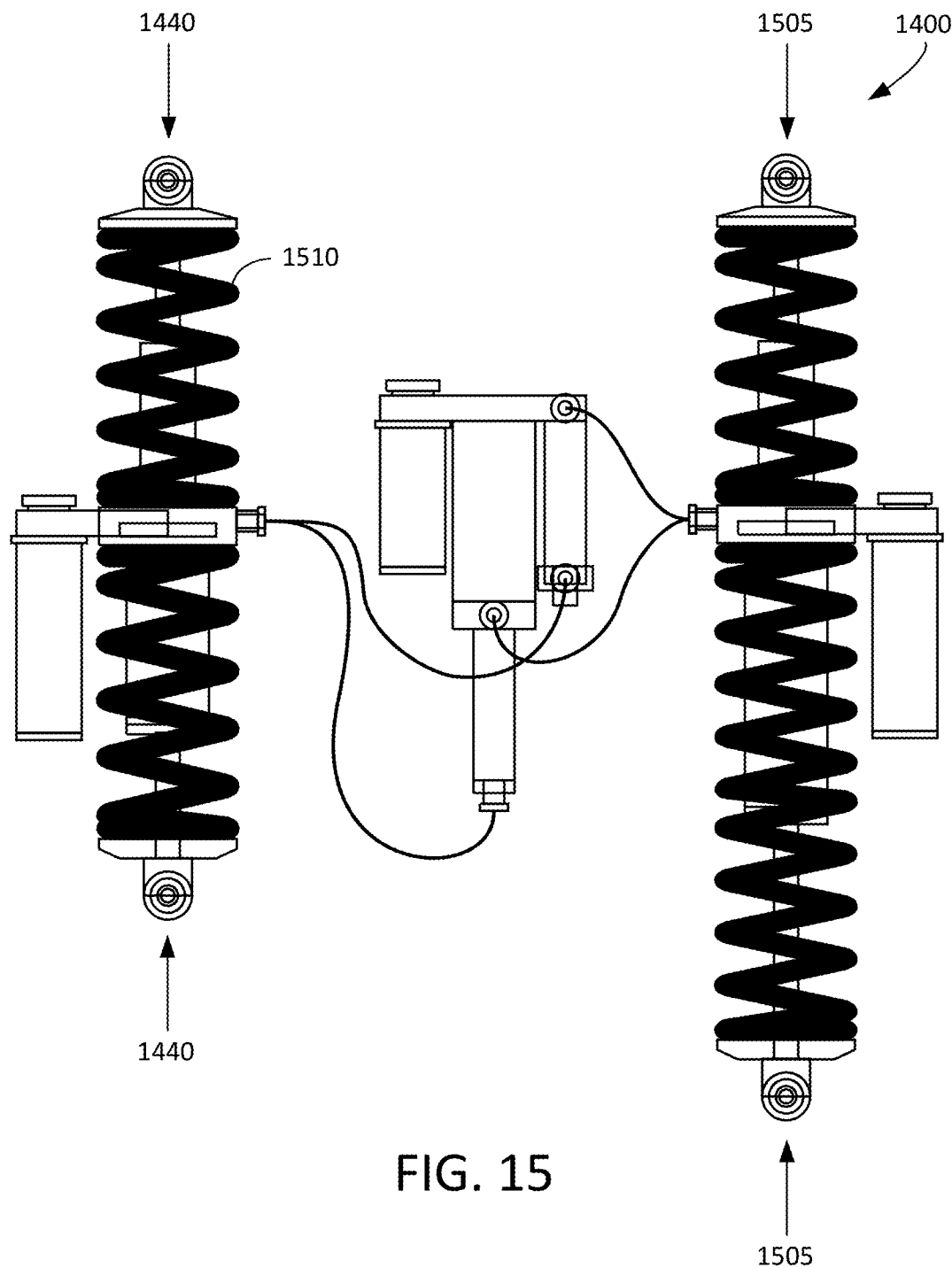
FIG. 15 illustrates the system of FIG. 14 with springs located on each of the shafts in accordance with various embodiments of the present inventive concept.

FIG. 15 illustrates the system 1400 of FIG. 14 with springs (e.g., 1510) located on each of the shafts 1440 and 1505 in accordance with various embodiments of the present inventive concept. Reference is now made to FIGS. 14 and 15. The system 1400 can be a spring-separated system because each of the sections 1405, 1410, and 1415 can include their own dedicated spring or reflex stack. The system 1400 can be a cylinder-separated system because each of the sections 1405, 1410, and 1415 can include their own dedicated cylinders (e.g., 1477, 1420, 1425, 1482, 1430, 1487, etc.). The system 1400 can be a valve-separated system because the valve 1455 and the valve 1460 are separate from the individual shock absorbing sections 1405 and 1410. The system 1400 is advantageous because it provides a reduction in the amount of hydraulic fluid and/or gas flowing through the connecting transfer tubes (e.g., 120, 125) between the individual shock absorbing sections 1405 and 1410.

Systems disclosed herein (e.g., 1400) can include a spring-separated system. In a three-shock absorber group where two shock absorbers are parallel to each other, and the pair are in series with a third shock absorber, each shock absorber can have its own spring set. When the shock absorbers are reduced to a two-shock absorber system, but with the same or similar functionality, even though springs can exist only on the two corner shocks, the springs can be separated by function. There can be springs specific to the individual action of the wheel for which they are assigned. Alternatively, there can be springs assigned to a cross-linked function using valving, for example. In some embodiments, a cross-linked function only happens when the related springs are compressed regardless of what the individual springs are doing.

Systems disclosed herein (e.g., 1400) can include a cylinder-separated system. In a three-shock group where two shock absorbers are parallel to each other, and the pair are in series with a third shock absorber, each shock absorber can have its own cylinder within which the main valving can reside. When the shock absorbers are reduced to two shock absorbers, but with the same or similar functionality, this can create additional functionality for the two remaining shock absorber cylinders. The system mounted in a normal location as a standard shock absorber may now have to also transfer force to another shock absorber in addition to handling the individual movement of the wheel to which it is assigned. This can be done with a cylinder-separated system on the same shaft axis. One cylinder can handle the individual movement, while the other cylinder can work in conjunction with the respective cylinder associated with the other parallel shock absorber. The pair of cylinders can form a cross-linked relationship allowing both wheels to move in the same direction as influenced by the other connected wheel.

Systems disclosed herein (e.g., 1400) can include one or more force ram cylinders, which can provide positive or negative pressure. The systems disclosed herein generally show a dual-positive pressure system. In an alternative embodiment, the systems can include a single line that provides negative pressure (e.g., vacuum) in order to transfer force. In some embodiments, a single line can provide both positive and negative pressure.

Systems disclosed herein (e.g., 1400) can include one or more valves. In a three-shock group where a pair of two shock absorbers are in parallel to each other, and the pair are in series with a third shock absorber, each shock absorber can have its own one or more valves. When the shock absorbers are reduced to a two-shock system, but with the same or similar functionality, this can create a need to locate the valving for the cross-linked function either within the individual shock absorber body, or as a separate unit. As an integrated unit within the shock absorber body, the main valving can flow the same amount of hydraulic fluid and/or gas as it would need to flow as a separate shock absorber unit. In order to control the shock movement either in compression or droop, one or more valves can be placed in the cylinder.

Given that the cross-linked function can not only dampen the fluid, but transfer force, the main stack need not be attached to the end of the shaft in the main cylinder. In some embodiments, the transfer of hydraulic fluid and/or gas is not allowed past the piston in order for it to transfer force. The cross-linked system can include the valving in-line with the movement of fluid and/or gas in the cylinder, next to the cylinder such as in a shock reservoir, and/or in a remote location anywhere in-between the two connected shock absorbers. Alternatively, the cross-linked section of the shock absorber can be simply a hydraulic ram to transfer the force. In this case, at a point in-between the two shock absorber units, a valve transfer receptacle can be in place to convert the force transfer volume to cross-linked valving volume, then back gain to a force volume to finish the transfer of force from one shock absorber unit to the other.

Figure 16:
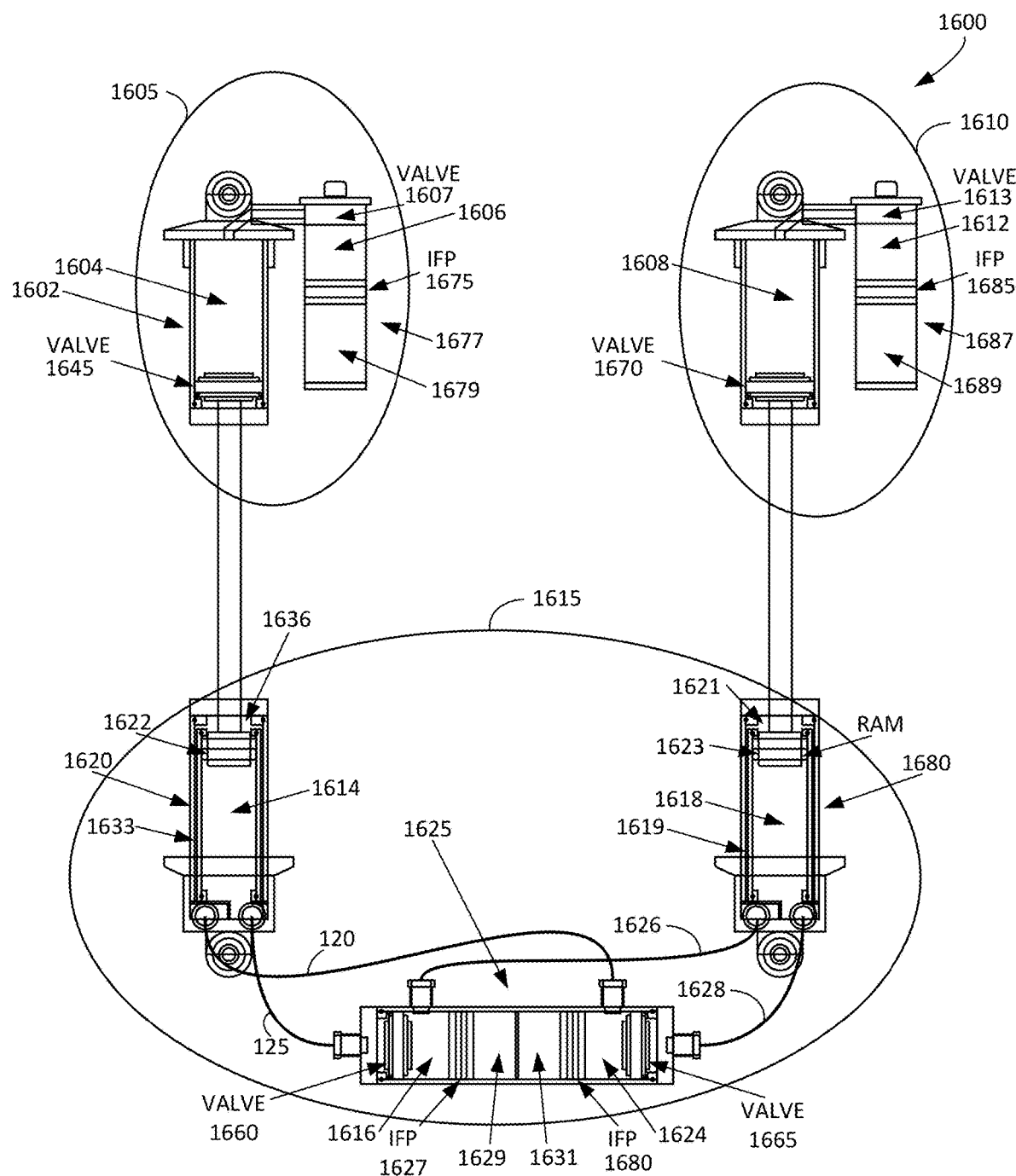
FIG. 16 illustrates a multi-section spring-combined, cylinder-separated, valve-separated shock-linked system in accordance with various embodiments of the present inventive concept.
Figure 17:
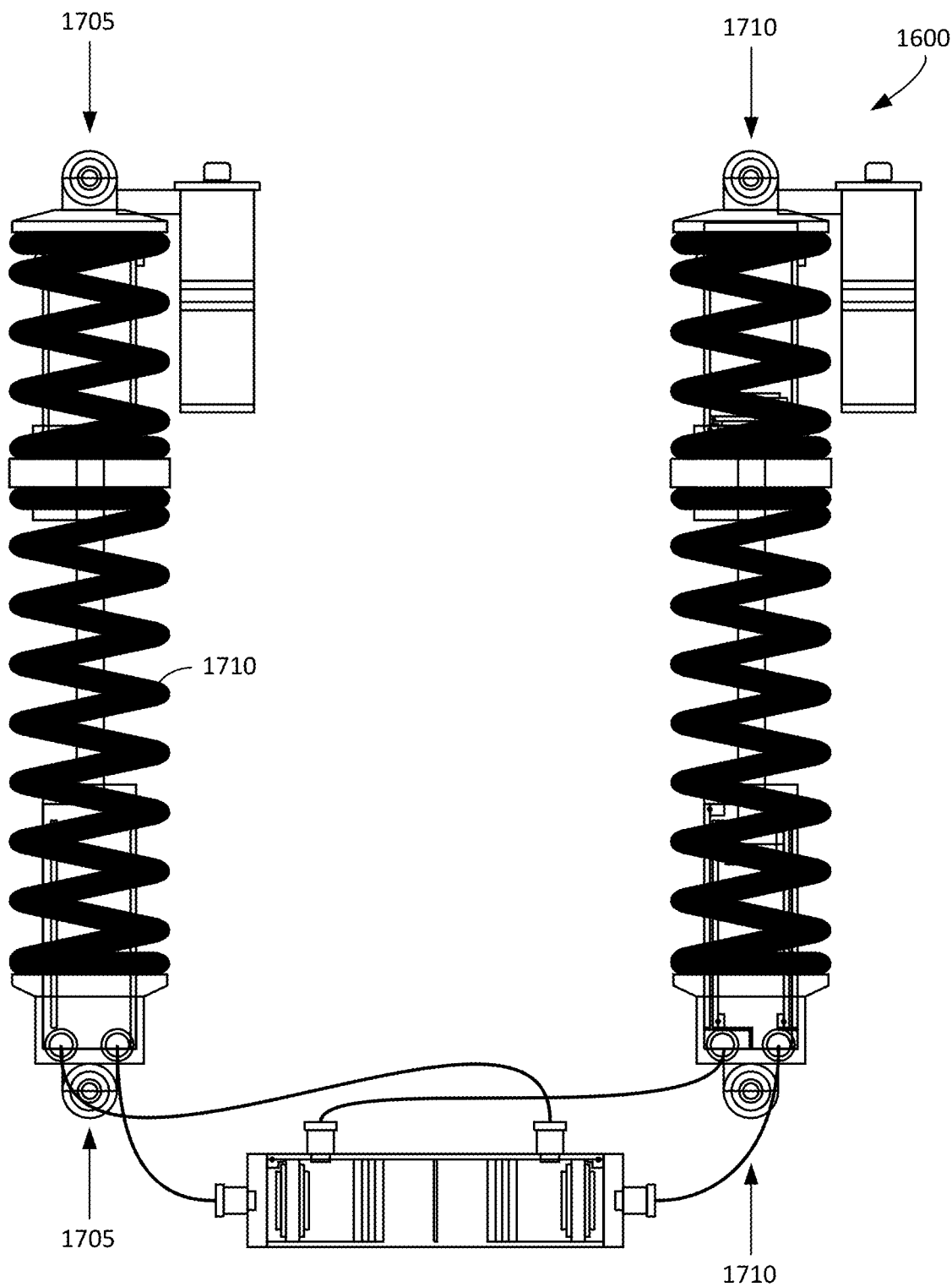
FIG. 17 illustrates the system of FIG. 16 with springs located on each of the shafts in accordance with various embodiments of the present inventive concept.

FIG. 16 illustrates a multi-section spring-combined, cylinder-separated, valve-separated shock-linked system 1600 in accordance with various embodiments of the present inventive concept. FIG. 17 illustrates the system 1600 of FIG. 16 with springs (e.g., 1710) located on each of the shafts 1705 and 1710 in accordance with various embodiments of the present inventive concept. Reference is now made to FIGS. 16 and 17.

The system 1600 can include individual shock absorbing sections 1605 and 1610, which can each independently absorb shocks originating from a wheel and/or tire. In other words, the individual shock absorbing sections 1605 and 1610 can each handle an independent action of an associated wheel and/or tire. The individual shock absorbing sections 1605 and 1610 can be located diagonally across from each other on the vehicle. For example, if one (e.g., 1605) of the individual shock absorbing sections is associated with a driver front wheel, the other (e.g., 1610) can be associated with a passenger rear wheel. In this example, the force transfer can be a hydraulic link sized to transfer the force to a valving assembly 1625 of a shock absorbing section 1615. The hydraulic fluid and/or gas can be transferred via transfer tubes (e.g., 120, 125).

The valving assembly 1625 can be located anywhere between the two wheels. In some embodiments, the valving assembly 1625 can be located close to the driver in the cockpit of the vehicle to enable real time adjustments to cross-linked valving of the valving assembly 1625. The system 1600 can include a force ram cylinder 1620. The force ram cylinder 1620 can include a piston 1622.

The force ram cylinder 1620 can move sufficient fluid to be properly damped. For example, the valving assembly 1625 can damp fluid flow via the valve stack (e.g., 1660, 1665), with sufficient diameter to damp the hydraulic fluid while simultaneously transferring the force of the shock associated with the individual shock absorbing section 1605 to the diagonal individual shock absorbing section 1610.

The system 1600 can include valve 1645, valve 1607, valve 1660, valve 1665, valve 1670, and/or valve 1613. The tension or shock dampening can be changed for desired response by the driver of the vehicle by adjusting the valving. There can be different kinds of valves and abilities to adjust valves. For example, a valve stack (e.g., inside of a cylinder) can be adjustable by disassembly. A reservoir valve can have an adjustment knob, and can be externally adjustable at a wheel. Another type of valve is a separated valve for cross-link functionality, which can be located next to a driver of the vehicle, and can be adjusted as needed before, during, or after driving the vehicle.

The system 1600 can include internal floating pistons (IFPs) 1675, 1627, 1680, and/or 1685. Each of the IFPs 1675, 1627, 1680, and/or 1685 can separate gas from fluid. In some embodiments, each of the IFPs 1675, 1627, 1680, and/or 1685 can separate fluid from fluid. In some embodiments, each of the IFPs 1675, 1627, 1680, and/or 1685 can separate gas from gas. The IFP 1675 can be enclosed in a cylinder 1677. The IFP 1627 can be enclosed in a cylinder 1625. The IFP 1680 can be enclosed in a cylinder 1625. The IFP 1685 can be enclosed in a cylinder 1687. An enclosed space 1679 can hold a gas such as nitrogen, for example. An enclosed space 1689 can hold a gas such as nitrogen, for example. An enclosed space 1629 can hold a gas such as nitrogen, for example. An enclosed space 1631 can hold a gas such as nitrogen, for example. The nitrogen in these enclosed spaces can absorb fluid displacement of the respective shafts.

The system 1600 can be a combined spring system with each section 1605, 1610, and 1615 sharing their common spring stack. The system 1600 can be a cylinder-separated system because the individual movement and cross-linked (i.e., shared) movement need not be in a shared cylinder. For example, the individual movement can be in an upper cylinder (e.g., 1602), and cross-linked movement can be in lower cylinders (e.g., 1620 and 1680). The system 1600 can be a valve-separated system because the valving of 1625 is separate from the pistons (e.g., 1622, 1623) that move the hydraulic fluid or gas. The system 1600 is advantageous because it engages shock sharing capabilities earlier in the stroke while reducing peak spring resistance to any one shock absorber and/or shock absorber section.

Enclosed spaces 1604 and 1606 can hold and/or transfer a first hydraulic fluid and/or gas. Enclosed spaces 1608 and 1612 can hold and/or transfer a second hydraulic fluid and/or gas. Enclosed spaces 1614 and 1616, and transfer tubes 125 and 1626 can hold and/or transfer a third hydraulic fluid and/or gas. Enclosed spaces 1618 and 1624, and transfer tubes 120 and 1628 can hold and/or transfer a fourth hydraulic fluid and/or gas.

For example, when a wheel associated with the individual shock absorbing sections 1605 experiences a shock or impact, the piston 1622 can push hydraulic fluid or gas out of the enclosed space 1614 into the transfer tube 125, through the valve 1660, and into the enclosed space 1616. The hydraulic fluid or gas can then be pushed into the transfer tube 1626, up a sidewall channel 1619, and into an enclosed space 1621, thereby pushing down on a piston 1623. The piston 1623 can push hydraulic fluid or air into the transfer tube 1628, through the valve 1624, and into the enclosed space 1624. The hydraulic fluid or gas can then be pushed into the transfer tube 120, up a sidewall channel 1633, and into an enclosed space 1636, thereby pushing down on the piston 1622. The same amount of hydraulic fluid or gas that is pushed into the transfer tube 125 can return via the transfer tube 120. In other words, there need not be any volume conversion like as described with reference to FIG. 14. The drawback to this approach is that the transfer tubes may need to have a larger diameter in order to have sufficient capacity to carry the hydraulic fluid or gas. The embodiment shown in FIG. 14 can have smaller diameter transfer tubes, which can save space and make engineering of the vehicle easier.

Systems disclosed herein (e.g., 1600) can include a spring-combined system. A spring-combined system can "ignore" the separation of duties between the individual wheel movement and a cross-linked function. The cross-linked function can be activated and can be dependent solely on the relative difference in valving between the individual and cross-linked functions. The benefit of this kind of system is that it can activate the cross-linked function earlier than the spring-separated system. This kind of system also need not progress to as high a total spring resistance as the spring-separated system, thereby allowing for slower rebound and/or less kicking.

Figure 18:
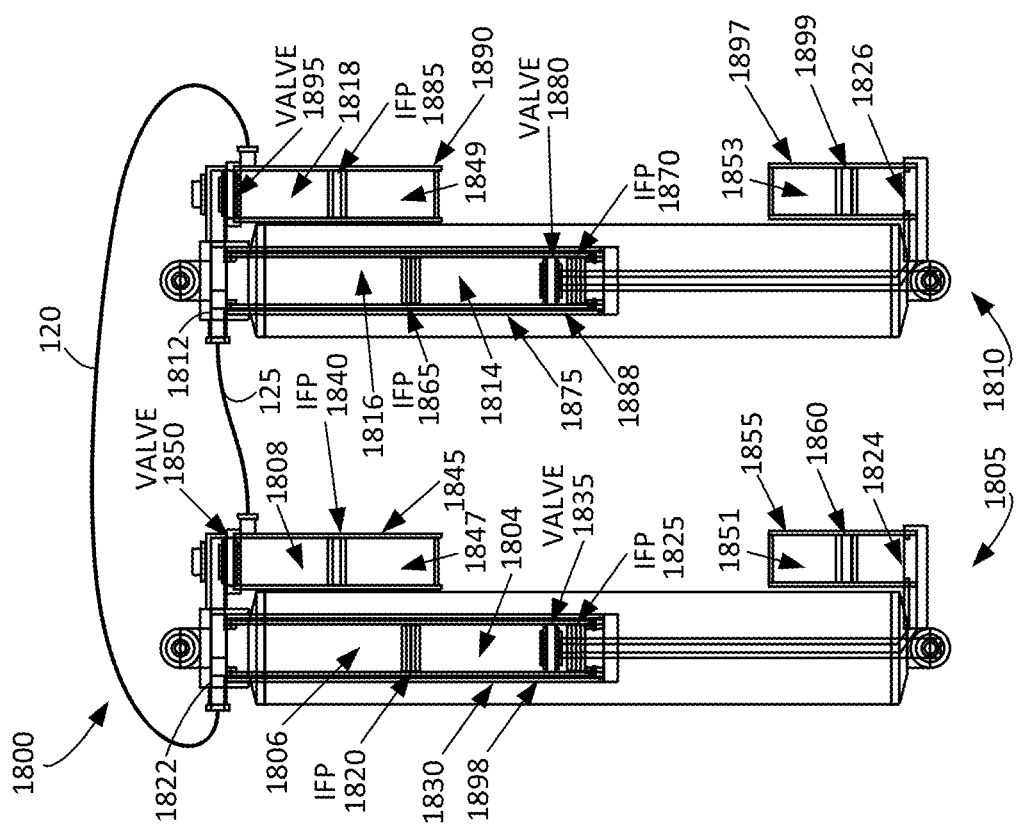
FIG. 18 illustrates a virtual floating cylinder system in accordance with various embodiments of the present inventive concept.

FIG. 18 illustrates a virtual floating cylinder system 1800 in accordance with various embodiments of the present inventive concept. The system 1800 can include individual shock absorbers 1805 and 1810, which can each independently absorb shocks originating from a wheel and/or tire. In other words, the individual shock absorbers 1805 and 1810 can each handle an independent action of an associated wheel and/or tire. The individual shock absorbers 1805 and 1810 can be located diagonally across from each other on the vehicle. For example, if one (e.g., 1805) of the individual shock absorbers is associated with a driver front wheel, the other (e.g., 1810) can be associated with a passenger rear wheel. The hydraulic fluid and/or gas can be transferred via transfer tubes (e.g., 120, 125).

The shock absorber 1805 can include IFPs 1820 and 1825 located in a cylinder 1830. The cylinder 1830 can include a valve 1835. The shock absorber 1805 can include an IFP 1840 located in a cylinder 1845. The shock absorber 1805 can include a valve 1850. The shock absorber 1805 can include a reservoir 1855 for shaft displacement and external valving adjustment. The reservoir 1855 can include an IFP 1860. The reservoir 1855 can include a valve 1824. Enclosed spaces 1847, 1849, 1851, and 1853 can hold a gas such as nitrogen.

The shock absorber 1810 can include IFPs 1865 and 1870 located in a cylinder 1875. The cylinder 1875 can include a valve 1880. The shock absorber 1810 can include an IFP 1885 located in a cylinder 1890. The shock absorber 1810 can include a valve 1895. The shock absorber 1810 can include a reservoir 1897. The reservoir 1897 can include an IFP 1899. The reservoir 1897 can include a valve 1826.

The tension or shock dampening can be changed for desired response by the driver of the vehicle by adjusting the valving of the valve 1835, valve 1850, valve 1880, and/or valve 1895. Each of the IFPs 1885, and/or 1870 can separate gas from fluid. In some embodiments, each of the IFPs 1820, 1825, 1885, and/or 1870 can separate fluid from fluid. In some embodiments, each of the IFPs 1820, 1825, 1885, and/or 1870 can separate gas from gas. Enclosed space 1804 can hold and/or transfer first hydraulic fluid and/or gas. Enclosed space 1814 can hold and/or transfer first hydraulic fluid and/or gas. The valve 1835, the enclosed space 1804, and the reservoir 1855 can be primarily responsible for handling individual movement of a wheel, but due to the IFP 1820, some movement can be shared. Enclosed spaces 1806, 1808, transfer tube 125, and/or space 1812 can hold and/or transfer second hydraulic fluid and/or gas, and are responsible for handling shared movement of wheels. Enclosed space 1814 can hold and/or transfer third hydraulic fluid and/or gas. The valve 1880, the enclosed space 1814, and the reservoir 1897 can be primarily responsible for handling individual movement of a wheel, but due to the IFP 1865, some movement can be shared. Enclosed spaces 1816, 1818, transfer tube 120, and/or enclosed space 1822 can hold and/or transfer fourth hydraulic fluid and/or gas, and are responsible for handling shared movement of wheels.

The hydraulic fluid or gas that is pushed from the transfer tube 125 into the enclosed space 1812, can then travel down a sidewall channel 1888, and into a space beneath the IFP 1870, pushing it up. Similarly, hydraulic fluid or gas that is pushed from the transfer tube 120 into the enclosed space 1822, can then travel down a sidewall channel 1898, and into a space beneath the IFP 1825, pushing it up. In some embodiments, the hydraulic fluid or gas that travels down the sidewall channels (e.g., 1898, 1888) pushes up on the lower IFP (e.g., 1825, 1870), which can push up on the upper IFP (e.g., 1820, 1865).

The system 1800 is advantageous because it provides reduced complexity, and it can engage shock sharing capabilities earlier in the stroke while reducing the peak spring resistance to any one shock absorber.

Figure 19:
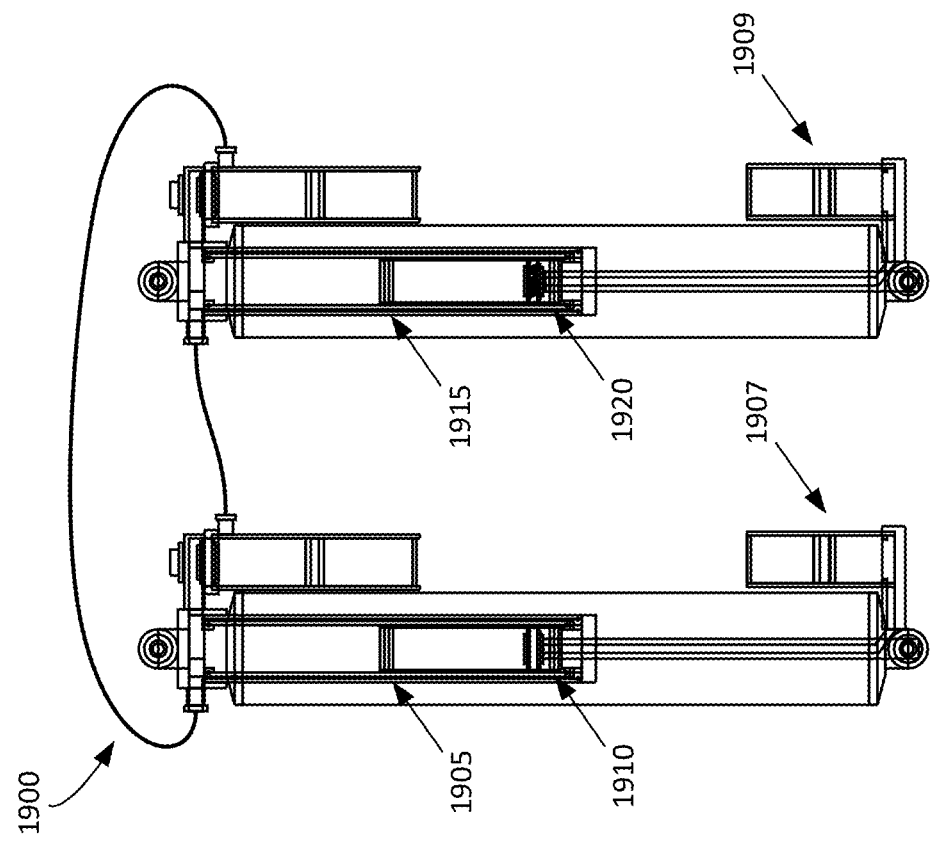
FIG. 19 illustrates a floating cylinder system including a reservoir in accordance with various embodiments of the present inventive concept.

FIG. 19 illustrates a floating cylinder system 1900 including a reservoir (e.g., 1907, 1909) in accordance with various embodiments of the present inventive concept. The system 1900 is similar to claim 1800 and therefore a detailed description of all of the components is not repeated. The notable difference is that instead of IFPs 1820, 1825, 1885, and 1870, fixed walls 1905, 1910, 1915, and/or 1920 can separate the various sections of the shock absorbers. In the system 1900, the hydraulic fluid or gas that travels down the sidewall channels (e.g., 1898 and 1888) can push back up on the corresponding IFPs. (e.g., 1820 and 1865).

The system 1900 is advantageous because it provides reduced complexity, and it can engage shock sharing capabilities earlier in the stroke while reducing the peak spring resistance to any one shock absorber.

FIG. 20 illustrates a shock damper piston 2000 in accordance with various embodiments of the present inventive concept. The shock damper piston 2000 can include an IFP 2005 and a valve 2010. An enclosed space 2015 can hold hydraulic fluid and/or gas. The shock damper piston 2000 of FIG. 20 can be a substructure of FIGS. 19, 21, and 22.

FIG. 21 illustrates a floating cylinder system 2100 without a reservoir (e.g., 1907, 1909 of FIG. 19) in accordance with various embodiments of the present inventive concept. The system 2100 can include individual shock absorbers 2105 and 2110, which can each independently absorb shocks originating from a wheel and/or tire. In other words, the individual shock absorbers 2105 and 2110 can each handle an independent action of an associated wheel and/or tire. The individual shock absorbers 2105 and 2110 can be located diagonally across from each other on the vehicle. For example, if one (e.g., 2105) of the individual shock absorbers is associated with a driver front wheel, the other (e.g., 2110) can be associated with a passenger rear wheel. The hydraulic fluid and/or gas can be transferred via transfer tubes (e.g., 120, 125).

The shock absorber 2105 can include an IFP 1820 located in a cylinder 1830. The cylinder 1830 can include a valve 1835. The shock absorber 2105 can include an IFP 1840 located in a cylinder 1845. The shock absorber 2105 can include a valve 1850. The shock absorber 2110 can include an IFP 1865 located in a cylinder 1875. The cylinder 1875 can include a valve 1880. The shock absorber 2110 can include an IFP 1885 located in a cylinder 1890. The shock absorber 2110 can include a valve 1895. The system 2100 can include fixed walls 1905, 1910, 1915, and 1920, which can separate the various sections of the shock absorbers 2105 and 2110.

The tension or shock dampening can be changed for desired response by the driver of the vehicle by adjusting the valving of the valve 1835, valve 1850, valve 1880, and/or valve 1895. Each of the IFPs 1820, 1840, 1865, and/or 1885 can separate gas from fluid. In some embodiments, each of the IFPs 1820, 1840, 1865, and/or 1885 can separate fluid from fluid. In some embodiments, each of the IFPs 1820, 1840, 1865, and/or 1885 can separate gas from gas. Enclosed space 1804 can hold and/or transfer first hydraulic fluid and/or gas. The valve 1835 and the enclosed space 1804 are responsible for handling individual movement of a wheel. Enclosed spaces 1806, 1808, transfer tube 125, and/or space 1812 can hold and/or transfer second hydraulic fluid and/or gas, and are responsible for handling shared movement of wheels. Enclosed space 1814 can hold and/or transfer third hydraulic fluid and/or gas. The valve 1880 and the enclosed space 1814 are responsible for handling individual movement of a wheel. Enclosed spaces 1816, 1818, transfer tube 120, and/or enclosed space 1822 can hold and/or transfer fourth hydraulic fluid and/or gas, and are responsible for handling shared movement of wheels. Enclosed spaces 1925, 1930, 1935, and 1940 can hold nitrogen.

The system 2100 can be a cylinder-combined system. The system 2100 can be an off-cylinder system. The system 2100 is advantageous because it provides reduced complexity, and it can engage shock sharing capabilities earlier in the stroke while reducing the peak spring resistance to any one shock absorber. Systems disclosed herein (e.g., 2100) can include a cylinder-combined system, which can use shared components for both the individual and cross-linked functions using one or more IFPs and various fluid pathways and chambers to keep the fluids and/or gasses separated.

FIG. 22 illustrates the floating cylinder system 2100 of FIG. 21 without a reservoir (e.g., 1907, 1909) with a common spring stack in accordance with various embodiments of the present inventive concept. The system 2100 can be a combined spring system with each shock absorber 2105 and 2110 sharing their common spring stack.

FIGS. 23A through 23D show example sections of shock absorbers in accordance with various embodiments of the present inventive concept.

Figure 23D:
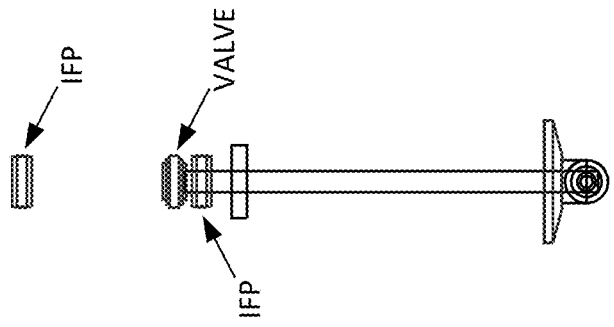
FIGS. 23A through 23D show example sections of shock absorbers in accordance with various embodiments of the present inventive concept.
Figure 23C:
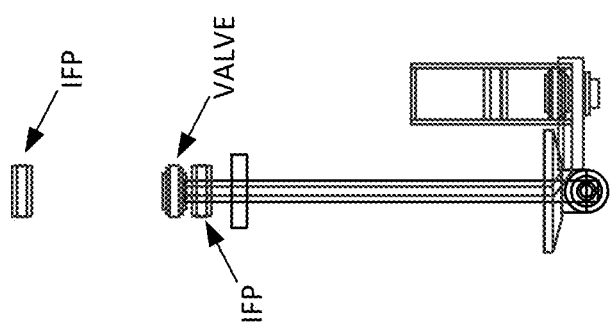
Figure 23B:
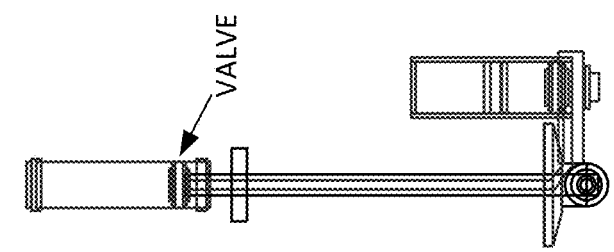
Figure 23A:
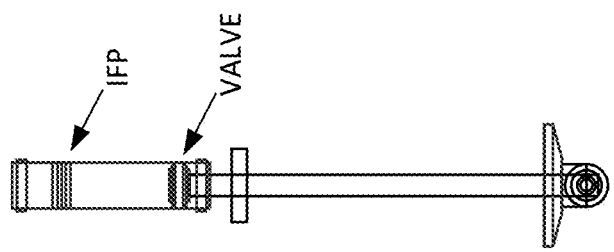

FIG. 23A shows a floating cylinder, which can be a shock damper. The floating cylinder can be an enclosed cylinder, including an IFP and nitrogen for shaft displacement.

FIG. 23B shows a floating cylinder with a reservoir. The floating cylinder can be an enclosed cylinder having a remote reservoir for external adjustment, and nitrogen for shaft displacement.

FIG. 23C shows a virtual floating cylinder with a reservoir. The virtual floating cylinder can include a remote reservoir for external adjustment, and nitrogen for shaft displacement.

FIG. 23D shows a virtual floating cylinder. The virtual floating cylinder can experience virtual size changes due to displacement from a shaft.

Figure 24:
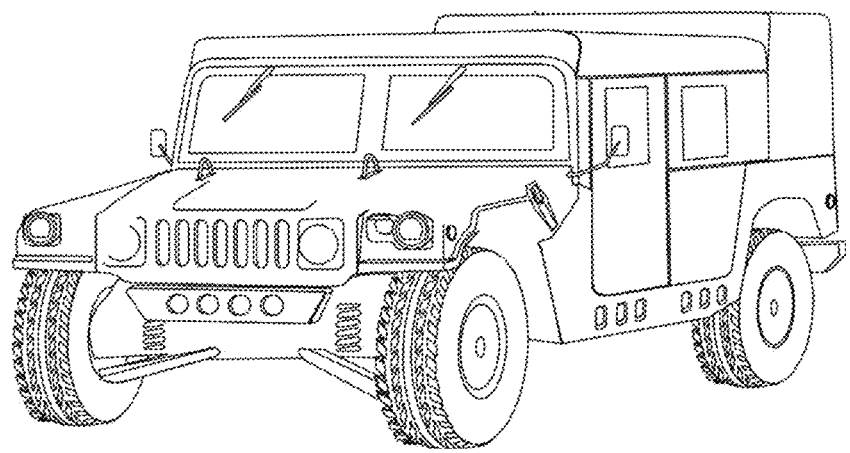
FIG. 24 illustrates an example vehicle that can include the systems and devices disclosed herein, in accordance with various embodiments of the present inventive concept.

FIG. 24 illustrates an example vehicle that can include the systems and devices disclosed herein in accordance with various embodiments of the present inventive concept. It will be understood that any kind of wheeled-vehicle can include the systems and devices disclosed herein.

FIG. 25 illustrates a nested cylinder vehicle suspension system 2500 including shock absorbing sections (e.g., 2505, 2510, 2515, and 2520) and corresponding shock reservoirs (e.g., 2525, 2530, 2535, and 2540) in accordance with various embodiments of the present inventive concept. FIG. 26 illustrates a nested cylinder vehicle suspension system 2600 including the shock absorbing sections (e.g., 2505, 2510, 2515, and 2520), but without the shock reservoirs in accordance with various embodiments of the present inventive concept. Reference is now made to FIGS. 25 and 26. For some components of these and the following figures, a detailed description is already provided above, and therefore, a detailed description is not necessarily repeated.

The system 2500 can include interconnected nested cylinder shock absorbing sections 2505 and 2520, for example, which can each independently absorb shocks originating from a wheel and/or tire. In other words, the individual shock absorbing sections 2505 and 2520 can each handle an independent action of an associated wheel and/or tire. The individual shock absorbing sections 2505 and 2520 can be located diagonally across from each other on the vehicle. For example, if one (e.g., 2505) of the individual shock absorbing sections is associated with a driver front wheel, the other (e.g., 2520) can be associated with a passenger rear wheel. Hydraulic fluid and/or gas can be transferred via transfer tubes 2545. Cross-link action via the transfer tubes 2545 can account for 50% of shock travel, or thereabout. The specific percentage of shock travel can be different depending on a specific application and/or desired characteristics of the systems 2500 and 2600.

When a cross-link is activated, the individual shock absorbing sections (e.g., 2505, 2510, 2515, and 2520) that are connected to each other can move in the same direction and/or by the same amount of movement as the originating cross-link action. Damping action of the systems 2500 and 2600 can be different and separate from force transfer action. The systems 2500 and 2600 can include nested pistons and/or cylinders, as further described below. The shock absorbing sections (e.g., 2505, 2510, 2515, and 2520) can be daisy-chained together using a cross-link connection (e.g., 2545) for unlimited load sharing, as also further described below.

In the embodiment without the shock reservoirs (e.g., 2525, 2530, 2535, and 2540), a nitrogen pocket (e.g., 2605) can be included in each of the shock absorbing sections (e.g., 2505, 2510, 2515, and 2520) to absorb fluid displacement by a shock shaft (e.g., 2610). Embodiments disclosed herein can separate cross-link force transfer from movement damping duties. Furthermore, creating a low-volume force transfer is beneficial for standalone load sharing applications without the complexity of a full cross-link system. In some embodiments, each wheel has individual and shared shock action. The shock absorbing sections (e.g., 2505, 2510, 2515, and 2520) can share a load as determined by an initiating shock movement. The systems 2500 and 2600 can enable a simultaneous series and parallel shock configuration. The shock absorbing sections (e.g., 2505, 2510, 2515, and 2520) of the systems 2500 and 2600 can each include a spring-activated cross-link ram 2550, as further described below.

The nested cylinder vehicle suspension system 2500 provides a dual-cylinder configuration, and may have a thin chamber hydraulic mechanism to transfer force from one shock absorbing section to another.

Figure 27:
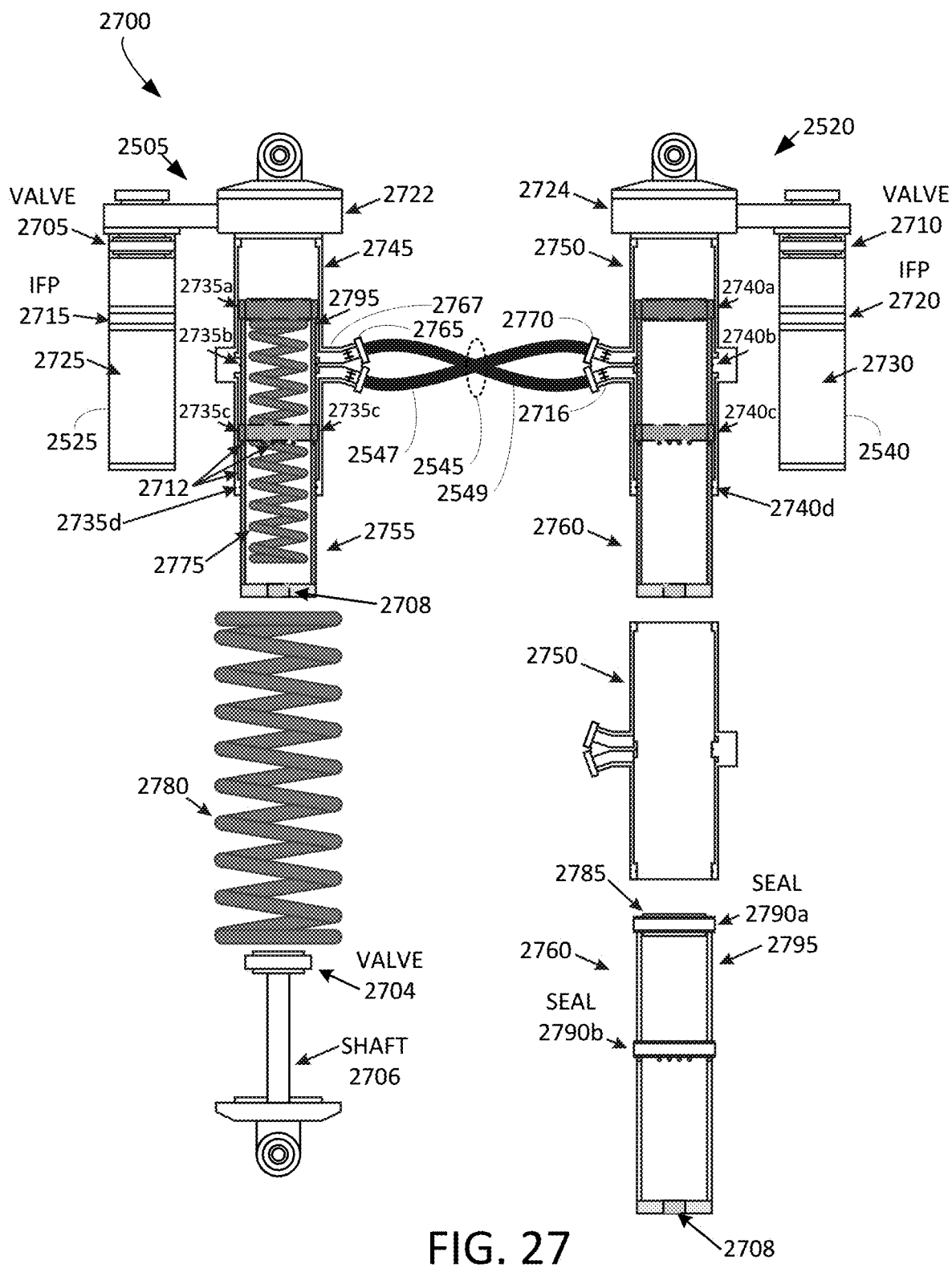
FIG. 27 illustrates a breakout view of a portion of the nested cylinder vehicle suspension system including the nested cylinder shock absorbing sections, and the corresponding shock reservoirs in accordance with various embodiments of the present inventive concept.

FIG. 27 illustrates a breakout view 2700 of a portion of the nested cylinder vehicle suspension system 2500 including the nested cylinder shock absorbing sections 2505 and 2520, and the corresponding shock reservoirs 2525 and 2540 in accordance with various embodiments of the present inventive concept. It will be understood that the details described also apply to the shock absorbing sections 2510 and 2515.

The shock reservoirs 2525 and 2540 can each include a valve (e.g., 2705, 2710), an IFP (e.g., 2715, 2720), and an enclosed space (e.g., 2725, 2730). The enclosed space (e.g., 2725, 2730) can hold a gas such as nitrogen, which can occupy and/or be pressurized within the enclosed space (e.g., 2725, 2730).

The shock absorbing sections 2505 and 2520 can each include an outer cylinder (e.g., 2745, 2750) and an inner cylinder cross-link ram (e.g., 2755, 2760). The outer cylinder (e.g., 2745, 2750) can be permanently fixed to a corresponding top portion (e.g., 2722, 2724) of the shock absorbing sections (e.g., 2505, 2520). The inner cylinder cross-link ram (e.g., 2755, 2760) can each include a damping valve (e.g., 2785), one or more seals (e.g., 2790a, 2790b), and/or an individual movement cylinder (e.g., 2795). The inner cylinder cross-link ram (e.g., 2755, 2760) can slide within a corresponding outer cylinder (e.g., 2745, 2750), acting as an inner cylinder and/or piston associated with cross-link shared movement. In other words, when the inner cylinder cross-link ram 2760 slides within the outer cylinder 2750, this movement is associated with cross-link action. Individual movement, on the other hand, is associated with the valve and/or piston (e.g., 2704) moving within the cylinder of the inner cylinder cross-link ram (e.g., 2755). The inner cylinder cross-link ram (e.g., 2755, 2760) can be nested within, and can move within the outer cylinder (e.g., 2745, 2750). The shock absorbing sections 2505 and 2520 can each include seals (e.g., 2735a-d, 2740a-d). The outer cylinder (e.g., 2745, 2750) can include a cross-link manifold 2767 having one or more apertures (e.g., 2765, 2770) connected to the transfer tubes 2545 to transfer the hydraulic fluid and/or gas between the shock absorbing sections 2505 and 2520, thereby transferring force from one shock absorbing section to another. The one or more apertures (e.g., 2765, 2770) can include one or more valves (e.g., 2716), as further described below.

The shock absorbing section 2505 can include the outer cylinder 2745, which can be coupled to the one or more transfer tubes 2545. The shock absorbing section 2505 can include an inner cylinder cross-link ram 2755 nested within the outer cylinder 2745. The shock absorbing section 2520 can include the outer cylinder 2750, which can be coupled to the one or more transfer tubes 2545. The inner cylinder cross-link ram 2760 can be nested within the outer cylinder 2750. The one or more transfer tubes 2545 can transfer the hydraulic fluid or gas dependent on a pressure difference between the inner cylinder cross-link ram 2755 of the shock absorbing section 2505 and the inner cylinder cross-link ram 2760 of the shock absorbing section 2520. The shock absorbing section 2505 can share a shock impact with the shock absorbing section 2520.

The shock absorbing sections 2505 and 2520 can each include an internal spring (e.g., 2775) and an external spring (e.g., 2780). Increasing pressure on the internal spring (e.g., 2775) can cause movement to the individual movement cylinder 2795. When the individual movement cylinder 2795 moves, it functions as a cross-link piston. In other words, damping energy can be shared between the shock absorbing sections 2505 and 2520. The inner cylinder cross-link ram 2755 of the shock absorbing section 2505 can include the inner spring 2775. The shock absorbing section 2505 can include the external spring 2780, which can be disposed around at least some of the outer cylinder 2745 of the shock absorbing section 2505. The inner cylinder cross-link ram 2760 of the shock absorbing section 2520 can include an inner spring (not shown) that is similar to that of inner spring 2775. The shock absorbing section 2520 can include an external spring (not shown) that is similar to the external spring 2780, and which can be disposed around at least some of the outer cylinder 2750 of the shock absorbing section 2520. The inner spring 2775 of the inner cylinder cross-link ram 2755 of the shock absorbing section 2505 can receive individual movement associated with a wheel of a vehicle. The inner cylinder cross-link ram 2755 of the shock absorbing section 2505 can move within the outer cylinder 2745 of the shock absorbing section 2505, and can receive shared movement associated with at least two wheels of the vehicle. The inner spring (not shown) of the inner cylinder cross-link ram 2760 of the shock absorbing section 2520 can receive individual movement associated with a second wheel of the vehicle. The inner cylinder cross-link ram 2760 of the shock absorbing section 2520 can move within the outer cylinder 2750 of the shock absorbing section 2520, and can receive shared movement associated with the at least two wheels of the vehicle.

The shock absorbing sections 2505 and 2520 can each include an individual movement damping valve (e.g., 2704) and an individual movement shaft (e.g., 2706). The individual movement damping valve (e.g., 2704) and the individual movement shaft (e.g., 2706) may put pressure on the internal spring (e.g., 2775) via an opening 2708 in the inner cylinder cross-link ram (e.g., 2755, 2760). The individual movement shaft 2706 can push against the inner spring 2775 of the inner cylinder cross-link ram 2755 of the shock absorbing section 2505. Similarly, an individual movement shaft (not shown) of the shock absorbing section 2520 can push against the inner spring (not shown) of the inner cylinder cross-link ram 2760 of the shock absorbing section 2520.

The inner cylinder cross-link ram (e.g., 2755, 2760) of the shock absorbing sections 2505 and 2520 can each include one or more holes (e.g., 2712), which can allow hydraulic fluid or gas to pass through to a negative pressure area. In the absence of the one or more holes (e.g., 2712) and the seal (e.g., 2735*d*), air would fill the negative pressure area.

As the seal 2735*c* pushes upward, the seal 2735*c* can transfer force from the inner cylinder cross-link ram 2755 to the inner cylinder cross-link ram 2760, or vice versa, and/or to other daisy-chained cross-link rams, as further described below. The force transfer from the inner cylinder cross-link ram 2755 to the inner cylinder cross-link ram 2760 can be resisted by an external spring (not shown, but similar to 2780) associated with the shock absorbing section 2520, and/or by other daisy-chained external springs, as further described below. The force transfer from the inner cylinder cross-link ram 2755 to the inner cylinder cross-link ram 2760 can be resisted by cross-link valving associated with the inner cylinder cross-link ram 2755 and/or by valving associated with the inner cylinder cross-link ram 2760, such as via valve 2785.

In some embodiments, pressure and/or movement balances loads across a vehicle. An amount of load shared can depend on a percentage of overall shock travel each shock absorbing section is responsible for in accordance with a desired application. The connection mechanism disclosed herein can be daisy-chained into any suitable number of shock absorbing sections, as further described below. Major damping for a shock movement can be associated with the connected valves (e.g., 2785) of the inner cylinder cross-link rams (e.g., 2755, 2760). Minor damping can be provided by the reservoir valves (e.g., 2705, 2710) and/or by valving (e.g., 2716) directly on the flow of the hydraulic fluid or gas through the transfer tubes 2545. The valves can control a flow rate of hydraulic fluid or gas through the transfer tubes 2545. For example, the valves (e.g., 2716) in the one or more apertures (e.g., 2765, 2770) can provide minor damping. In some embodiments, the valves (e.g., 2716) can be located in-line, i.e., in the transfer tubes 2545 themselves. Accordingly, separate valving can be used to dampen the individual action versus the cross-link action. Total spring rate can be a sum of spring rates associated with all external springs (e.g., 2780) in series with all interior springs (e.g., 2775). The total spring rate can be in parallel to a particular external spring (e.g., 2780) of a particular shock absorbing section (e.g., 2505).

In some embodiments, when the inner cylinder cross-link rams 2755 and 2760 have the same applied force, then no force is shared between them (i.e., no, or little, hydraulic fluid or gas is transferred between the shock absorbing sections 2505 and 2520). Shared force, and corresponding transfer of the hydraulic fluid or gas via the transfer tubes 2545, may only occur when there is a pressure difference between the inner cylinder cross-link rams 2755 and 2760. The transfer tubes 2545 can include a transfer tube 2547 and a transfer tube 2549. The inner cylinder cross-link ram 2755 of the shock absorbing section 2505 can cause the hydraulic fluid or gas to be transferred through the transfer tube 2547 and/or the transfer tube 2549. The inner cylinder cross-link ram 2760 of the shock absorbing section 2520 can cause the hydraulic fluid or gas to be transferred through the transfer tube 2547 and/or the transfer tube 2549.

Figure 28:
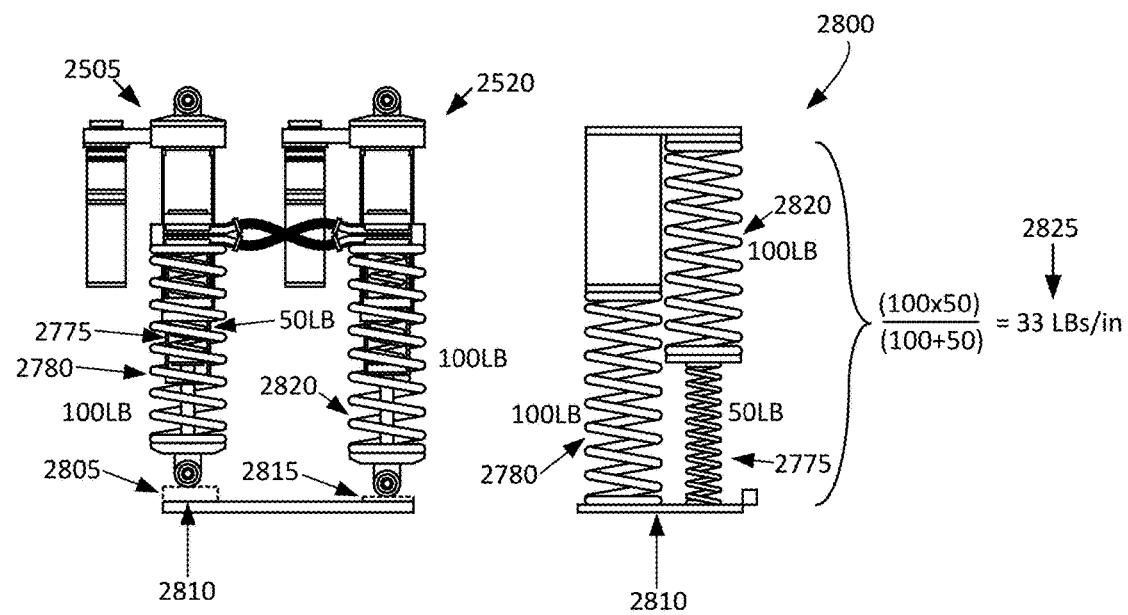
FIG. 28 illustrates an example force diagram representing how springs from connected nested cylinder shock absorbing sections respond to a load when one shock is compressed from a non-uniform load in accordance with various embodiments of the present inventive concept.

FIG. 28 illustrates an example force diagram 2800 representing how springs from connected nested cylinder shock absorbing sections (e.g., 2505, 2520) respond to a load when one shock is compressed from a non-uniform load in accordance with various embodiments of the present inventive concept. For example, when a shock absorbing section 2505 is compressed by a displacement amount 2805 (e.g., one inch) due to an upward force 2810, then the shock absorbing section 2520 may be lifted by a displacement amount 2815 (e.g., one third of an inch). In other words, the shock absorbing section 2520 may experience a fraction of the lift that the shock absorbing section 2505 experiences due to the upward force 2810 exerted on the shock absorbing section 2505. In some embodiments, the external spring 2780 has a 100 pound (lb) spring rate, the internal spring 2775 has a 50 lb spring rate, and the external spring 2820 has a 100 lb spring rate. It will be understood that different spring rates can be used.

More specifically, when one shock absorbing section (e.g., 2505) is compressed, the external spring 2780 can be compressed by a displacement amount 2805 (e.g., one inch). This can apply pressure to the internal spring 2775 of the shock absorbing section 2505. However, such pressure can be resisted by the external spring 2820 of the shock absorbing section 2520. The internal spring 2775 and the external spring 2820 are effectively in series. The internal spring 2775 and the external spring 2820 together are effectively in parallel with the external spring 2780. In some embodiments, an amount of total force to move the shock absorbing section 2505 by the displacement amount 2805 (e.g., one inch) can be equal to the combined resistance of the external spring 2780 in parallel with the series resistance of the internal spring 2775 and the external spring 2820. The force balance can change, however, depending on spring compression and/or other constraints (e.g., crossover points). For example, as the internal spring 2775 and the external spring 2820 are compressed, the force balance can change due to constraints of the spring-activated cross-link rams (e.g., 2755, 2760) and maximum compression of the internal spring 2775. Put differently, the first half of travel can vary due to the internal spring 2775. The second half of travel can be associated with the combined external springs 2780 and 2820, after the internal spring 2775 becomes fully compressed.

In the case of non-uniform force applied to the shock absorbing sections (e.g., 2505, 2520), prior to the internal spring 2775 being fully compressed, the combined spring rate of the internal spring 2775 and the external spring 2820 can be equal to (100×50)/(100+50)=33 lbs/in, as shown at 2825. The total spring rate before the internal spring 2775 is fully compressed can be 100 lbs/in (i.e., due to the external spring 2780) plus 33 lbs/in (i.e., as shown at 2825)=133 lbs/in. After the internal spring 2775 is fully compressed, the total spring rate can be 100 lbs/in (i.e., due to the external spring 2780)+100 lbs/in (i.e., due to the external spring 2820)=200 lbs/in. It will be understood that different spring rates can be used.

In the case of uniform force applied to the shock absorbing sections (e.g., 2505, 2520), initial travel can be 100 lb per inch (lbs/in) for each shock absorbing section. After crossover is engaged by the internal spring 2775 (i.e., the internal spring 2775 is fully compressed), then the travel can be 150 lbs/in or thereabout. It will be understood that different spring rates can be used.

Figure 29:
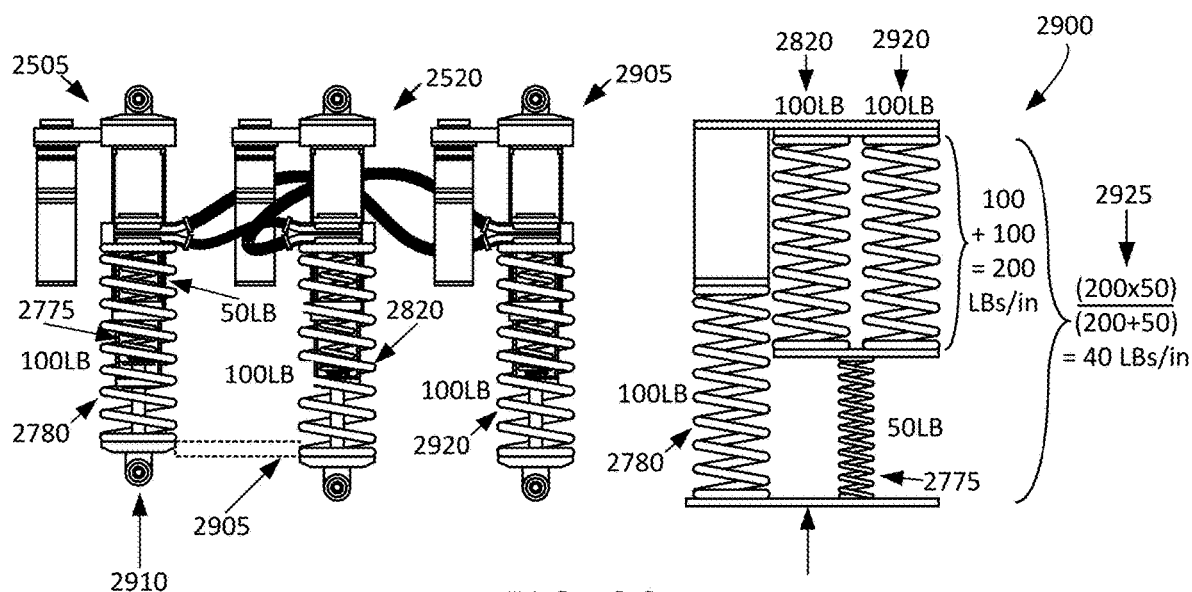
FIG. 29 illustrates an example force diagram associated with a configuration having three interconnected nested cylinder shock absorbing sections, representing how springs from interconnected shock absorbing sections respond to a load when one shock is compressed from a non-uniform load in accordance with various embodiments of the present inventive concept.

FIG. 29 illustrates an example force diagram 2900 associated with a configuration having three interconnected nested cylinder shock absorbing sections (e.g., 2505, 2520, 2905), representing how springs from interconnected shock absorbing sections (e.g., 2505, 2520, 2905) respond to a load when one shock is compressed from a non-uniform load in accordance with various embodiments of the present inventive concept. For example, when a shock absorbing section 2505 is compressed by a displacement amount 2905 (e.g., one inch) due to an upward force 2910, the initial travel of the shock absorbing section 2505 can be 140 lbs/in, and the final travel 300 lbs/in. Prior to the internal spring 2775 of the shock absorbing sections (e.g., 2505, 2520, 2905) being fully compressed, the combined spring rate of the internal spring 2775 and the external springs 2820 and 2920 can be equal to (200×50)/(200+50)=40 lbs/in, as shown at 2925. The total spring rate before the internal spring 2775 is fully compressed can be 140 lbs/in (i.e., due to the external spring 2780) plus 40 lbs/in (i.e., as shown at 2925)=140 lbs/in. After the internal spring 2775 is fully compressed, the total spring rate can be 100 lbs/in (i.e., due to the external spring 2780)+200 lbs/in (i.e., due to the external springs 2820 and 2920)=300 lbs/in. It will be understood that different spring rates can be used.

In the case of uniform force applied to all of the interconnected shock absorbing sections (e.g., 2505, 2520, 2905), initial travel can be 100 lbs/in for each shock absorbing section. After crossover is engaged by the internal spring 2775 (i.e., the internal spring 2775 is fully compressed), then the travel can be 150 lbs/in or thereabout. It will be understood that different spring rates can be used.

Figure 30:
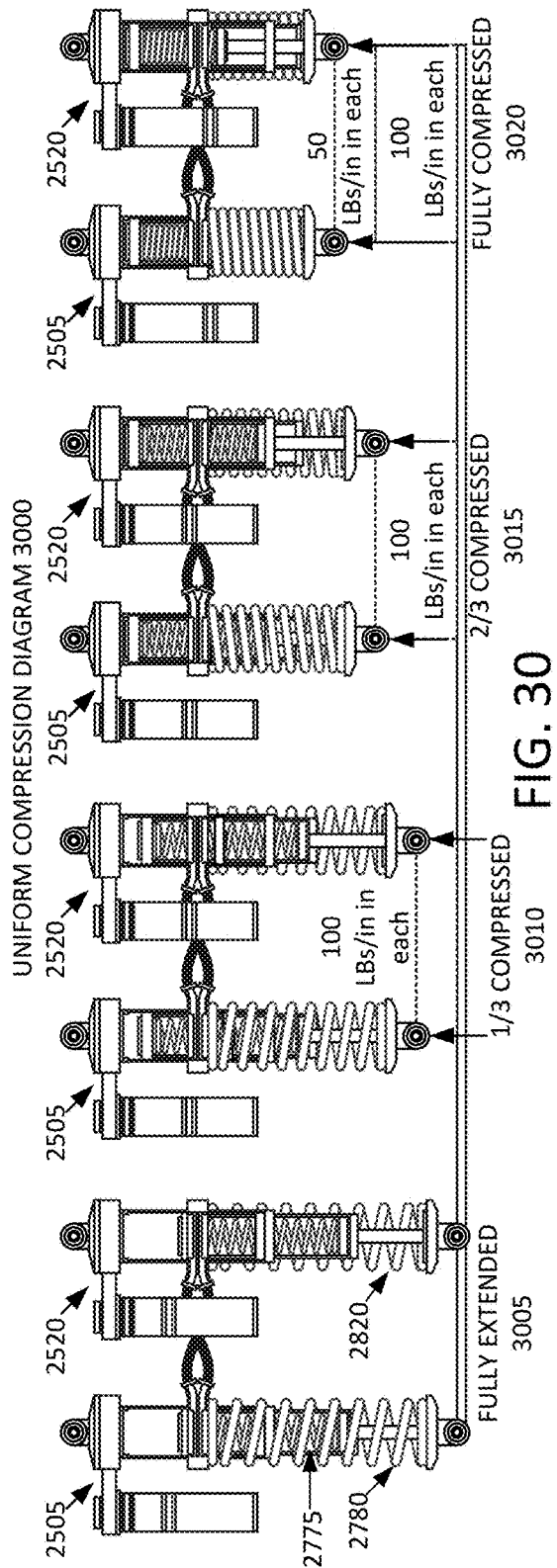
FIG. 30 illustrates an example diagram showing two interconnected nested cylinder shock absorbing sections in various uniform compression configurations in accordance with various embodiments of the present inventive concept.

FIG. 30 illustrates an example diagram 3000 showing two interconnected nested cylinder shock absorbing sections (e.g., 2505, 2520) in various uniform compression configurations in accordance with various embodiments of the present inventive concept. The force diagram 3000 shows the shock absorbing sections (e.g., 2505, 2520) in a fully extended configuration 3005, a one-third (⅓) compressed configuration 3010, a two-thirds (⅔) compressed configuration 3015, and a fully compressed configuration 3020. For example, if the external springs 2780 and 2820 are each 100 lb, and the internal springs (e.g., 2775) are each 50 lb, the initial travel of each shock absorbing section (e.g., 2505, 2520) can be 100 lbs/in, and the final travel (i.e., after the internal springs are fully compressed) can be 150 lbs/in.

As shown in the ⅓ compressed configuration 3010, the initial travel and associated force can be 100 lbs/in for each of the shock absorbing section (e.g., 2505, 2520). As shown in the ⅔ compressed configuration 3015, the travel and associated force can be 100 lbs/in for each of the shock absorbing section (e.g., 2505, 2520). As shown in the fully compressed configuration 3020, the final travel and associated force can be 150 lbs/in for each of the shock absorbing section (e.g., 2505, 2520).

Figure 31:
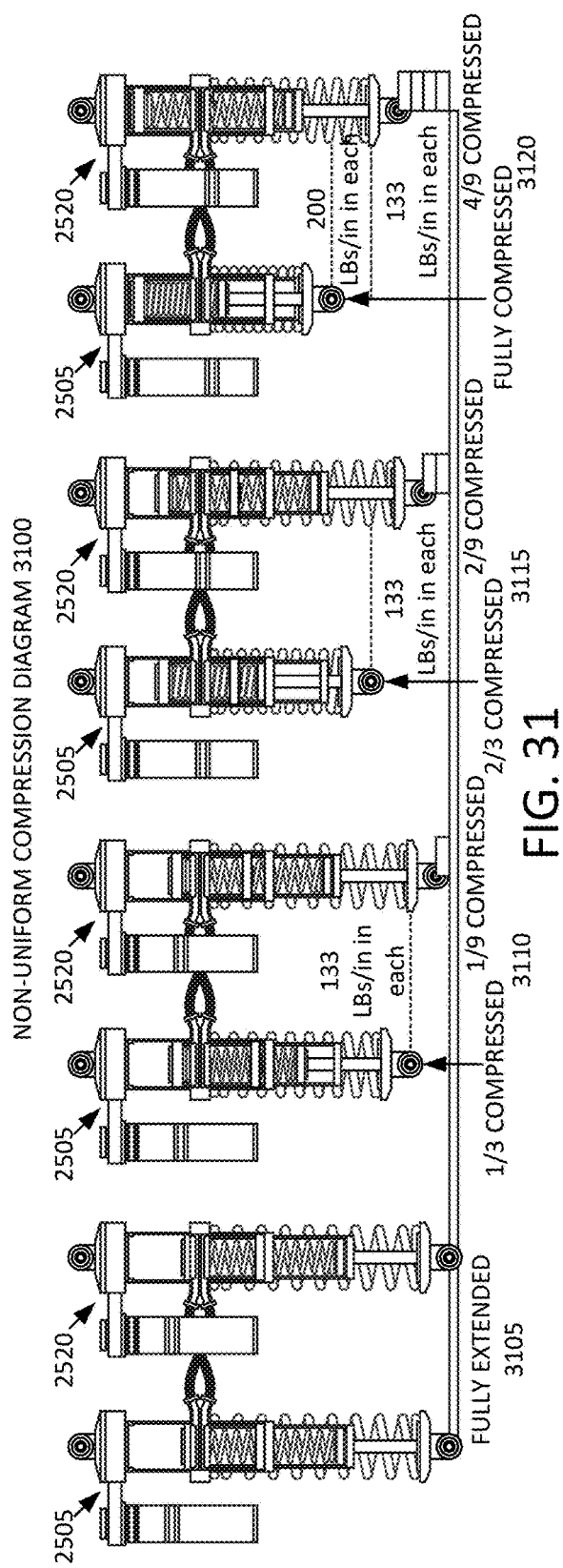
FIG. 31 illustrates an example diagram showing two interconnected nested cylinder shock absorbing sections in various non-uniform compression configurations in accordance with various embodiments of the present inventive concept.

FIG. 31 illustrates an example diagram 3100 showing two interconnected nested cylinder shock absorbing sections (e.g., 2505, 2520) in various non-uniform compression configurations in accordance with various embodiments of the present inventive concept. The force diagram 3100 shows the shock absorbing sections (e.g., 2505, 2520) in a fully extended configuration 3105, a ⅓ compressed ⅙ compressed configuration 3110, a ⅔ compressed ⅔ compressed configuration 3115, and a fully compressed ⅘ compressed configuration 3120. For example, if the external springs 2780 and 2820 are each 100 lb, and the internal springs (e.g., 2775) are each 50 lb, the initial travel of each shock absorbing section (e.g., 2505, 2520) can be 133 lbs/in, and the final travel (i.e., after the internal springs are fully compressed) can be 200 lbs/in.

As shown in the ⅓ compressed ⅙ compressed configuration 3110, the initial travel and associated force can be 133 lbs/in for each of the shock absorbing section (e.g., 2505, 2520), and the internal spring of the shock absorbing section 2520 can be fully extended. As shown in the ⅔ compressed ⅔ compressed configuration 3115, the travel and associated force can be 133 lbs/in for each of the shock absorbing section (e.g., 2505, 2520), and the internal spring of the shock absorbing section 2520 can be fully extended. When the shock absorbing section 2505 is fully compressed, the travel and associated force can be 200 lbs/in for the shock absorbing section 2520. As shown in the fully compressed ⅘ compressed configuration 3120, the travel and associated force can be 200 lbs/in for the shock absorbing section 2520.

Figure 32:
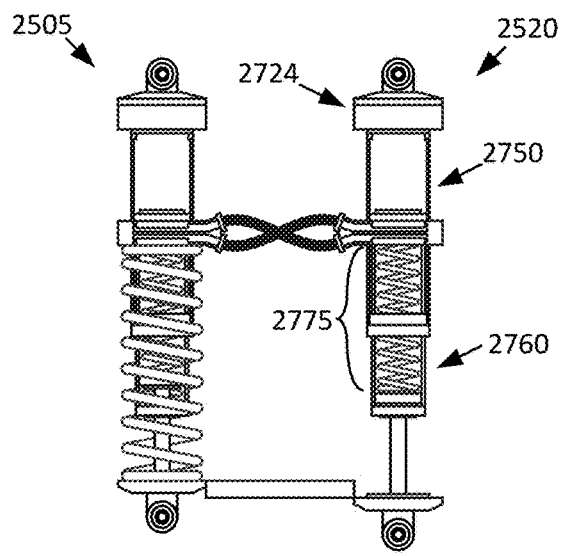
FIG. 32 illustrates two interconnected nested cylinder shock absorbing sections with one of the external springs not shown so that a better view of the internal spring and cross-link ram is provided, in accordance with various embodiments of the present inventive concept.

FIG. 32 illustrates two interconnected nested cylinder shock absorbing sections (e.g., 2505, 2520) with one of the external springs not shown so that a better view of the internal spring 2775 and cross-link ram 2760 is provided, in accordance with various embodiments of the present inventive concept. The cross-link ram 2760 including the internal spring 2775 can move up and down within the outer cylinder 2750. In other words, the cross-link ram 2760 is nested within the outer cylinder 2750. The outer cylinder 2750 can be permanently fixed to the top portion 2724 of the shock absorbing section 2520. In contrast, the retrofit cross-link suspension apparatus of FIG. 33 has an inner cylinder that can be permanently fixed, and an outer cylinder that can move up and down, as further described below.

Figure 33:
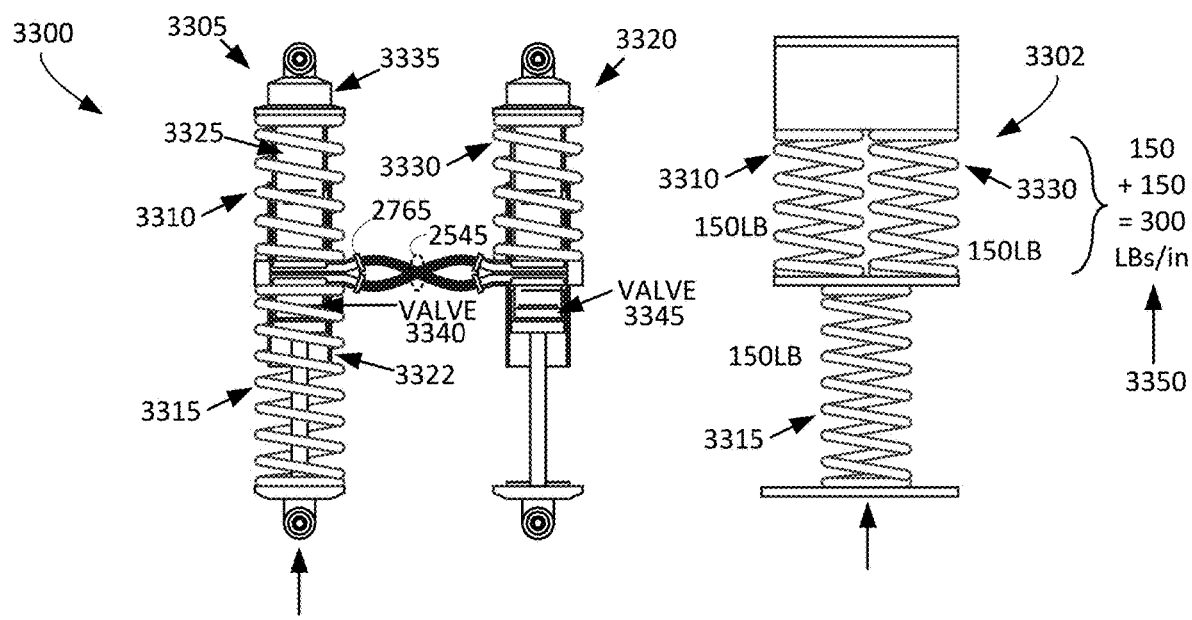
FIG. 33 illustrates a retrofit cross-link suspension apparatus including two interconnected shock absorbing sections, and associated force diagram, in accordance with various embodiments of the present inventive concept.

FIG. 33 illustrates a retrofit cross-link suspension apparatus 3300 including two interconnected shock absorbing sections (e.g., 3305, 3320), and associated force diagram 3302, in accordance with various embodiments of the present inventive concept. The retrofit cross-link suspension apparatus 3300 does not have nested cylinders. Instead, the shock absorbing section 3305, for example, can have two external springs (e.g., 3310, 3315), which can enable larger spring rates. The shock absorbing section 3320 can also have two external springs, although only one (e.g., 3330) is shown here so that part of the inside of the shock absorbing section 3320 can be more easily observed. The shock absorbing sections (e.g., 3305, 3320) can each include an inner cylinder (e.g., 3325) and an outer cylinder (e.g., 3322). The inner cylinder 3325 can be permanently attached to a top portion 3335 of the shock absorbing section (e.g., 3305). The outer cylinder 3322 can move up and down, dependent on the external springs (e.g., 3310, 3315). In some embodiments, the base of each of the shock absorbing sections (e.g., 3305, 3320) can be a standard shock, and the outer cylinder (e.g., 3322) and cross-link components (e.g., 2545, 2765) can be retrofitted to the standard shock, as further described below. The retrofitting can occur at the factory before shipment to an end user, or by the end user after purchase of the standard shock. In other words, the retrofit cross-link suspension apparatus 3300 can be constructed using an add-on accessory to any standard shock, and/or a standard shock that is set up for spring cross-overs and/or preload.

The shock absorbing sections (e.g., 3305, 3320) can include one or more valves (e.g., 3340, 3345), which can provide major valving, although the major valving in this embodiment does not differentiate between individual versus cross-link action. Minor valving can be placed within the one or more apertures (e.g., 2765) or in-line, i.e., in the transfer tubes 2545 themselves, as described above.

The force diagram 3302 represents how springs from connected retrofit shock absorbing sections (e.g., 3305, 3320) respond to a load. When one shock absorbing section (e.g., 3305) is compressed, both the external springs (e.g., 3315, 3310) can be compressed, which can move the outer cylinder 3322 in an upward direction, along with other cross link components (e.g., 2765, 2545). As the outer cylinder 3322 moves upward, such movement can be resisted by the external spring 3330 of the other shock absorbing section (e.g., 3320). This provides a parallel spring relationship for the external springs 3310 and 3330. Both of the external springs 3310 and 3330 can effectively be in series with the external spring 3315, as shown in the force diagram 3302. Depending on spring rates and spring lengths used, if one of the external springs (e.g., 3310) becomes fully compressed before the other external springs (e.g., 3315, 3330, etc.) become fully compressed, then the remaining total spring rate can be that of the springs still available for compression, whether from the shock absorbing section 3305 or the shock absorbing section 3320. The vehicle can always seek equilibrium between the diagonal shock absorbing sections (e.g., 3305, 3320) and associated diagonal cross-link springs (e.g., 3310, 3315, 3330, etc.). In this example embodiment, there can be a 50/50 direct/cross-link travel relationship. Accordingly, during the first one-half (½) of travel, the external spring 3315 can be fully compressed, and the remaining travel can be at the combined parallel spring rate of the remaining external springs (e.g., 3310, 3330). In this example embodiment, the remaining combined parallel spring rate can be 300 lbs/in, as shown at 3350.

Accordingly, in this example, three springs may be engaged when an uneven load is applied to the vehicle. The lower spring where the force is applied may receive an uneven load, and then all upper springs of linked shocks regardless of the number of linked shocks may also share in the load. In this specific example embodiment of FIG. 33, two upper springs are in parallel, and both of these springs are in series with one lower shock.

Figure 34:
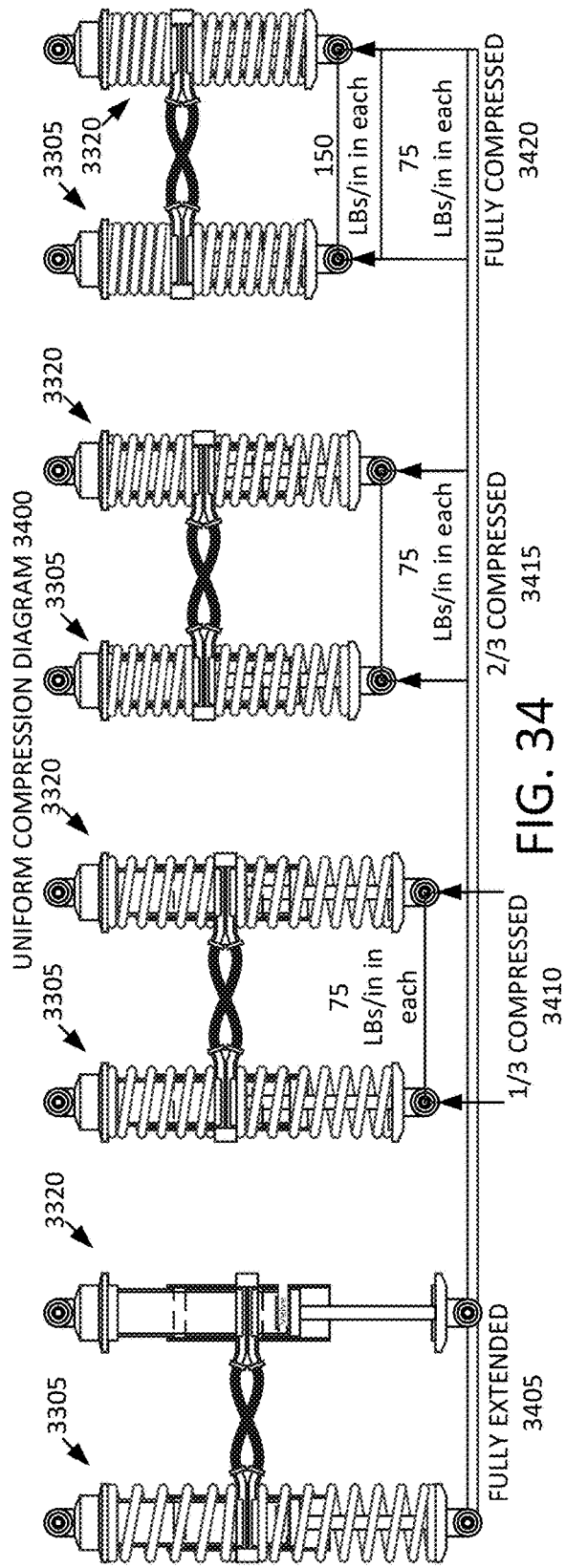
FIG. 34 illustrates an example diagram showing two interconnected shock absorbing sections in various uniform compression configurations in accordance with various embodiments of the present inventive concept.

The retrofit cross-link suspension apparatus 3300 enables a larger spring for the cross-link action while also enabling the main piston to travel the whole length of the shock rather than two half-length pistons. The retrofit cross-link suspension apparatus 3300 provides cross-link action to share the springs while also enabling a downsized damping circuit. The retrofit cross-link suspension apparatus 3300 can replace existing shocks of a vehicle. FIG. 34 illustrates an example diagram 3400 showing two interconnected shock absorbing sections (e.g., 3305, 3320) in various uniform compression configurations in accordance with various embodiments of the present inventive concept. In other words, FIG. 34 shows example shock movements under different loads. The diagram 3400 shows the shock absorbing sections (e.g., 3305, 3320) in a fully extended configuration 3405, a one-third (⅓) compressed configuration 3410, a two-thirds (⅔) compressed configuration 3415, and a fully compressed configuration 3420. For example, if the external springs are each 150 lb, the initial travel of each shock absorbing section (e.g., 3305, 3320) can be 75 lbs/in, and the final travel (i.e., after the upper external springs are fully compressed) can be 150 lbs/in.

As shown in the ⅓ compressed configuration 3410, the initial travel and associated force can be 75 lbs/in for each of the shock absorbing section (e.g., 3305, 3320). As shown in the ⅔ compressed configuration 3415, the travel and associated force can be 75 lbs/in for each of the shock absorbing section (e.g., 3305, 3320). As shown in the fully compressed configuration 3420, the travel and associated force can be 150 lbs/in for each of the shock absorbing section (e.g., 3305, 3320).

Figure 35:
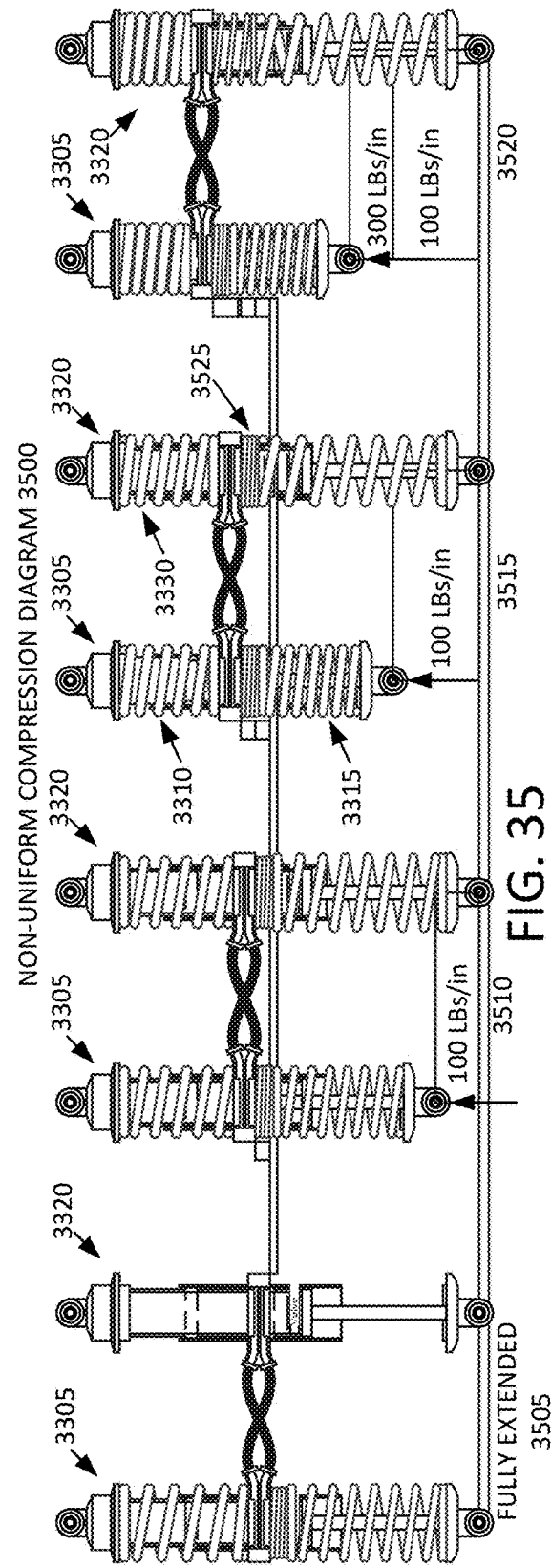
FIG. 35 illustrates an example diagram showing two interconnected shock absorbing sections in various non-uniform compression configurations in accordance with various embodiments of the present inventive concept.

FIG. 35 illustrates an example diagram 3500 showing two interconnected shock absorbing sections (e.g., 3305, 3320) in various non-uniform compression configurations in accordance with various embodiments of the present inventive concept. The diagram 3500 shows the shock absorbing sections (e.g., 3305, 3320) in a fully extended configuration 3505, a ⅓ compressed configuration 3510, a ⅔ compressed configuration 3515, and a fully compressed configuration 3520. For example, if the external springs are each 150 lb, the initial travel of the shock absorbing section being compressed (e.g., 3305) can be 100 lbs/in. In the ⅔ compressed configuration 3515, the external spring 3315 can be fully compressed, and remaining stroke as shown at 3520 can be attributed to the upper external springs 3310 and 3330, for a combined total of 300 lbs/in. In other words, the final travel (i.e., after the external spring 3315 is fully compressed) can be 300 lbs/in.

As the cross-link mechanism progresses through the stroke, pressure can be relieved on the shock absorbing section 3320. Given that weight can still be present from the vehicle on the shock absorbing section 3320, the corner of the vehicle can drop down relative to the wheels. In some embodiments, a helper spring 3525 can be optionally included.

Figure 36:
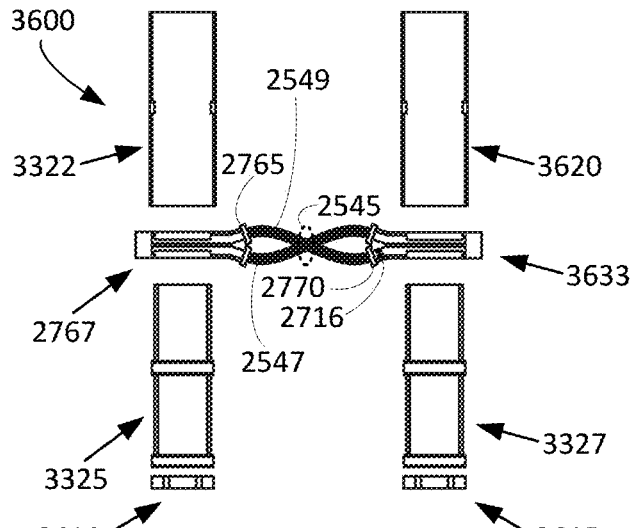
FIG. 36 illustrates the retrofit cross-link suspension apparatus in a disassembled configuration without standard shocks in accordance with various embodiments of the present inventive concept.

FIG. 36 illustrates the retrofit cross-link suspension apparatus 3600 in a disassembled configuration without standard shocks in accordance with various embodiments of the present inventive concept. The retrofit cross-link suspension apparatus 3600 can be used to retrofit an existing shock in accordance with various embodiments of the present inventive concept. Each of the outer cylinders (e.g., 3322, 3620) can have associated therewith an inner cylinder (e.g., 3325, 3327). The retrofit cross-link suspension apparatus 3600 can include lock rings (e.g., 3610, 3615). The retrofit cross-link suspension apparatus 3600 can include the cross-link manifold 2767, which can be coupled to the one or more transfer tubes 2545. Any suitable number of retrofit cross-link suspension apparatuses (e.g., 3600) and corresponding standard shocks can be daisy chained together. The other components of the retrofit cross-link suspension apparatus 3600 such as the transfer tubes 2545, the one or more apertures (e.g., 2765, 2770), and the one or more valves (e.g., 2716), can also be retrofitted to the two or more individual standard shocks (not shown).

The inner cylinder (e.g., 3325, 3327) can be disposed within the corresponding outer cylinder (e.g., 3322, 3620). The cross-link manifold 2767 can include one or more apertures (e.g., 2765). The one or more transfer tubes 2545 can be coupled to the one or more apertures (e.g., 2765) of the cross-link manifold 2767. The inner cylinder (e.g., 3327) can be disposed within the outer cylinder (e.g., 3620). The cross-link manifold 3633 can include one or more apertures (e.g., 2770). The one or more transfer tubes 2545 can be coupled to the one or more apertures (e.g., 2770) of the cross-link manifold 3633. The one or more transfer tubes 2545 can transfer hydraulic fluid or gas. The outer cylinder 3322 can be coupled to the cross-link manifold 2767. The outer cylinder 3620 can be coupled to the cross-link manifold 3633. The one or more transfer tubes can include a transfer tube 2547 and a transfer tube 2549. The inner cylinder 3325 can cause the hydraulic fluid or gas to be transferred through one of the transfer tubes (e.g., 2547). The inner cylinder 3327 can cause the hydraulic fluid or gas to be transferred through another of the transfer tubes (e.g., 2549).

The retrofit cross-link suspension apparatus 3600 can be a standalone product by itself, and can be added to existing shocks of a vehicle to provide cross-link capability to existing shocks of the vehicle.

Figure 37:
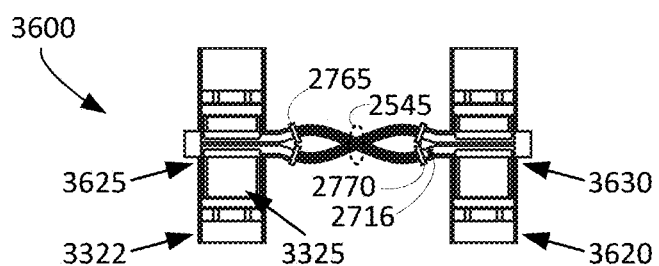
FIG. 37 illustrates the retrofit cross-link suspension apparatus in an assembled configuration without standard shocks in accordance with various embodiments of the present inventive concept.

FIG. 37 illustrates the retrofit cross-link suspension apparatus 3600 in an assembled configuration without standard shocks in accordance with various embodiments of the present inventive concept. The retrofit cross-link suspension apparatus 3600 can include two or more interconnected outer cylinders (e.g., 3322, 3620), transfer tubes 2545, and one or more apertures (e.g., 2765, 2770). The retrofit cross-link suspension apparatus 3600 can each include an inner cylinder (e.g., 3325, 3327). The one or more apertures (e.g., 2765, 2770) can include one or more valves (e.g., 2716). Even though only one valve 2716 is shown in FIG. 36, it will be understood that an individual valve can be associated with each aperture or each transfer tube. The retrofit cross-link suspension apparatus 3600 can include one or more chambers (e.g., 3625, 3630) to hold hydraulic fluid or gas, which can be transferred from one cylinder (e.g., 3322) to another (e.g., 3620) via one or more of the transfer tubes 2545 responsive to upward force received from one or more wheels of a vehicle. The retrofit cross-link suspension apparatus 3600 further defines the separation of force transfer of the springs from the damping action of the shock itself as a fully separate unit, while also simplifying installation and adjustments.

Figure 38:
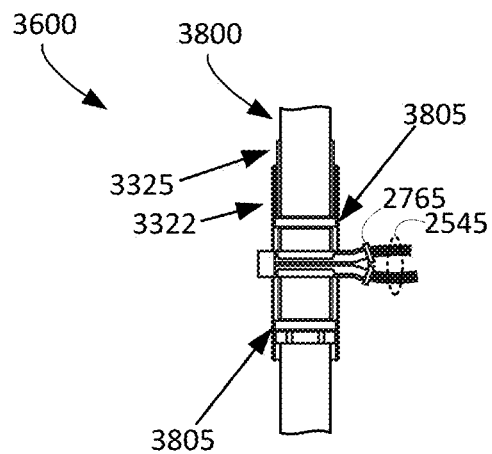
FIG. 38 illustrates a section of a standard shock with the addition of the outer cylinder and the inner cylinder of the retrofit cross-link suspension apparatus, in accordance with various embodiments of the present inventive concept.

FIG. 38 illustrates a section of a standard shock body 3800 with the addition of the outer cylinder (e.g., 3322) and the inner cylinder (e.g., 3325) of the retrofit cross-link suspension apparatus 3600 (of FIG. 36), in accordance with various embodiments of the present inventive concept. In addition, the one or more apertures (e.g., 2765) and the transfer tubes (e.g., 2545) are shown retrofitted to the section of the standard shock body 3800.

Figure 39:
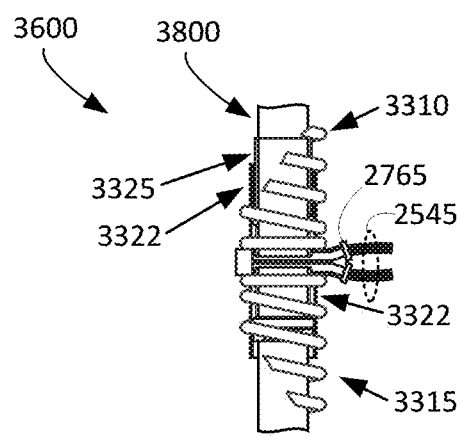
FIG. 39 illustrates an assembled retrofit cross-link suspension apparatus retrofitted to the standard shock along with external springs, in accordance with various embodiments of the present inventive concept.

FIG. 39 illustrates an assembled retrofit cross-link suspension apparatus 3600 retrofitted to the standard shock body (e.g., 3800 of FIG. 38) along with external springs (e.g., 3310, 3315), in accordance with various embodiments of the present inventive concept. The external springs (e.g., 3310, 3315) may be located at least partially around some of the outer cylinder 3322. Portions of the external springs (e.g., 3310, 3315) are shown to make it easier to observe the parts underneath.

The retrofit cross-link suspension apparatus 3600 can include an inner cylinder (e.g., 3325) and an outer cylinder (e.g., 3322). When these cylinders move in opposing directions, the hydraulic fluid or gas can be transferred to the paired shock absorbing section. The retrofit cross-link suspension apparatus 3600 can be added to existing shocks on a vehicle to provide cross-link capability.

Figure 40:
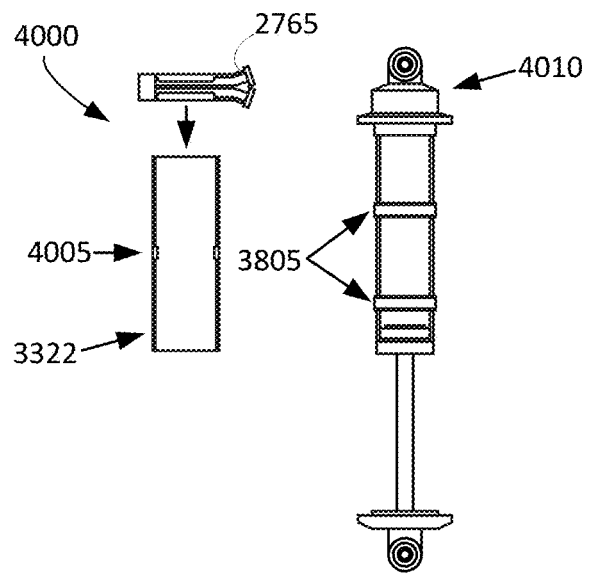
FIG. 40 illustrates an integrated cross-link suspension apparatus, in accordance with various embodiments of the present inventive concept.

FIG. 40 illustrates an integrated cross-link suspension apparatus 4000, in accordance with various embodiments of the present inventive concept. In some embodiments, a center region 4005 of the outer cylinder 3322 can be positioned between the seals 3805, so that force can be transferred to the interconnected shock via the transfer of hydraulic fluid or gas through one or more apertures (e.g., 2765) and/or transfer tubes (e.g., 2545 of FIG. 27). An upper portion 4010 can be temporarily removed so that the upper spring (not shown) can be removed. The upper portion 4010 can be clipped back in place.

A standalone assembly on a shock can have three sleeves: an inner sleeve, an outer sleeve of the standalone assembly, and an additional outer sleeve (e.g., shock body) of the shock itself. The integrated cross-link suspension apparatus 4000 essentially merges the inner sleeve of the standalone assembly with the outer sleeve (e.g., shock body). This is not necessarily a retrofit scenario. Preferably, the integrated cross-link suspension apparatus 4000 is built as one assembly in the factory. The integrated cross-link suspension apparatus 4000 can have a total of two cylinders for each shock absorbing section: the inner cylinder of the cross-link assembly can function as both the inner sleeve of the cross-link assembly and the outer sleeve of the shock (e.g., shock body). The center region 4005 can slide between the seals 3805 to transfer force to the other connected shock absorbing sections through the cross-link manifold 2767.

Figure 41:
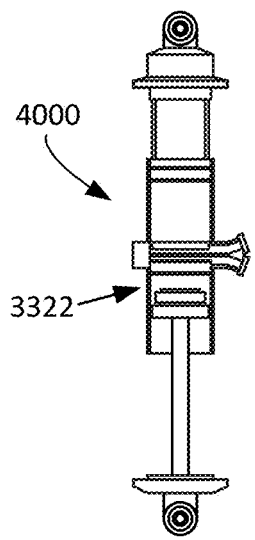
FIG. 41 illustrates an integrated cross-link suspension apparatus in a full droop configuration, in accordance with various embodiments of the present inventive concept.
Figure 42:
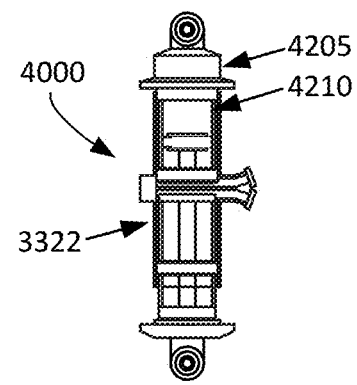
FIG. 42 illustrates an integrated cross-link suspension apparatus in a full bump configuration, in accordance with various embodiments of the present inventive concept.

FIG. 41 illustrates an integrated cross-link suspension apparatus 4000 in a full droop configuration, in accordance with various embodiments of the present inventive concept. FIG. 42 illustrates an integrated cross-link suspension apparatus 4000 in a full bump configuration, in accordance with various embodiments of the present inventive concept. In some embodiments, a nitrogen reservoir can be included at 4205 and/or 4210. In some embodiments, a bump stop can be included at 4205 and/or 4210. The integrated cross-link suspension apparatus 4000 enables the transfer of force of the springs, separating force transfer from shock damping action.

The cross-link suspension apparatus 4000 can enable load sharing among the interconnected standard shocks. Moreover, spring resistance can be increased to an individual standard shock, and the ability to dampen the shock action can be achieved by inserting valving in the fluid path (e.g., 2716 of FIG. 27).

Multi-section shock absorbers as disclosed herein can retain components of a traditional shock absorber in addition to functionality that covers load sharing capabilities of a shock-linked system. The system can include a hydraulic ram with off-shock valving. The system can include a spring specifically for cross-link movement, or a shared spring that shares both individual movement with the cross-link movement. The system can include a compression and rebound valve either attached to or removed from the shock absorber body. One section may be inside the other section, such as a floating piston that handles the individual movement of the wheel inside an elongated piston whereas the piston itself acts in compression or rebound of the cross-link section by its movement within the shock absorber cylinder. In some embodiments, a multi-section shock absorber can be one overall cylinder with sectional components. In some embodiments, the multi-section shock absorber can include sectional cylinders dedicated to either the individual movement or shared movement of the suspension, or both. To obtain the desired performance, hydraulic oil or gas, such as Nitrogen, can be used depending on desired attributes. Hydraulic oil can perform at least two different tasks. 1) controlling the valving of both compression and rebound and 2) transferring force across the vehicle. These functions can be separated into smaller cylinders designed to simply transfer force, and other cylinders designed to control the valving.

Advantages of the embodiments disclosed herein include better cornering, better stopping, better acceleration, better hill climbing, better hill descending, better side hilling, better rock crawling, better landing from jumps, smoother rough roads, greater load range, auto anti-sway (i.e., no sway bars needed), full articulation, load balancing, shock absorption directed to the wheels that need it, less energy to go over obstacles, varied and non-symmetrical loads, less rebound or suspension packing, more tire contact with surface, available wheel travel better utilized, less heat buildup in shocks, less stress and strain on vehicle, low cost solution, no active energy consumption, instant response, act like premium shocks, and additional performance, comfort, safety, and reliability.

The various operations of methods described above may be performed by any suitable means capable of performing the operations, such as various hardware, liquids, mechanical linkages, modules, or the like.

Some embodiments include a multi-section shock-linked system. The multi-section shock-linked system can include one or more transfer tubes. The multi-section shock-linked system can include a first multi-section shock absorber including a first section having at least one of a coil spring or a damping substance that is only associated with the first section, and a second section including a transfer receptacle having at least one of a hydraulic fluid or gas that is transferable via the one or more transfer tubes. The multi-section shock-linked system can include a second multi-section shock absorber including a first section having at least one of a coil spring or a damping substance that is only associated with the first section, and a second section including a transfer receptacle having at least one of the hydraulic fluid or gas that is transferable via the one or more transfer tubes.

In some embodiments, the one or more transfer tubes connects the transfer receptacle of the first multi-section shock absorber to the transfer receptacle of the second multi-section shock absorber. In some embodiments, the transfer receptacle of the second section of the first multi-section shock absorber includes a piston, and the transfer receptacle of the second section of the second multi-section shock absorber includes a piston.

The multi-section shock-linked system can include a third multi-section shock absorber including a first section having at least one of a coil spring or a damping substance that is only associated with the first section, and a second section including a transfer receptacle having at least one of the hydraulic fluid or gas that is transferable via the one or more transfer tubes. In some embodiments, the transfer receptacle of the second section of the third multi-section shock absorber includes a piston.

In some embodiments, the one or more transfer tubes includes a first transfer tube, a second transfer tube, and a third transfer tube. In some embodiments, the first transfer tube connects a first section of the transfer receptacle of the second section of the second multi-section shock absorber to a first section of the transfer receptacle of the second section of the third multi-section shock absorber. In some embodiments, the second transfer tube connects a first section of the transfer receptacle of the second section of the first multi-section shock absorber to a second section of the transfer receptacle of the second section of the second multi-section shock absorber. In some embodiments, the third transfer tube connects a second section of the transfer receptacle of the second section of the first multi-section shock absorber to a second section of the transfer receptacle of the second section of the third multi-section shock absorber.

In some embodiments, the third multi-section shock absorber is configured to share a shock impact with at least one of the first multi-section shock absorber and the second multi-section shock absorber. In some embodiments, the piston of the transfer receptacle of the second section of the first multi-section shock absorber separates the first and second sections of the transfer receptacle of the second section of the first multi-section shock absorber. In some embodiments, the piston of the transfer receptacle of the second section of the second multi-section shock absorber separates the first and second sections of the transfer receptacle of the second section of the second multi-section shock absorber. In some embodiments, the piston of the transfer receptacle of the second section of the third multi-section shock absorber separates the first and second sections of the transfer receptacle of the second section of the third multi-section shock absorber.

In some embodiments, a first end of the first multi-section shock absorber is fixed to a frame of a vehicle. In some embodiments, a second end opposite the first end of the first multi-section shock absorber is fixed to the frame of the vehicle. In some embodiments, a first end of the second multi-section shock absorber is fixed to the frame of the vehicle. In some embodiments, a second end opposite the first end of the second multi-section shock absorber is fixed to the frame of the vehicle. In some embodiments, a first end of the third multi-section shock absorber is fixed to the frame of the vehicle. In some embodiments, a second end opposite the first end of the third multi-section shock absorber is fixed to the frame of the vehicle. In some embodiments, at least one of the ends of each multi-section shock absorber can be fixed to a moveable arm of the suspension. In some embodiments, at least one end of the multi-section shock absorbers is fixed to a moveable arm of the suspension.

In some embodiments, the one or more transfer tubes includes a first transfer tube and a second transfer tube. In some embodiments, the first transfer tube connects the transfer receptacle of the second section of the first multi-section shock absorber to the transfer receptacle of the second section of the second multi-section shock absorber. In some embodiments, the second transfer tube connects the transfer receptacle of the second section of the first multi-section shock absorber to the transfer receptacle of the second section of the second multi-section shock absorber.

In some embodiments, the first multi-section shock absorber includes a first valve. In some embodiments, the second multi-section shock absorber includes a second valve.

In some embodiments, the first transfer tube is connected to the first valve of the first multi-section shock absorber. In some embodiments, the second transfer tube is connected to the second valve of the second multi-section shock absorber.

In some embodiments, the first valve of the first multi-section shock absorber is adjustable to control a flow rate of the at least one of the hydraulic fluid or gas through the first transfer tube. In some embodiments, the second valve of the second multi-section shock absorber is adjustable to control a flow rate of the at least one of the hydraulic fluid or gas through the second transfer tube.

In some embodiments, the first section of the first multi-section shock absorber includes a third valve. In some embodiments, the first section of the second multi-section shock absorber includes a fourth valve. In some embodiments, the first multi-section shock absorber is configured to share a shock impact with the second multi-section shock absorber.

In some embodiments, the first section of the first multi-section shock absorber is configured to receive first individual movement associated with a first wheel of a vehicle. In some embodiments, the second section of the first multi-section shock absorber is configured to receive first shared movement associated with the first wheel and a second wheel of the vehicle. In some embodiments, the first section of the second multi-section shock absorber is configured to receive second individual movement associated with the second wheel of the vehicle. In some embodiments, the second section of the second multi-section shock absorber is configured to receive second shared movement associated with the first wheel and the second wheel of the vehicle.

Some embodiments include a multi-section shock absorber. The multi-section shock absorber can include a first section configured to hold at least one of a coil spring or a damping substance that is only associated with the first section. The multi-section shock absorber can include a second section including a transfer receptacle configured to hold at least one of a hydraulic fluid or gas. In some embodiments, the transfer receptacle includes a piston. In some embodiments, the transfer receptacle includes a first section and a second section. In some embodiments, the first section of the transfer receptacle includes a first port configured to attach to a first transfer tube. In some embodiments, the second section of the transfer receptacle includes a second port configured to attach to a second transfer tube. In some embodiments, the piston separates the first section of the transfer receptacle from the second section of the transfer receptacle.

In some embodiments, the piston is configured to cause the at least one of the hydraulic fluid or gas to be transferred through the first transfer tube. In some embodiments, the piston is configured to cause the at least one of the hydraulic fluid or gas to be transferred through the second transfer tube.

In some embodiments, the first section is configured to receive individual movement associated with a wheel of a vehicle, and the second section is configured to receive shared movement associated with at least two wheels of the vehicle.

The multi-section shock absorber can include a valve that is configured to control a flow rate of the at least one of the hydraulic fluid or gas through at least one of the first transfer tube or the second transfer tube.

Embodiments are described herein, and illustrated in the drawings, in terms of functional blocks, units and/or modules. Each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A cross-link suspension apparatus, comprising:
a first outer cylinder;
a first inner cylinder configured to be disposed within the first outer cylinder;
a first manifold including one or more apertures;
a second outer cylinder;
a second inner cylinder configured to be disposed within the second outer cylinder;
a second manifold including one or more apertures;
a first transfer tube and a second transfer tube that are configured to be coupled to the one or more apertures of the first manifold and to the one or more apertures of the second manifold;
a third outer cylinder;
a third inner cylinder configured to be disposed within the third outer cylinder;
a third manifold including one or more apertures;
a fourth outer cylinder;
a fourth inner cylinder configured to be disposed within the fourth outer cylinder;
a fourth manifold including one or more apertures; and
a third transfer tube and a fourth transfer tube that are configured to be coupled to the one or more apertures of the third manifold and to the one or more apertures of the fourth manifold,
wherein the first and second transfer tubes are configured to transfer, together as a first group, at least one of first hydraulic fluid or gas dependent on a pressure difference between the first inner cylinder and the second inner cylinder; and
wherein the third and fourth transfer tubes are configured to transfer, together as a second group independent of the first group, at least one of second hydraulic fluid or second gas dependent on a pressure difference between the third inner cylinder and the fourth inner cylinder.

2. The cross-link suspension apparatus of claim 1, wherein:
the first outer cylinder is coupled to the first manifold;
the first and second transfer tubes are coupled to the one or more apertures of the first manifold and to the one or more apertures of the second manifold;

the second outer cylinder is coupled to the second manifold;
the third outer cylinder is coupled to the third manifold;
the fourth outer cylinder is coupled to the fourth manifold; and
the third and fourth transfer tubes are coupled to the one or more apertures of the third manifold and to the one or more apertures of the fourth manifold.

3. The cross-link suspension apparatus of claim 2, wherein:
the first inner cylinder is configured to cause the at least one of the first hydraulic fluid or gas to be transferred through the first transfer tube; and
the second inner cylinder is configured to cause the at least one of the first hydraulic fluid or gas to be transferred through the second transfer tube.

4. The cross-link suspension apparatus of claim 1, wherein the first outer cylinder, the first inner cylinder, the first manifold including the one or more apertures, the first transfer tube, and the second transfer tube are configured to be retrofitted to a pre-existing shock of a vehicle.

5. The cross-link suspension apparatus of claim 1, further comprising an external spring that is disposed around at least some of the first outer cylinder.

6. The cross-link suspension apparatus of claim 1, wherein:
the first inner cylinder is configured to share a first shock impact with the second inner cylinder; and
the third inner cylinder is configured to share a second shock impact with the fourth inner cylinder.

7. The cross-link suspension apparatus of claim 1, wherein:
the first inner cylinder is configured to cause the at least one of the first hydraulic fluid or gas to be transferred through the first transfer tube;
the second inner cylinder is configured to cause the at least one of the first hydraulic fluid or gas to be transferred through the second transfer tube;
the third inner cylinder is configured to cause the at least one of the second hydraulic fluid or gas to be transferred through the third transfer tube; and
the fourth inner cylinder is configured to cause the at least one of the second hydraulic fluid or gas to be transferred through the fourth transfer tube.

* * * * *